United States Patent
Kondo et al.

(10) Patent No.: US 8,037,509 B2
(45) Date of Patent: Oct. 11, 2011

(54) SIGNAL PROCESSING SYSTEM AND METHOD, SIGNAL PROCESSING APPARATUS AND METHOD, RECORDING MEDIUM, AND PROGRAM

(75) Inventors: Tetsujiro Kondo, Tokyo (JP); Akira Tange, Kanagawa (JP)

(73) Assignee: Sony Corporation, Tokyo (JP)

( * ) Notice: Subject to any disclaimer, the term of this patent is extended or adjusted under 35 U.S.C. 154(b) by 44 days.

(21) Appl. No.: 12/711,548

(22) Filed: Feb. 24, 2010

(65) Prior Publication Data

US 2010/0153599 A1 Jun. 17, 2010

Related U.S. Application Data

(62) Division of application No. 10/439,150, filed on May 15, 2003, now Pat. No. 7,694,326.

(30) Foreign Application Priority Data

May 17, 2002 (JP) ................................ 2002-143038
May 17, 2002 (JP) ................................ 2002-143039

(51) Int. Cl.
*H04N 7/16* (2011.01)
*H04N 7/173* (2011.01)
*H04N 7/01* (2006.01)
*H04N 11/20* (2006.01)

(52) U.S. Cl. ......... 725/153; 725/132; 725/140; 348/441
(58) Field of Classification Search .................. 725/132, 725/140, 153; 348/441
See application file for complete search history.

(56) References Cited

U.S. PATENT DOCUMENTS

| 4,939,515 | A | | 7/1990 | Adelson |
| 5,187,575 | A | | 2/1993 | Lim |
| 5,488,434 | A | * | 1/1996 | Jung ............................. 348/725 |
| 5,559,549 | A | | 9/1996 | Hendricks et al. |
| 5,572,528 | A | | 11/1996 | Shuen |
| 5,912,708 | A | | 6/1999 | Kondo et al. |
| 6,922,780 | B1 | * | 7/2005 | Siegel .......................... 713/189 |

FOREIGN PATENT DOCUMENTS

| JP | 2 246400 | 10/1990 |
| JP | 7 147670 | 6/1995 |

(Continued)

*Primary Examiner* — Dominic D Saltarelli
(74) *Attorney, Agent, or Firm* — Frommer Lawrence & Haug LLP; William S. Frommer

(57) ABSTRACT

According to one aspect of the invention, when an algorithm bay is connected to a signal processing apparatus according to a first connection mode, a selector of the algorithm bay selects and sets a first function provided by a first function provider as the signal processing function of the signal processing apparatus. When the algorithm bay is connected to the signal processing apparatus according to a second connection mode, the selector of the algorithm bay selects and sets a second function provided by a second function provider as the signal processing function of the signal processing apparatus. According to another aspect of the invention, a first information provider of an algorithm bay supplies a signal indicating first information to be used in the signal processing of a signal processor of a signal processing apparatus to the signal processor via a wired interface of the algorithm bay, wired connection, and a wired interface of the signal processing apparatus. A second information provider of the algorithm bay supplies a signal indicating second information of changing the signal processing function of the signal processor to the signal processor via a wireless interface of the algorithm bay, wireless connection, and a wireless interface of the signal processing apparatus.

30 Claims, 29 Drawing Sheets

FOREIGN PATENT DOCUMENTS

| | | |
|---|---|---|
| JP | 7 261756 | 10/1995 |
| JP | 11 27267 | 1/1999 |
| JP | 2000 307594 | 11/2000 |
| JP | 2000 316085 | 11/2000 |
| JP | 2001 28740 | 1/2001 |
| JP | 2001 230954 | 8/2001 |
| JP | 2001 352497 | 12/2001 |
| JP | 2002 314903 | 10/2002 |
| JP | 2002 374461 | 12/2002 |
| JP | 2003 179821 | 6/2003 |
| JP | 2003 299096 | 10/2003 |

\* cited by examiner

391

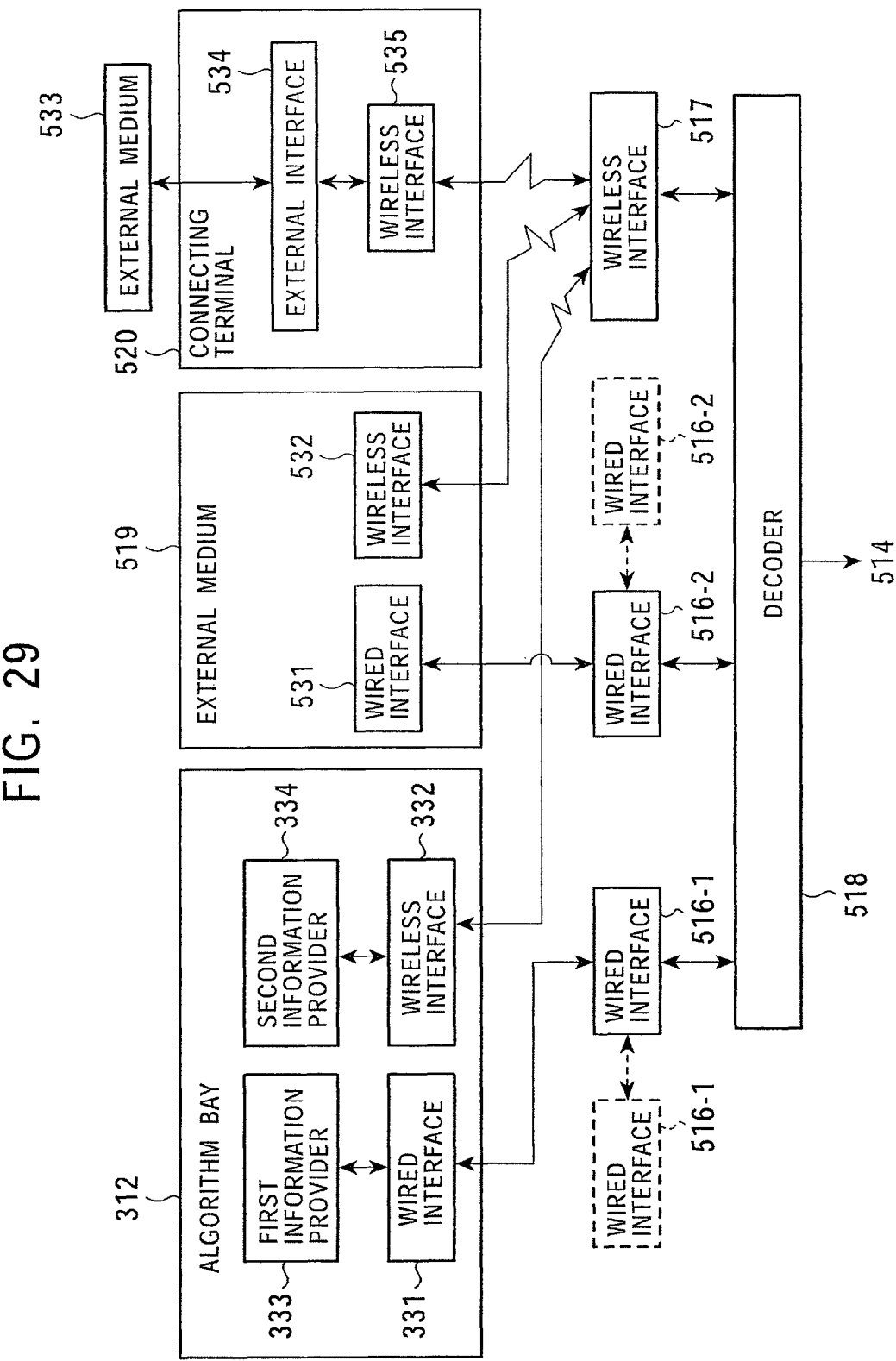

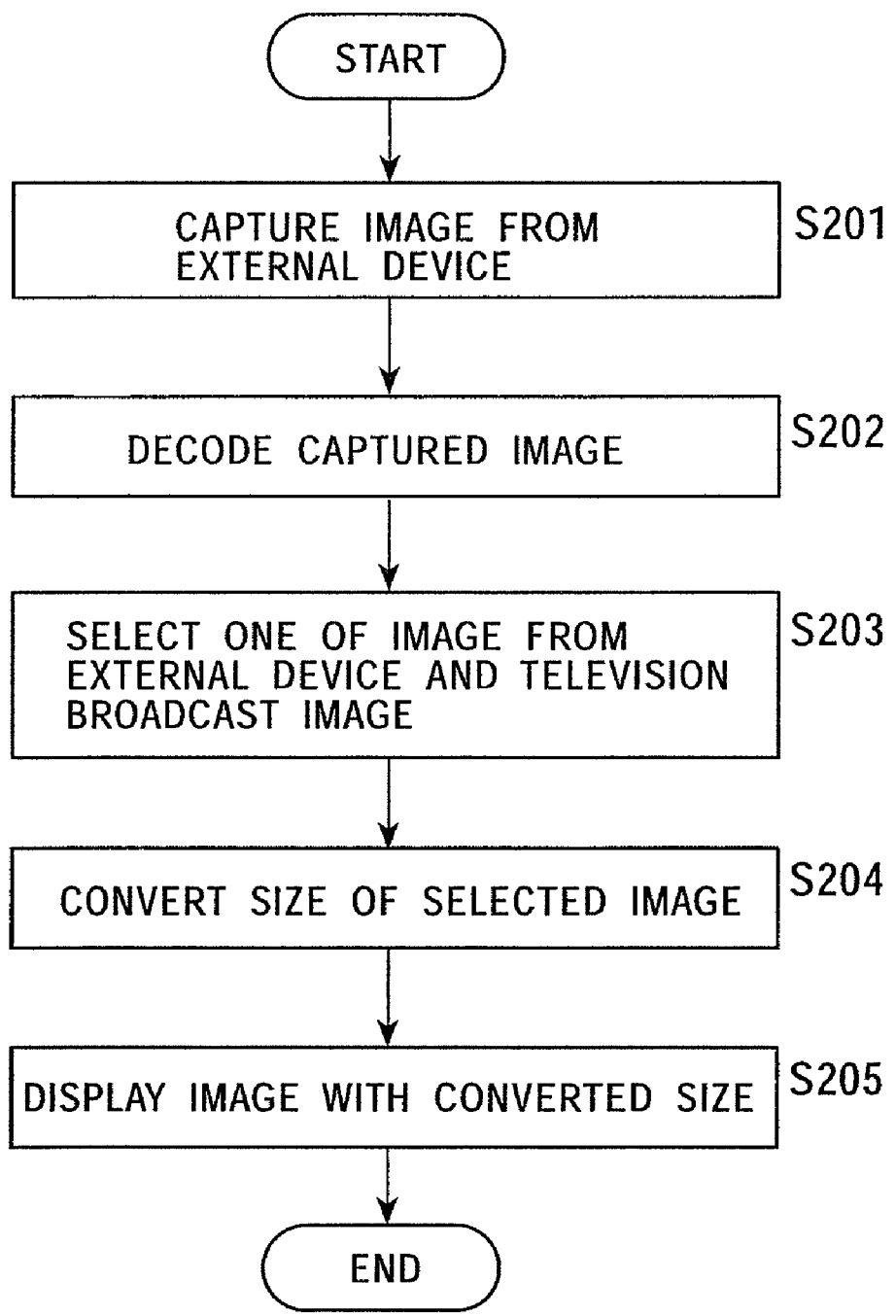

SIGNAL PROCESSING SYSTEM AND METHOD, SIGNAL PROCESSING APPARATUS AND METHOD, RECORDING MEDIUM, AND PROGRAM

This is a division of application Ser. No. 10/439,150, filed May 15, 2003, now U.S. Pat. No. 7,694,326 which is entitled to the priority filing dates of Japanese applications 2002-143038 and 2002-143039 filed on May 17, 2002 respectively, the entirety of which is incorporated herein by reference.

BACKGROUND OF THE INVENTION

1. Field of the Invention

The present invention relates to signal processing systems and methods, signal processing apparatuses and methods, recording media, and programs. More particularly, the invention relates to a signal processing system and method and a signal processing apparatus and method in which a plurality of signal processing functions provided for the signal processing apparatus can be easily selected and utilized. The invention also pertains to a program implementing the above-described method and to a recording medium storing such a program.

The invention further relates to a signal processing system and method and a signal processing apparatus and method in which updated information for changing signal processing functions can be provided while maintaining security. The invention also pertains to a program implementing the above-described method and to a recording medium storing such a program.

2. Description of the Related Art

It is known that a board is attached to a signal processing apparatus that performs predetermined signal processing on an input signal and outputs a resulting signal, and information for updating the signal processing functions is supplied to the signal processing apparatus from the board by wired connection. In this case, the board is connected to a bus of the signal processing apparatus, and then, information can be supplied to the signal processing apparatus from the board via the bus.

Hitherto, information concerning only one signal processing function is assigned to each board. Accordingly, when a plurality of functions are assigned to a signal processing apparatus, a plurality of boards must be prepared, and it is troublesome for the user to manage such boards. Also, when changing the function, the user has to search for the corresponding board and installs it into the signal processing apparatus, thereby decreasing the operability.

Information to be supplied to a signal processing apparatus from a board via a bus is sometimes updated, in which case, such updated information sometimes cannot be supplied to the signal processing apparatus because of the restrictions of the bus.

Additionally, when providing information from a board to a signal processing apparatus, leakage of the information may occur.

SUMMARY OF THE INVENTION

Accordingly, in view of the above background, it is an object of the present invention to easily select one of a plurality of signal processing functions provided for a signal processing apparatus and to utilize the selected function.

It is another object of the present invention to implement the provision of updated information for changing the signal processing functions while maintaining security.

In order to achieve the above-described objects, according to one aspect of the present invention, there is provided a signal processing system including: a first signal processing apparatus for performing predetermined signal processing on an input signal and for outputting the processed signal; and a second signal processing apparatus for changing a function of the predetermined signal processing of the first signal processing apparatus to a first function when the second signal processing apparatus is connected to the first signal processing apparatus according to a first connection mode, and for changing the function of the predetermined signal processing to a second function when the second signal processing apparatus is connected to the first signal processing apparatus according to a second connection mode.

The second signal processing apparatus may be formed as a board to be installed in the first signal processing apparatus.

The first signal processing apparatus may include an installation device for installing the second signal processing apparatus, and the first connection mode and the second connection mode may be distinguished by a direction in which the second signal processing apparatus is connected to the first signal processing apparatus when the second signal processing apparatus is installed in the installation device of the first signal processing apparatus.

The second signal processing apparatus may provide an indication of the first function at a first position corresponding to the first connection mode, and may provide an indication of the second function at a second position corresponding to the second connection mode.

The first signal processing apparatus and the second signal processing apparatus may perform wireless communication with each other. The first signal processing apparatus or the second signal processing apparatus may include a detector for detecting a wireless communication distance when the wireless communication is performed. The first connection mode and the second connection mode may be distinguished by the wireless communication distance detected by the detector.

The detector may detect the wireless communication distance based on one of the intensity of an electric field, an error rate, and a clock phase difference.

The second signal processing apparatus may include a classification adaptive processor for performing classification adaptive processing. The first function may be a function of outputting a signal subjected to the classification adaptive processing by the classification adaptive processor by using a first coefficient, and the second function may be a function of outputting a signal subjected to the classification adaptive processing by the classification adaptive processor by using a second coefficient.

A third signal processing apparatus for performing the classification adaptive processing in cooperation with the second signal processing apparatus may be assigned to at least the first connection mode. The classification adaptive processor may perform the classification adaptive processing in cooperation with the third signal processing apparatus when the second signal processing apparatus is connected to the first signal processing apparatus according to the first connection mode. The first function may be a function of outputting a signal subjected to the classification adaptive processing by the classification adaptive processor of the second signal processing apparatus in cooperation with the third signal processing apparatus.

The first signal processing apparatus or the second signal processing apparatus may further include coefficient designation unit for designating a coefficient for performing the classification adaptive processing by the third signal processing apparatus in cooperation with the classification adaptive processor.

The second signal processing apparatus may include a classification adaptive processor for performing classification adaptive processing, a third signal processing apparatus for performing the classification adaptive processing in cooperation with the second signal processing apparatus, the third signal processing apparatus being assigned to at least the first connection mode, and a coefficient generator for generating a coefficient for performing the classification adaptive processing by the third signal processing apparatus in cooperation with the second signal processing apparatus when the second signal processing apparatus is connected to the first signal processing apparatus according to the first connection mode. The second signal processing apparatus may supply the coefficient generated by the coefficient generator to the third signal processing apparatus. The first function may be a function of outputting a signal subjected to the classification adaptive processing performed by the third signal processing apparatus by using the coefficient provided by the second signal processing apparatus. The second function may be a function of outputting a signal subjected to the classification adaptive processing by the classification adaptive processor.

According to another aspect of the present invention, there is provided a signal processing method for a signal processing system which includes a first signal processing apparatus and a second signal processing apparatus. The signal processing method includes: a step of performing, by the first signal processing apparatus, predetermined signal processing on an input signal and outputting the processed signal; and a step of changing, by the second signal processing apparatus, a function of the predetermined signal processing of the first signal processing apparatus to a first function when the second signal processing apparatus is connected to the first signal processing apparatus according to a first connection mode, and of changing, by the second signal processing apparatus, the function of the predetermined signal processing to a second function when the second signal processing apparatus is connected to the first signal processing apparatus according to a second connection mode.

The first signal processing apparatus may be a reception dedicated apparatus for receiving signals by wired or wireless connection, or may be a transceiver for transmitting and receiving signals by wired or wireless connection.

The second signal processing apparatus may be a transmission dedicated apparatus for transmitting signals by wired or wireless connection, or may be a transceiver for transmitting and receiving signals by wired or wireless connection.

The first and second information may be information prestored in the second signal processing apparatus, or information supplied from another apparatus to the second signal processing apparatus.

According to still another aspect of the present invention, there is provided a signal processing apparatus including: a signal processor for performing predetermined signal processing on an input signal and for outputting the processed signal; and a connector, which is connectable with a first signal processing apparatus according to a plurality of connection modes. The first signal processing apparatus may change the function of the predetermined signal processing to a first function when the first signal processing apparatus is connected to the connector of the signal processing apparatus according to a first connection mode, and may change the function of the predetermined signal processing to a second function when the first signal processing apparatus is connected to the connector according to a second connection mode.

The first signal processing apparatus may be formed as a board to be installed in the signal processing apparatus.

The connector may include an installation device for installing the first signal processing apparatus, and the first connection mode and the second connection mode may be distinguished by a direction in which the first signal processing apparatus is connected to the signal processing apparatus when the first signal processing apparatus is installed in the installation device of the signal processing apparatus.

The first signal processing apparatus may provide an indication of the first function at a first position corresponding to the first connection mode, and may provide an indication of the second function at a second position corresponding to the second connection mode.

The signal processing apparatus may further include: a wireless communication unit for performing wireless communication with the first signal processing apparatus; and a detector for detecting a wireless communication distance when the signal processing apparatus performs the wireless communication with the first signal processing apparatus by using the wireless communication unit. The first connection mode and the second connection mode may be distinguished by the wireless communication distance detected by the detector.

The detector may detect the wireless communication distance based on one of the intensity of an electric field, an error rate, and a clock phase difference.

The first signal processing apparatus may perform classification adaptive processing. The first function may be a function of outputting a signal subjected to the classification adaptive processing performed by the first signal processing apparatus by using a first coefficient, and the second function may be a function of outputting a signal subjected to the classification adaptive processing performed by the first signal processing apparatus by using a second coefficient.

A second signal processing apparatus for performing the classification adaptive processing in cooperation with the first signal processing apparatus may be assigned to at least the first connection mode. The first signal processing apparatus may perform the classification adaptive processing in cooperation with the second signal processing apparatus when the first signal processing apparatus is connected to the connector of the signal processing apparatus according to the first connection mode. The first function may be a function of outputting a signal subjected to the classification adaptive processing performed by the first signal processing apparatus in cooperation with the second signal processing apparatus.

The second signal processing apparatus may include a coefficient designation unit for designating a coefficient for performing the classification adaptive processing by the second signal processing apparatus in cooperation with the first signal processing apparatus.

The first signal processing apparatus may perform classification adaptive processing. A second signal processing apparatus for performing the classification adaptive processing in cooperation with the first signal processing apparatus may be assigned to at least the first connection mode. A coefficient for performing the classification adaptive processing by the second signal processing apparatus in cooperation with the first signal processing apparatus may be generated when the first signal processing apparatus is connected to the connector of the signal processing apparatus according to the first connection mode, and may be supplied to the second signal processing apparatus. The first function may be a function of outputting a signal subjected to the classification adaptive processing performed by the second signal processing apparatus by using the coefficient provided by the first signal processing apparatus. The second function may be a function of outputting a signal subjected to the classification adaptive processing by the first signal processing apparatus.

According to a further aspect of the present invention, there is provided a signal processing method for a signal processing apparatus. The signal processing method includes a signal processing step of performing predetermined signal processing on an input signal and of outputting the processed signal. A function of the predetermined signal processing in the signal processing step is changed to a first function when a first signal processing apparatus is connected to the signal processing apparatus according to a first connection mode, and the function of the predetermined signal processing in the signal processing step is changed to a second function when the first signal processing apparatus is connected to the signal processing apparatus according to a second connection mode.

A program of a recording medium of the present invention includes a signal processing step of performing predetermined signal processing on an input signal and of outputting the processed signal. A function of the predetermined signal processing in the signal processing step is changed to a first function when a first signal processing apparatus is connected to the signal processing apparatus according to a first connection mode, and the function of the predetermined signal processing in the signal processing step is changed to a second function when the first signal processing apparatus is connected to the signal processing apparatus according to a second connection mode.

A program of the present invention includes a signal processing step of performing predetermined signal processing on an input signal and of outputting the processed signal. A function of the predetermined signal processing in the signal processing step is changed to a first function when a first signal processing apparatus is connected to the signal processing apparatus according to first connection mode, and the function of the predetermined signal processing in the signal processing step is changed to a second function when the first signal processing apparatus is connected to the signal processing apparatus according to a second connection mode.

The signal processing apparatus may be a reception dedicated apparatus for receiving signals by wired or wireless connection, or a transceiver for transmitting and receiving signals by wired or wireless connection.

According to a yet further aspect of the present invention, there is provided a signal processing apparatus including: a first signal processing apparatus for performing predetermined signal processing on an input signal and for outputting the processed signal; and a function changing unit for changing the function of the predetermined signal processing of the first signal processing apparatus when the signal processing apparatus is connected to the first signal processing apparatus according to a first connection mode, and for changing the function of the predetermined signal processing of the first signal processing apparatus to a second function when the signal processing apparatus is connected to the first signal processing apparatus according to a second connection mode.

The signal processing apparatus may be formed as a board to be installed in the first signal processing apparatus.

The first signal processing apparatus may include an installation device for installing the signal processing apparatus. The first connection mode and the second connection mode may be distinguished by a direction in which the signal processing apparatus is connected to the first signal processing apparatus when the signal processing apparatus is installed in the installation device of the first signal processing apparatus.

The signal processing apparatus may provide an indication of the first function at a first position corresponding to the first connection mode, and may provide an indication of the second function at a second position corresponding to the second connection mode.

The signal processing apparatus may further include a wireless communication unit for performing wireless communication with the first signal processing apparatus. The first signal processing apparatus may include a detector for detecting a wireless communication distance when the first signal processing apparatus performs the wireless communication with the wireless communication unit. The first connection mode and the second connection mode may be distinguished by the wireless communication distance detected by the detector.

The signal processing apparatus may further include a classification adaptive processor for performing classification adaptive processing. The first function may be a function of outputting a signal subjected to the classification adaptive processing performed by the classification adaptive processor by using a first coefficient, and the second function may be a function of outputting a signal subjected to the classification adaptive processing performed by the classification adaptive processor by using a second coefficient.

A second signal processing apparatus for performing the classification adaptive processing in cooperation with the signal processing apparatus may be assigned to at least the first connection mode. The classification adaptive processor may perform the classification adaptive processing in cooperation with the second signal processing apparatus when the signal processing apparatus is connected to the first signal processing apparatus according to the first connection mode. The first function may be a function of outputting a signal subjected to the classification adaptive processing performed by the classification adaptive processor in cooperation with the second signal processing apparatus.

The signal processing apparatus may further include a classification adaptive processor for performing classification adaptive processing; a second signal processing apparatus for performing the classification adaptive processing in cooperation with the signal processing apparatus, the second signal processing apparatus being assigned to at leapt the first connection mode; and a coefficient generator for generating a coefficient for performing the classification adaptive processing by the second signal processing apparatus in cooperation with the signal processing apparatus when the signal processing apparatus is connected to the first signal processing apparatus according to the first connection mode. The function changing unit may supply the coefficient generated by the coefficient generator to the second signal processing apparatus. The first function may be a function of outputting a signal subjected to the classification adaptive processing performed by the second signal processing apparatus by using the coefficient provided by the function changing unit. The second function may be a function of outputting a signal subjected to the classification adaptive processing performed by the classification adaptive processor.

According to a further aspect of the present invention, there is provided a signal processing method for a signal processing apparatus. The signal processing method includes a function changing step of changing, when the signal processing apparatus is connected to a first signal processing apparatus for performing predetermined signal processing on an input signal and for outputting the processed signal according to a first connection mode, a function of the predetermined signal processing of the first signal processing apparatus to a first function, and of changing, when the signal processing apparatus is connected to the first signal processing apparatus according to a second connection mode, the function of the predetermined signal processing of the first signal processing to a second function.

A program of a recording medium of the present invention includes a function changing step of changing, when the signal processing apparatus is connected to a first signal processing apparatus for performing predetermined signal processing on an input signal and for outputting the processed signal according to a first connection mode, a function of the predetermined signal processing of the first signal processing apparatus to a first function, and of changing, when the signal processing apparatus is connected to the first signal processing apparatus according to a second connection mode, the function of the predetermined signal processing of the first signal processing to a second function.

A program of the present invention includes a function changing step of changing, when the signal processing apparatus is connected to a first signal processing apparatus for performing predetermined signal processing on an input signal and for outputting the processed signal according to a first connection mode, a function of the predetermined signal processing of the first signal processing apparatus to a first function, and of changing, when the signal processing apparatus is connected to the first signal processing apparatus according to a second connection mode, the function of the predetermined signal processing of the first signal processing to a second function.

The signal processing apparatus may be a transmission dedicated apparatus for transmitting signals by wired or wireless connection, or a transceiver for transmitting and receiving signals by wired or wireless connection.

The first and second information may be information prestored in the signal processing apparatus, or information supplied from another apparatus to the signal processing apparatus.

According to the above-described signal processing systems, apparatuses, methods, recording media, and programs, it is possible to implement a system that can change a signal processing function. In this system, a plurality of signal processing functions of the signal processing apparatus can be easily selected and utilized.

According to a further aspect of the present invention, there is provided a signal processing system including a first signal processing apparatus for performing predetermined signal processing on an input signal and for outputting the processed signal, and a second signal processing apparatus for supplying a signal to the first signal processing apparatus. The second signal processing apparatus includes: a wired supply unit for supplying by wired connection a signal indicating first information to be used in the predetermined signal processing of the first signal processing apparatus to the first signal processing apparatus; and a wireless supply unit for wirelessly supplying a signal indicating second information for changing a function of the predetermined signal processing of the first signal processing apparatus to the first signal processing apparatus.

The second signal processing apparatus may be formed as a board to be installed in the first signal processing apparatus.

The second information may be information for improving the function of the predetermined signal processing based on the first information.

The predetermined signal processing may be classification adaptive processing. The first information may be a first coefficient to be used in the classification adaptive processing, and the second information may be a second coefficient, which is different from the first coefficient, to be used in the classification adaptive processing.

The predetermined signal processing may include block-forming processing for converting the signal into block data, discrete cosine transform (DCT) processing for transforming the block data into a DCT coefficient, and quantizing processing for quantizing the DCT coefficient. The first information may be a first quantizing table to be used in the quantizing processing, and the second information may be a second quantizing table, which is different from the first quantizing table, to be used in the quantizing processing.

The second information may be information for adding a function to the function of the predetermined signal processing based on the first information.

The predetermined signal processing may be classification adaptive processing. The first information may be a coefficient corresponding to a first function to be used in the classification adaptive processing, and the second information may be a coefficient corresponding to a second function, which is different from the first function, to be used in the classification adaptive processing.

The predetermined signal processing may include block-forming processing for converting the signal into block data, DCT processing for transforming the block data into a DCT coefficient, and quantizing processing for quantizing the DCT coefficient. The first information may be a quantizing table to be used in the quantizing processing, and the second information may be motion-compensation data for the block data corresponding to the signal. When the signal indicating the first information and the signal indicating the second information are supplied from the second signal processing apparatus, the first signal processing apparatus may transform the second information into a DCT coefficient by the DCT processing, and quantizes the DCT coefficient corresponding to the second information based on the first information by performing the quantizing processing.

The first information may be coded information, and the second information may be decoding information for decoding the coded information. When the signal indicating the first information and the signal indicating the second information are supplied from the second signal processing apparatus, the first signal processing apparatus may perform decoding processing, as the predetermined signal processing, for decoding the first information by using the second information.

The wired supply unit of the second signal processing apparatus may include a first connector to be physically and electrically connected to the first signal processing apparatus.

The second signal processing apparatus may be formed as a board to be installed in the first signal processing apparatus, and the board may be housed in a package. The first connector may be disposed in the package.

The first signal processing apparatus may include a second connector to be connected to the first connector, the second connector including a plurality of types of connectors associated with a plurality of corresponding types of connectors provided for the first connector.

The second connector may be detachable from the first signal processing apparatus, and may include types of connectors defined by predetermined formats.

The first signal processing apparatus may be a television receiver. The wireless supply unit of the second signal processing apparatus may wirelessly supply an image or audio signal to the television receiver.

According to a further aspect of the present invention, there is provided a signal processing method for a signal processing system which includes a first signal processing apparatus and a second signal processing apparatus. The signal processing method includes the steps of: performing, by the first signal processing apparatus, predetermined signal processing on an input signal and outputting the processed signal; supplying by wired connection a signal indicating first information to be used in the predetermined signal processing of the first signal processing apparatus from the second signal processing apparatus to the first signal processing apparatus; and wirelessly supplying a signal indicating second information for changing a function of the predetermined signal processing of the first signal processing apparatus from the second signal processing apparatus to the first signal processing apparatus.

The first signal processing apparatus may be a reception dedicated apparatus for receiving signals by wired or wireless connection, or a transceiver for transmitting and receiving signals by wired or wireless connection.

The second signal processing apparatus may be a transmission dedicated apparatus for transmitting signals by wired or wireless connection, or a transceiver for transmitting and receiving signals by wired or wireless connection.

The first and second information may be information prestored in the second signal processing apparatus, or information supplied from another apparatus to the second signal processing apparatus.

According to a further aspect of the present invention, there is provided a signal processing apparatus for performing predetermined signal processing on an input signal and for outputting the processed signal. The signal processing apparatus includes: a wired receiver for receiving by wired connection a signal indicating first information to be used in the predetermined signal processing and sent from a first signal processing apparatus by wired connection; and a wireless receiver for wirelessly receiving a signal indicating second information for changing a function of the predetermined signal processing wirelessly sent from the first signal processing apparatus.

The second information may be information for improving the function of the predetermined signal processing based on the first information.

The predetermined signal processing may be classification adaptive processing. The first information may be a first coefficient to be used in the classification adaptive processing, and the second information may be a second coefficient, which is different from the first coefficient, to be used in the classification adaptive processing.

The predetermined signal processing may include block-forming processing for converting the signal into block data, DCT processing for transforming the block data into a DCT coefficient, and quantizing processing for quantizing the DCT coefficient. The first information may be a first quantizing table to be used in the quantizing processing, and the second information may be a second quantizing table, which is different from the first quantizing table, to be used in the quantizing processing.

The second information may be information for adding a function to the function of the predetermined signal processing based on the first information.

The predetermined signal processing may be classification adaptive processing. The first information may be a coefficient corresponding to a first function to be used in the classification adaptive processing. The second information may be a coefficient corresponding to a second function, which is different from the first function, to be used in the classification adaptive processing.

The predetermined signal processing may include block-forming processing for converting the signal into block data, DCT processing for transforming the block data into a DCT coefficient, and quantizing processing for quantizing the DCT coefficient. The first information may be a quantizing table to be used in the quantizing processing, and the second information may be motion-compensation data for the block data corresponding to the signal. When receiving the signal indicating the first information by the wired receiver and also receiving the signal indicating the second information by the wireless receiver, the signal processing apparatus may transform the second information into a DCT coefficient by the DCT processing, and quantizes the DCT coefficient corresponding to the second information based on the first information by performing the quantizing processing.

The first information may be coded information, and the second information may be decoding information for decoding the coded information. When receiving the signal indicating the first information by the wired receiver and also receiving the signal indicating the second information by the wireless receiver, the signal processing apparatus may perform decoding processing, as the predetermined signal processing, for decoding the first information by using the second information.

The wired receiver may include a second connector to be physically and electrically connected to a first connector provided for the first signal processing apparatus. When the second connector is connected to the first connector of the first signal processing apparatus, the signal processing apparatus may receive via the first connector and the second connector the first information sent from the first signal processing apparatus.

The second connector may include a plurality of types of connectors associated with a plurality of corresponding types of connectors provided for the first connector.

The second connector may be detachable from the signal processing apparatus, and may include types of connectors defined by predetermined formats.

The signal processing apparatus may be a television receiver. The wireless receiver may wirelessly receive an image or audio signal wirelessly sent from the first signal processing apparatus.

According to a further aspect of the present invention, there is provided a signal processing method for a signal processing apparatus for performing predetermined signal processing on an input signal and for outputting the processed signal. The signal processing method includes: a wired receiving step of receiving by wired connection a signal indicating first information to be used in the predetermined signal processing sent from a first signal processing apparatus by wired connection; and a wireless receiving step of wirelessly receiving a signal indicating second information for changing a function of the predetermined signal processing wirelessly sent from the first signal processing apparatus.

A program of a recording medium of the present invention includes: a wired receiving step of receiving by wired connection a signal indicating first information to be used in the predetermined signal processing sent from a first signal processing apparatus by wired connection; and a wireless receiving step of wirelessly receiving a signal indicating second information for changing a function of the predetermined signal processing wirelessly sent from the first signal processing apparatus.

A program of the present invention includes: a wired receiving step of receiving by wired connection a signal indicating first information to be used in the predetermined signal processing sent from a first signal processing apparatus by wired connection; and a wireless receiving step of wirelessly receiving a signal indicating second information for changing a function of the predetermined signal processing wirelessly sent from the first signal processing apparatus.

The signal processing apparatus may be a reception dedicated apparatus for receiving signals by wired or wireless connection, or a transceiver for transmitting and receiving signals by wired or wireless connection.

According to a further aspect of the present invention, there is provided a signal processing apparatus including: a wired supply unit for supplying, to a first signal processing apparatus for performing predetermined signal processing on an input signal and for outputting the processed signal, a signal indicating first information to be used in the predetermined signal processing of the first signal processing apparatus; and a wireless supply unit for wirelessly supplying a signal indicating second information for changing a function of the predetermined signal processing of the first signal processing apparatus to the first signal processing apparatus.

The signal processing apparatus may be formed as a board to be installed in the first signal processing apparatus.

The second information may be information for improving the function of the predetermined signal processing based on the first information.

The predetermined signal processing may be classification adaptive processing. The first information may be a first coefficient to be used in the classification adaptive processing, and the second information may be a second coefficient, which is different from the first coefficient, to be used in the classification adaptive processing.

The predetermined signal processing may include block-forming processing for converting the signal into block data, DCT processing for transforming the block data into a DCT coefficient, and quantizing processing for quantizing the DCT coefficient. The first information may be a first quantizing table to be used in the quantizing processing, and the second information may be a second quantizing table, which is different from the first quantizing table, to be used in the quantizing processing.

The second information may be information for adding a function to the function of the predetermined signal processing based on the first information.

The predetermined signal processing may be classification adaptive processing. The first information may be a coefficient corresponding to a first function to be used in the classification adaptive processing, and the second information may be a coefficient corresponding to a second function, which is different from the first function, to be used in the classification adaptive processing.

The predetermined signal processing may include block-forming processing for converting the signal into block data, DCT processing for transforming the block data into a DCT coefficient, and quantizing processing for quantizing the DCT coefficient. The first information may be a quantizing table to be used in the quantizing processing, and the second information may be motion-compensation data for the block data corresponding to the signal.

The predetermined signal processing may be decoding processing for decoding coded information. The first information may be the coded information, and the second information may be decoding information for decoding the coded information. Alternatively, the first information may be encrypted information, and the second information may be decoding information (for example, a key) for decoding the encrypted information.

The wired supply unit may include a connector to be physically and electrically connected to the first signal processing apparatus.

The signal processing apparatus may be formed as a board to be installed in the first signal processing apparatus, and the board may be housed in a package. The connector may be disposed in the package.

The first signal processing apparatus may be a television receiver. The wireless supply unit may wirelessly supply an image or audio signal to the television receiver.

According to a further aspect of the present invention, there is provided a signal processing method for a signal processing apparatus. The signal processing method includes: a wired supply step of supplying, to a first signal processing apparatus for performing predetermined signal processing on an input signal and for outputting the processed signal, a signal indicating first information to be used in the predetermined signal processing of the first signal processing apparatus; and a wireless supply step of wirelessly supplying a signal indicating second information for changing a function of the predetermined signal processing of the first signal processing apparatus to the first signal processing apparatus.

A program of a recording medium of the present invention includes: a wired supply step of supplying, to a first signal processing apparatus for performing predetermined signal processing on an input signal and for outputting the processed signal, a signal indicating first information to be used in the predetermined signal processing of the first signal processing apparatus; and a wireless supply step of wirelessly supplying a signal indicating second information for changing a function of the predetermined signal processing of the first signal processing apparatus to the first signal processing apparatus.

A program of the present invention includes: a wired supply step of supplying, to a first signal processing apparatus for performing predetermined signal processing on an input signal and for outputting the processed signal, a signal indicating first information to be used in the predetermined signal processing of the first signal processing apparatus; and a wireless supply step of wirelessly supplying a signal indicating second information for changing a function of the predetermined signal processing of the first signal processing apparatus to the first signal processing apparatus.

The signal processing apparatus may be a transmission dedicated apparatus for transmitting signals by wired or wireless connection, or a transceiver for transmitting and receiving signals by wired or wireless connection.

The first and second information may be information prestored in the signal processing apparatus, or information supplied from another apparatus to the signal processing apparatus.

According to the above-described signal processing systems, apparatuses, methods, recording media, and programs, it is possible to implement a system that can easily change a signal processing function. In this system, even if information for changing the signal processing function is updated, the updated information can be provided while maintaining security.

BRIEF DESCRIPTION OF THE DRAWINGS

FIG. 29 illustrates external devices to be connected to a wired interface or a wireless interface of the television receiver shown in FIG. 28; and FIG. 30 is a flowchart illustrating the processing of the television receiver shown in FIG. 28.

DESCRIPTION OF THE PREFERRED EMBODIMENTS

The present invention is described in detail below with reference to the accompanying drawings through illustration of preferred embodiments.

Figure 1:
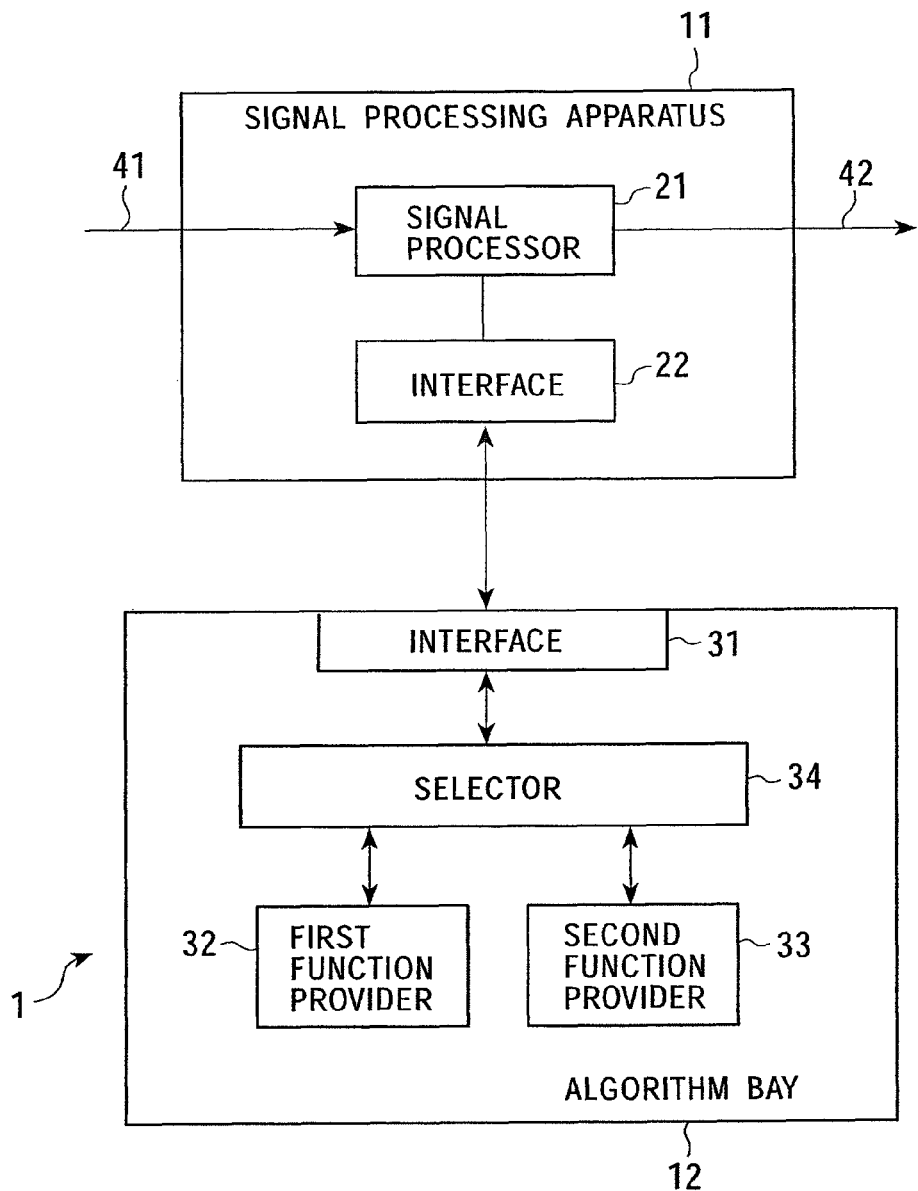
FIG. 1 is a block diagram schematically illustrating an example of a signal processing system to which the present invention is applied.

FIG. 1 is a block diagram illustrating a signal processing system 1 to which the present invention is applied.

The signal processing system 1 is formed of, as shown in FIG. 1, a signal processing apparatus 11 and an algorithm bay (trademark) 12, which serves as a board to be connected to the signal processing apparatus 11.

The signal processing apparatus 11 includes a signal processor 21 for performing predetermined signal processing on an input signal 41 and for outputting an output signal 42, and an interface 22 that communicates with the algorithm bay 12 by wired or wireless connection.

The algorithm bay 12 includes an interface 31 that communicates with the interface 22 of the information processing apparatus 11 by wired or wireless connection, a first function provider 32 for providing a first signal processing function of the signal processor 21, and a second function provider 33 for providing a second signal processing function of the signal processor 21.

The algorithm bay 12 also includes a selector 34 for selecting one of the first signal processing function provided by the first function provider 32 and the second signal processing function provided by the second function provider 33 based on the connection mode of the algorithm bay 12 with the signal processing apparatus 11 (such a mode is described in detail below), and for providing the selected function to the signal processing apparatus 11 via the interface 31.

In the example shown in FIG. 1, the algorithm bay 12 is formed as a board to be attached to the signal processing apparatus 11. Alternatively, the algorithm bay 12 may be formed as a device provided with the first function provider 32, the second function provider 33, and the selector 34.

An overview of the operation of the signal processing system 1 is as follows.

Figure 2:
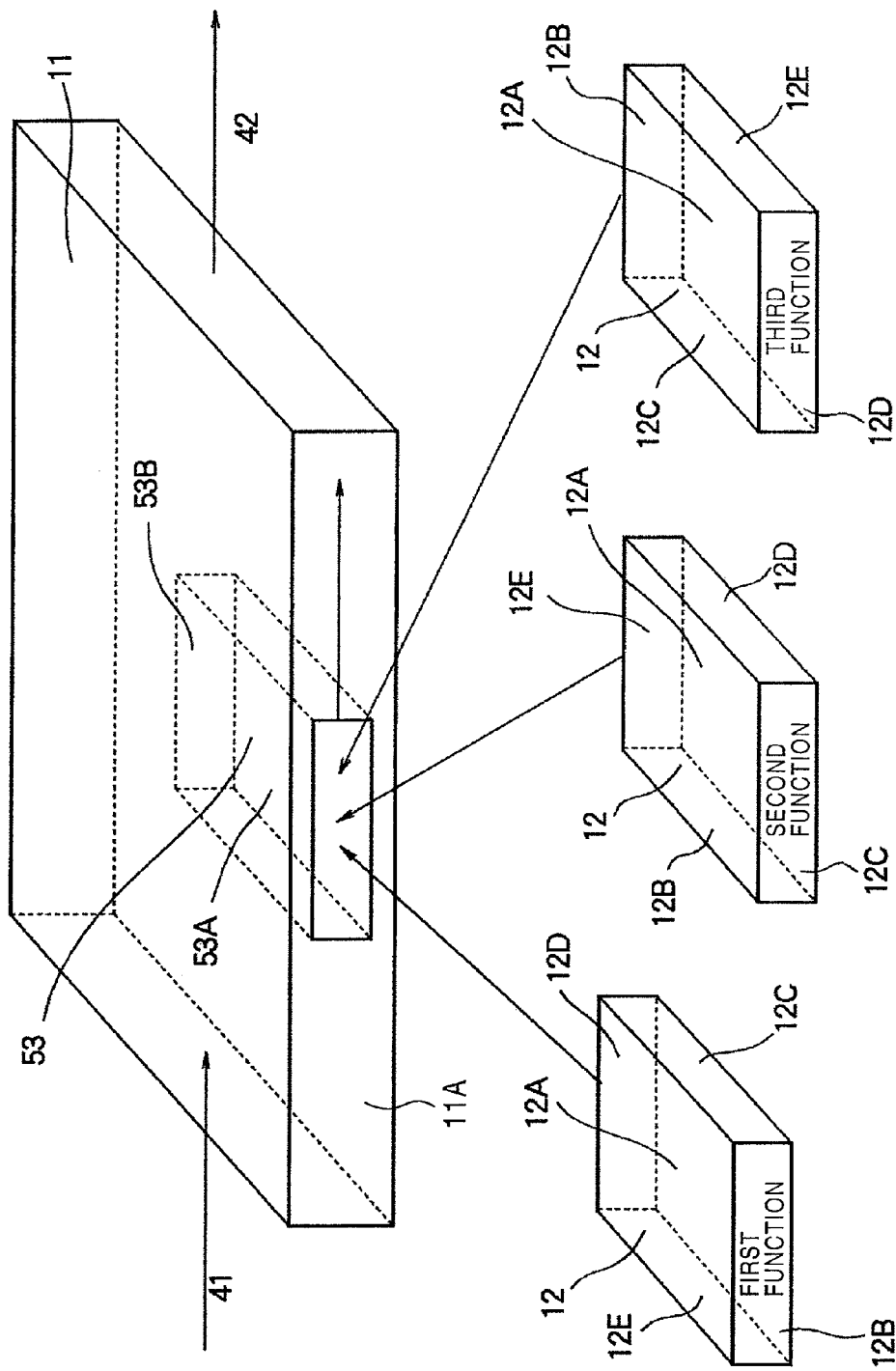
FIG. 2 illustrates an example of the connection modes of an algorithm bay with a signal processing apparatus in the signal processing system shown in FIG. 1.

As shown in FIG. 2, a slot 53 for receiving the algorithm bay 12 therein is provided at a front surface 11A of the signal processing apparatus 11, and the interface 31 (FIG. 1) of the algorithm bay 12 installed in the slot 53 is connected to the interface 22 (FIG. 1) of the signal processing apparatus 11 by wired connection.

The algorithm bay 12 has four side surfaces 12B through 12E perpendicular to the top surface 12A. The algorithm bay 12 is inserted to the signal processing apparatus 11 such that the top surface 12A is in contact with a top surface 53A of the slot 53.

With this configuration, as indicated in the left side portion of FIG. 2, when the algorithm bay 12 is inserted into the slot 53 so that the side surface 12B is flush with the front surface 11A of the signal processing apparatus 11, the selector 34 (FIG. 1) of the algorithm bay 12 selects the first signal processing function provided by the first function provider 32 as the signal processing function of the signal processor 21, and changes the function of the signal processor 21 to the selected first signal processing function via the interfaces 31 and 22. It is now assumed that the direction (connection mode) in which the algorithm bay 12 is inserted into the slot 53 (hereinafter referred to as the "insertion direction") is represented by the surface of the algorithm bay 12 which is in contact with a side surface 53B perpendicular to the top surface 53A of the slot 53. For example, in the above case, the insertion direction of the algorithm bay 12 is the side surface 12D.

When the algorithm bay 12 is inserted into the slot 53 so that the side surface 12C is flush with the front surface 11A of the signal processing apparatus 11 (when the insertion direction of the algorithm bay 12 is the side surface 12E), as indicated in the middle portion of FIG. 2, the selector 34 selects the second signal processing function provided by the second function provider 33 as the signal processing function of the signal processor 21, and changes the function of the signal processor 21 to the second signal processing function via the interfaces 31 and 22.

Specific examples of the first and second signal processing functions are discussed below.

In the example shown in FIG. 1, the number of signal processing functions of the signal processor 21 of the signal processing apparatus 11 is two, i.e., the first and second signal processing functions. However, the number of functions of the signal processor 21 to be changed by the algorithm bay 12 is not particularly restricted.

For example, the algorithm bay 12 may also be provided with a third function provider for providing a third signal processing function of the signal processor 21, though this is not shown in FIG. 1. In this case, when the algorithm bay 12 is inserted into the slot 53 so that the side surface 12D is flush with the front surface 11A of the signal processing apparatus 11 (when the insertion direction of the algorithm bay 12 is the side surface 12B), as indicated in the right portion of FIG. 2, the selector 34 selects the third signal processing function provided by the third function provider, and changes the function of the signal processor 21 to the selected third function via the interfaces 31 and 22.

The connection modes of the algorithm bay 12 with the signal processing apparatus 11 are not restricted to the above-described modes, and any mode can be employed as long as a plurality of modes are provided.

In the signal processing system 1 shown in FIG. 1, for example, if the algorithm bay 12 can be connected wirelessly to the signal processing apparatus 11 (if wireless connection is established between the interface 22 and the interface 31), the types of connection modes of the algorithm bay 12 can be distinguished by the distance between the interface (wireless interface) 31 of the algorithm bay 12 and the interface (wireless interface) 22 of the signal processing apparatus 11. Such a distance is hereinafter referred to as a "wireless communication distance".

Figure 3:
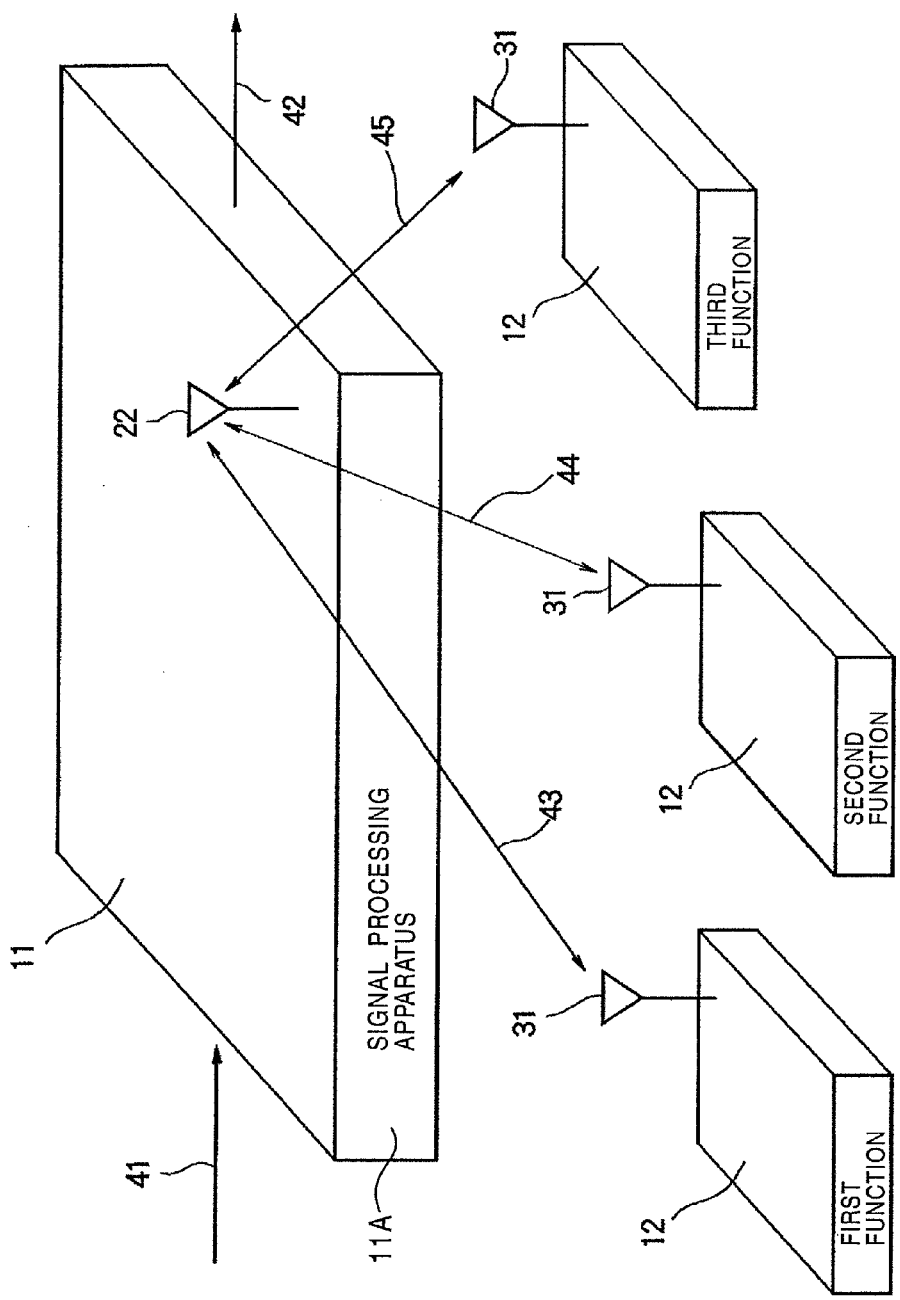
FIG. 3 illustrates another example of the connection modes of the algorithm bay with the signal processing apparatus in the signal processing system shown in FIG. 1.

More specifically, for example, if the wireless communication distance between the algorithm bay 12 and the signal processing apparatus 11 is a first length 43 (the longest distance), as indicated in the left side portion of FIG. 3, the selector 34 of the algorithm bay 12 selects the first signal processing function provided by the first function provider 32, and changes the function of the signal processor 21 to the selected first signal processing function via the interfaces 31 and 22.

If the wireless communication distance between the algorithm bay 12 and the signal processing apparatus 11 is a second length 44 (intermediate length), as indicated in the middle portion of FIG. 3, the selector 34 of the algorithm bay 12 selects the second signal processing function provided by the second function provider 33 as the signal processing function of the signal processor 21, and changes the function of the signal processor 21 to the selected second signal processing function via the interfaces 31 and 22.

It is now assumed, as discussed above, that the algorithm bay 12 also includes the third function provider for providing the third signal processing function of the signal processor 21. In this case, if the wireless communication distance between the algorithm bay 12 and the signal processing apparatus 11 is a third length 45 (the shortest), as indicated in the right portion of FIG. 3, the selector 34 of the algorithm bay 12 selects the third signal processing function provided by the third function provider as the signal processing function of the signal processor 21, and changes the function of the signal processor 21 to the selected third signal processing function via the interfaces 31 and 22.

An overview of the signal processing system 1 to which the present invention is applied has been described, and various embodiments of the signal processing system 1 can be implemented.

Different modes of implementing the signal processing system 1 are shown in FIGS. 4, 7, 9, and 12 as first through fourth embodiments, respectively.

First Embodiment

Figure 4:
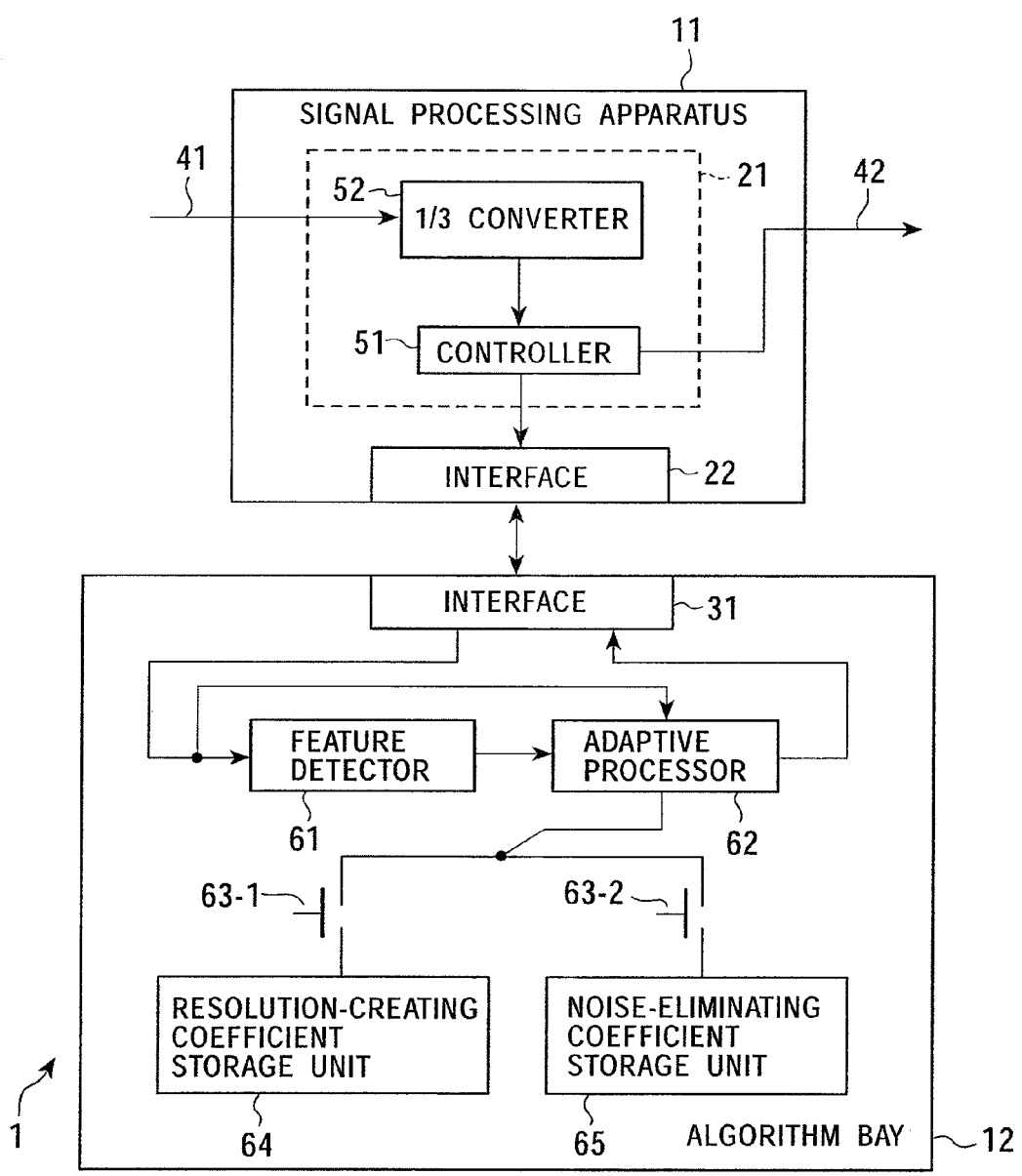
FIG. 4 is a block diagram illustrating the signal processing system shown in FIG. 1 according to a first embodiment of the present invention.

FIG. 4 is a block diagram schematically illustrating the signal processing system 1 according to the first embodiment of the present invention. The same elements as those shown in FIG. 1 are designated with like reference numerals.

In the first embodiment, the signal processor 21 converts the input signal 41, which serves as a composite signal, into component signals, and outputs them as the output signal 42.

More specifically, the signal processor 21 includes, as shown in FIG. 4, a controller 51 for controlling the overall processing of the signal processor 21, and a ⅓ converter 52 for converting the input signal 41, which serves as a composite signal, into component signals.

The component signals consist of three elements, for example, a luminance signal component (Y) and two chrominance signal components (blue-luminance (B-Y) signal component and red-luminance (R-Y) signal component), or a red signal component (R), a green signal component (G), and a blue signal component (B). The composite signal is synthesized from a signal corresponding to the above-mentioned three elements, a synchronization signal, and a color burst signal. For example, a television-broadcast NTSC signal is a composite signal.

Accordingly, in this example, the ⅓ converter 52 converts one composite signal into component signals consisting of three independent signals (in this example, a luminance signal (Y), a blue-luminance signal (B-Y), and a red-luminance signal (R-Y)). Thus, the processing performed by the ⅓ converter 52 is referred to as "⅓ conversion processing".

The algorithm bay 12 shown in FIG. 4 performs classification adaptive processing on the component signals generated by the ⅓ converter 52 of the signal processing apparatus 11, and provides the processing result (processed component signals) to the signal processing apparatus 11.

The classification adaptive processing is the following type of processing, previously proposed by the assignee of the present application.

The classification adaptive processing includes classification processing and adaptive processing: signals (data) are classified based on the features thereof, and adaptive processing is performed on each class.

In this embodiment, as an example of the classification adaptive processing, processing for improving the spatial resolution of an image signal, and more specifically, adaptive processing for improving the spatial resolution by converting a standard-definition image signal (hereinafter sometimes referred to as an "SD image signal") into a high-definition image signal (hereinafter sometimes referred to as an "HD image signal") is discussed.

In this case, in the adaptive processing, by performing linear coupling of pixels forming an SD image (hereinafter sometimes referred to as "SD pixels") with predetermined tap coefficients, predictive values of pixels forming an HD image having an improved spatial resolution over the SD image are determined, thereby obtaining an image with higher definition.

More specifically, a certain HD image is set as supervisor data, while an SD image generated by decreasing the resolution of the HD image is set as learner data. It is now considered that the predictive values E[y] of the pixel values y of the pixels forming the HD'image (hereinafter sometimes referred to as "HD pixels") are determined by a linear primary coupling model, which is defined by linear coupling of a set of pixel values x1, x2, and so on, of the SD pixels with predetermined tap coefficients w1, w2, and so on. In this case, the predictive value E[y] is expressed by equation (1).

$$E[y] = w1 \times 1 + w2 \times 2 + \qquad (1)$$

To generalize equation (1), a matrix W consisting of a set of tap coefficients wj, a matrix X consisting of a set of learner data xij, and matrix Y' consisting of predictive values E[yi] are defined as expressed by equation (2).

$$X = \begin{bmatrix} x_{11} & x_{12} & \cdots & x_{1J} \\ x_{21} & x_{22} & \cdots & x_{2J} \\ \cdots & \cdots & \cdots & \cdots \\ x_{I1} & x_{I2} & \cdots & x_{IJ} \end{bmatrix}, \qquad (2)$$

$$W = \begin{bmatrix} w_1 \\ w_2 \\ \cdots \\ w_J \end{bmatrix},$$

$$Y' = \begin{bmatrix} y_1 \\ y_2 \\ \cdots \\ y_I \end{bmatrix}$$

From equation (2), an observation equation expressed by equation (3) holds true.

$$XY = Y' \qquad (3)$$

In equation (3), the component xij of matrix X means the j-th learner data of the i-th set of leaner data (set of learner data used for predicting the i-th set of supervisor data yi); the component wj of matrix W indicates the tap coefficient to be multiplied with the j-th learner data of a set of learner data; yi designates the i-th set of learner data; and thus, E[yi] represents the predictive value of the i-th set of supervisor data. The suffix i of the component yi of matrix Y is omitted from y at the left side of equation (1), and the suffix i of the component xij of matrix X is omitted from the component x1, x2, and so on at the right side of equation (1).

It is now considered that the predictive value E[y] close to the true pixel value y of an HD pixel is determined by applying the method of least squares to the observation equation (3). In this case, matrix Y consisting of a set of true pixel values y of the HD pixels forming the supervisor data, and matrix E consisting of residuals e of the predictive values E[y] for the true pixel values y of the HD pixels can be defined by equation (4).

$$E = \begin{bmatrix} e_1 \\ e_2 \\ \cdots \\ e_I \end{bmatrix}, \qquad (4)$$

$$Y = \begin{bmatrix} y_1 \\ y_2 \\ \cdots \\ y_I \end{bmatrix}$$

From equation (4), a residual equation expressed by equation (5) holds true.

$$XW = Y + E \qquad (5)$$

The tap coefficient wj for determining the predictive value E[y] close to the true pixel value y of an HD pixel can be determined by minimizing the square error expressed by equation (6).

$$\sum_{i=1}^{I} e_i^2 \qquad (6)$$

Accordingly, when the value obtained by differentiating the above-described square error by the tap coefficient wj is 0, namely, when equation (7) holds true, such a tap coefficient wj is the optimal value for determining the predictive value E[y] close to the true pixel value y of an HD pixel.

$$e_1 \frac{\partial e_1}{\partial w_j} + e_2 \frac{\partial e_2}{\partial w_j} + \ldots + e_I \frac{\partial e_I}{\partial w_j} = 0 \ (j = 1, 2, \ldots, J) \qquad (7)$$

Accordingly, by differentiating the above-described equation (5) with respect to the tap coefficient wj, equation (8) holds true.

$$\frac{\partial e_i}{\partial w_1} = x_{i1}, \frac{\partial e_i}{\partial w_2} = x_{i2}, \ldots, \frac{\partial e_J}{\partial w_J} = x_{iJ} \ (i = 1, 2, \ldots, I) \qquad (8)$$

Equation (9) can be found from the above-described equations (7) and (8).

$$\sum_{i=1}^{I} e_i x_{i1} = 0, \sum_{i=1}^{I} ei \ x_{i2} = 0, \ldots \sum_{i=1}^{I} ei \ x_{iJ} = 0 \qquad (9)$$

Considering the relationship of the learner data xij, the tap coefficient wj, the supervisor data yi, and the residual ei in the above-described residual equation (5), normal equations expressed by equations (10) can be found from equation (9).

$$\begin{cases} \left(\sum_{i=1}^{I} x_{i1}x_{i1}\right)w_1 + \left(\sum_{i=1}^{I} x_{i1}x_{i2}\right)w_2 + \ldots + \left(\sum_{i=1}^{I} x_{i1}x_{iJ}\right)w_J \\ = \left(\sum_{i=1}^{I} x_{i1}y_i\right) \\ \left(\sum_{i=1}^{I} x_{i2}x_{i1}\right)w_1 + \left(\sum_{i=1}^{I} x_{i2}x_{i2}\right)w_2 + \ldots + \left(\sum_{i=1}^{I} x_{i2}x_{iJ}\right)w_J \\ = \left(\sum_{i=1}^{I} x_{i2}y_i\right) \\ \left(\sum_{i=1}^{I} x_{iJ}x_{i1}\right)w_1 + \left(\sum_{i=1}^{I} x_{iJ}x_{i2}\right)w_2 + \ldots + \left(\sum_{i=1}^{I} x_{iJ}x_{iJ}\right)w_J \\ = \left(\sum_{i=1}^{I} x_{iJ}y_i\right) \end{cases} \quad (10)$$

In the normal equations expressed by equations (10), matrix (covariance matrix) A and the vector v are defined as expressed by equation (11).

$$A = \begin{bmatrix} \sum_{i=1}^{I} x_{i1}x_{i1} & \sum_{i=1}^{I} x_{i1}x_{i2} & \ldots & \sum_{i=1}^{I} x_{i1}x_{iJ} \\ \sum_{i=1}^{I} x_{i2}x_{i1} & \sum_{i=1}^{I} x_{i2}x_{i2} & \ldots & \sum_{i=1}^{I} x_{i2}x_{ij} \\ \sum_{i=1}^{I} x_{iJ}x_{i1} & \sum_{i=1}^{I} x_{iJ}x_{i2} & \ldots & \sum_{i=1}^{I} x_{iJ}x_{iJ} \end{bmatrix} \quad (11)$$

$$v = \begin{bmatrix} \sum_{i=1}^{I} x_{i1}y_1 \\ \sum_{i=1}^{I} x_{i2}y_1 \\ \sum_{i=1}^{I} x_{iJ}y_1 \end{bmatrix}$$

When matrix W is defined by the above-described equation (2), equation (10) can be modified using equation (12).

$$AW = v \quad (12)$$

The same number of normal equations in equations (10) as the number J of tap coefficients wj to be found can be established by preparing a certain number of sets of learner data xij and a certain number of sets of supervisor data yi. Accordingly, by solving the above-described equation (12) with respect to matrix W (in order to solve equation (12), matrix A must be nonsingular), the optimal tap coefficient wj can be determined. For solving equation (12), a sweep-out method (Gauss-Jordan elimination) can be employed.

As described above, by using learner data and supervisor data, learning is conducted to determine the optimal tap coefficient wj for predicting the supervisor data from the learner data and the tap coefficients, and by using the determined optimal tap coefficient wj, the predictive value E[y] close to the true supervisor data y is determined based on the above-described equation (1). This is adaptive processing.

The adaptive processing is different from mere interpolation processing in that components which are not contained in an SD image but which are contained in an HD image are reproduced. More specifically, from the above-described equation (1), the adaptive processing is apparently similar to the interpolation processing using a so-called interpolation filter. However, the tap coefficients w, which are equivalent to the tap coefficients of an interpolation filter, are found by learning by using supervisor data and learner data, thereby making it possible to reproduce components contained in an HD image. Accordingly, it has been proved that the adaptive processing has the function of creating images (creating resolution).

Thus, in order to clearly it distinguish from the other types of adaptive processing, the above-described adaptive processing is referred to as "resolution-creating adaptive processing". The tap coefficients used for performing the resolution-creating adaptive processing are referred to as "resolution-creating coefficients".

In the above-described example, the adaptive processing has been discussed in the context of an improvement in the spatial resolution. However, by using various tap coefficients obtained by using different supervisor data and learner data by learning, other types of processing can be performed to increase the signal-to-noise (S/N) ratio or reduce blurring.

More specifically, for improving the S/N ratio or reducing blurring by performing adaptive processing, image data having a higher S/N ratio is used as supervisor data, and an image generated by reducing the S/N ratio of the supervisor data (or blurred image) is used as learner data, and by using the supervisor data and the learner data, tap coefficients can be determined.

This type of adaptive processing is referred to as "noise-eliminating adaptive processing" in order to distinguish it from other types of adaptive processing. The tap coefficients used for the noise-eliminating adaptive processing are referred to as "noise-eliminating coefficients".

Details of the resolution-creating adaptive processing and the resolution-creating coefficients, and the noise-eliminating adaptive processing and the noise-eliminating coefficients are disclosed in, for example, Japanese Patent Application No. 2001-110695, previously filed by the assignee of the present application.

An overview of the classification adaptive processing has been described, and the algorithm bay 12 shown in FIG. 4 performs such classification adaptive processing.

More specifically, the algorithm bay 12 is provided with the interface 31, a feature detector 61, and an adaptive processor 62. The feature detector 61 performs the above-described classification processing by detecting the features of the component signals supplied from the signal processing apparatus 11 (i.e., the component signals generated by the ⅓ converter 52 and supplied via the controller 51, the interface 22, and the interface 33) and by determining the class corresponding to the detected features. The adaptive processor 62 performs the above-described adaptive processing on the component signals supplied from the signal processing apparatus 11 by using predetermined tap coefficients associated with the class determined by the feature detector 61, and supplies the processed component signals to the signal processing apparatus 11 via the interface 31.

The algorithm bay 12 is also provided with switches 63-1 and 63-2 for selecting the tap coefficients to be used in adaptive processing performed by the adaptive processor 62, a resolution-creating coefficient storage unit 64 for storing resolution-creating coefficients to be used in the resolution-creating adaptive processing performed by the adaptive processor 62, and a noise-eliminating coefficient storage unit 65 for storing noise-eliminating coefficients to be used in the noise-eliminating adaptive processing performed by the adaptive processor 62.

Figure 5:
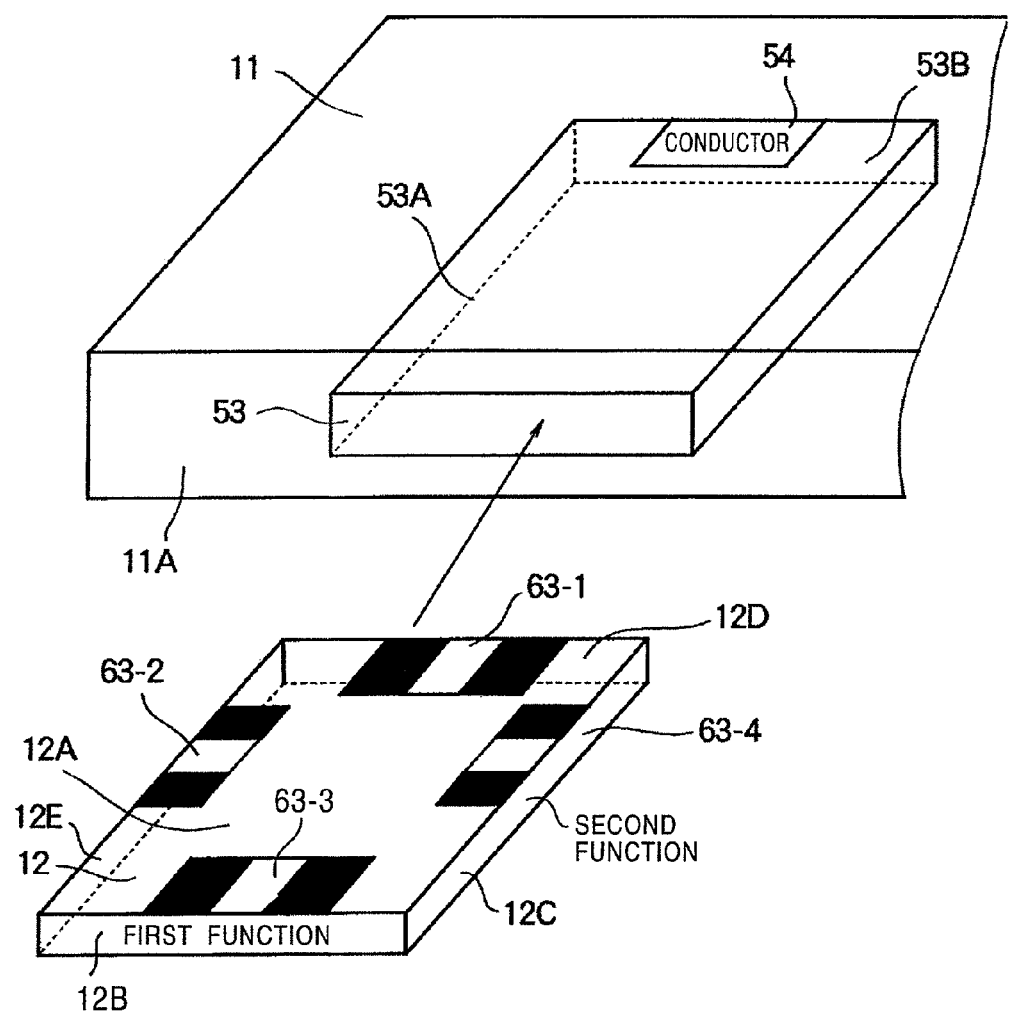
FIG. 5 illustrates switches provided for the algorithm bay shown in FIG. 4.

In this example, the switches 63-1 and 63-2 are mechanical switches, which are formed, as shown in FIG. 5, on the top surface 12A (or the surface opposing the top surface 12A) of the algorithm bay 12. The switch 63-1 or 63-2 is brought into contact with a conductor 54 formed on the top surface 53A of the slot 53 of the signal processing apparatus 11, and then, it is turned on by being electrically connected across the switch 63-1 or 63-2.

That is, when the algorithm bay 12 is inserted into the slot 53, the conductor 54 is in contact with one of the switches 63-1 and 63-2 according to the insertion direction of the algorithm bay 12.

As stated above, the insertion direction is designated by the surface of the algorithm bay 12 that is in contact with the surface 53B of the slot 53.

That is, when the algorithm bay 12 is inserted into the slot 53 so that the surface 12D is flush with the surface 53B of the slot 53, as shown in FIG. 5, the switch 63-1 contacts the conductor 54, and is thus turned on.

In contrast, when the algorithm bay 12 is inserted into the slot 53 so that the surface 12E is flush with the surface 53B of the slot 53, as indicated in the middle portion of FIG. 2, the switch 63-2 contacts the conductor 54, and is thus turned on.

In this example, as shown in FIG. 5, the words "first function" are printed on the side surface 12B of the algorithm bay 12, and the words "second function" are printed on the side surface 12C of the algorithm bay 12.

This allows the user to easily distinguish the functions corresponding to the insertion directions when the algorithm bay 12 is installed in the signal processing apparatus 11.

That is, for example, when inserting the algorithm bay 12 into the slot 53 of the signal processing apparatus 11 so that the side surface 12B on which the words "first function" are printed faces the front surface 11A of the signal processing apparatus (so that the insertion direction is the side surface 12D), the user is able to identify the function assigned to the "first function" by visually checking the words printed on the side surface 12B.

In the example shown in FIG. 5, the "first function" is implemented when the switch 63-1 is turned on. That is, according to the first function, the adaptive processor 62 of the algorithm bay 12 shown in FIG. 4 performs the resolution-creating adaptive processing by using the resolution-creating coefficients stored in the resolution-creating coefficient storage unit 64.

In contrast, when inserting the algorithm bay 12 into the slot 53 of the signal processing apparatus 11 so that the side surface 12C on which the words "second function" are printed faces the front surface 11A of the signal processing apparatus 11 (so that the insertion direction is the side surface 12E), the user is able to identify the function assigned to the "second function" by visually checking the words printed on the side surface 12C.

In the example shown in FIG. 5, the "second function" is implemented when the switch 63-2 is turned on. That is, the adaptive processor 62 of the algorithm bay 12 shown in FIG. 4 performs the noise-eliminating adaptive processing by using the noise-eliminating coefficients stored in the noise-eliminating coefficient storage unit 65.

In the example shown in FIG. 5, the user is able to identify the corresponding function by the use of words. However, other modes may be employed as long as the first function is indicated at a first position (for example, the side surface 12B) corresponding to the first connection mode (first insertion direction), and the second function is indicated at a second position (for example, the side surface 12C) corresponding to the second connection mode (second insertion direction).

In the first embodiment shown in FIG. 4, switches 63-3 and 63-4 shown in FIG. 5 are not used. By utilizing these switches 63-3 and 63-4, however, the algorithm bay 12 is able to provide other information (functions) to the signal processing apparatus 11, as described below.

Figure 6:
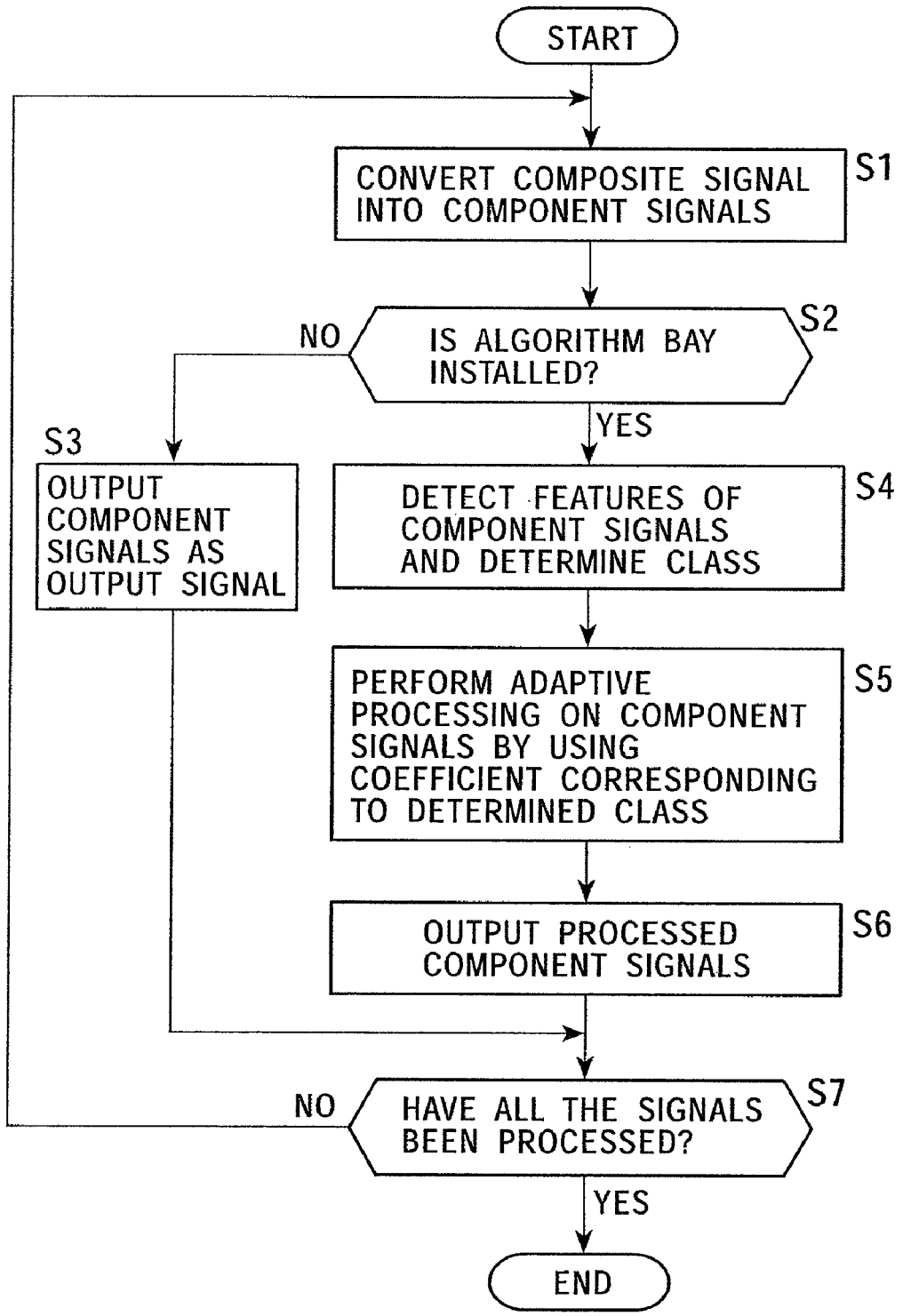
FIG. 6 is a flowchart illustrating the processing of the signal processing system shown in FIG. 4.

An example of the processing performed by the signal processing system 1 shown in FIG. 4 is discussed below with reference to the flowchart of FIG. 6.

In this example, the input signal 41 is a composite signal.

In step S1, the ⅓ converter 52 of the signal processing apparatus 11 converts the composite signal (input signal 41) into component signals, and provides them to the controller 51.

In step S2, the controller 51 determines whether the algorithm bay 12 is installed in the slot 53.

If it is found in step S2 that the algorithm bay 12 is not installed, the process proceeds to step S3. In step S3, the controller 51 outputs the component signals converted by the ⅓ converter 52 in step S1 as the output signal 42.

In contrast, if it is found in step S2 that the algorithm bay 12 is installed in the slot 53, the process proceeds to step S4. In step S4, the controller 51 supplies the component signals converted by the ⅓ converter 52 in step S1 to the feature detector 61 of the algorithm bay 12 via the interface 22 and the interface 31. In this case, the feature detector 61 detects the features of the component signals, and determines the class of the component signals based on the detected features. The feature detector 61 then supplies the class code of the determined class to the adaptive processor 62.

In step S5, the adaptive processor 62 identifies the function in accordance with the switch that is turned on, i.e., based on the insertion direction of the algorithm bay 12. The adaptive processor 62 then performs adaptive processing on the component signals by using the coefficients corresponding to the class determined by the feature detector 61 in step S4 stored in the corresponding coefficient storage unit, and supplies the processing component signals to the controller 51 via the interfaces 31 and 22.

More specifically, when the algorithm bay 12 is installed in the slot 53 so that the switch 63-1 is turned on (the insertion direction is the side surface 12D), the adaptive processor 62 performs the resolution-creating adaptive processing on the component signals supplied from the signal processing apparatus 11 by using the resolution-creating coefficients stored in the resolution-creating coefficient storage unit 64, and supplies the processed component signals to the signal processing apparatus 11 via the interface 31.

Conversely, when the algorithm bay 12 is installed in the slot 53 so that the switch 63-2 is turned on (the insertion direction is the side surface 12E), the adaptive processor 62 performs the noise-eliminating adaptive processing on the component signals supplied from the signal processing apparatus 11 by using the noise-eliminating coefficients stored in the noise-eliminating coefficient storage unit 65, and supplies the processed component signals to the signal processing apparatus 11 via the interface 31.

In other words, the signal processing apparatus 11 shown in FIG. 4 has the first function of converting the input signal 41, which is a composite signal, into component signals, and performing the resolution-creating adaptive processing (classification adaptive processing using the resolution-creating coefficients, which serve as first coefficients) on the component signals so as to output them as the output signal 42, and the second function of converting the input signal 41, which is a composite signal, into component signals, and performing the noise-eliminating adaptive processing (classification adaptive processing using the noise-eliminating coefficients, which serve as second coefficients) on the component signals so as to output them as the output signal 42.

The first function and the second function can be selected by the switches 63-1 and 63-2, respectively. In other words, the signal processing function of the signal processing apparatus 11 can be changed to the first or second function according to the connection mode (insertion direction) of the algorithm bay 12 with the signal processing apparatus 11.

As stated above, the number of signal processing functions provided for the signal processing apparatus 11 to be changed by the algorithm bay 12 is not particularly restricted. In the example in FIG. 4, the switches 63-3 and 63-4 shown in FIG. 5 are not used. However, by connecting new tap-coefficient storage units (not shown) to the switches 63-3 and 63-4, the algorithm bay 12 is able to provide two additional functions (classification adaptive processing functions) to the signal processing apparatus 11.

In step S6, the controller 51 of the signal processing apparatus 11 outputs the component signals subjected to the adaptive processing in step S5 as the output signal 42.

In step S7, the controller 51 determines whether all the input signals 41 have been processed.

If the outcome of step S7 is no, the controller 51 returns to step S1, and repeats step S1 and the subsequent steps. That is, all the input signals 41, which are composite signals, are converted into component signals (if necessary, classification adaptive processing is also performed), and are output to an external source as the output signals 42.

Then, when all the input signals 41 are converted into component signals (when the final output signal 42 is output), it is determined in step S7 that all the input signals 41 have been processed, and the processing is completed.

Second Embodiment

Figure 7:
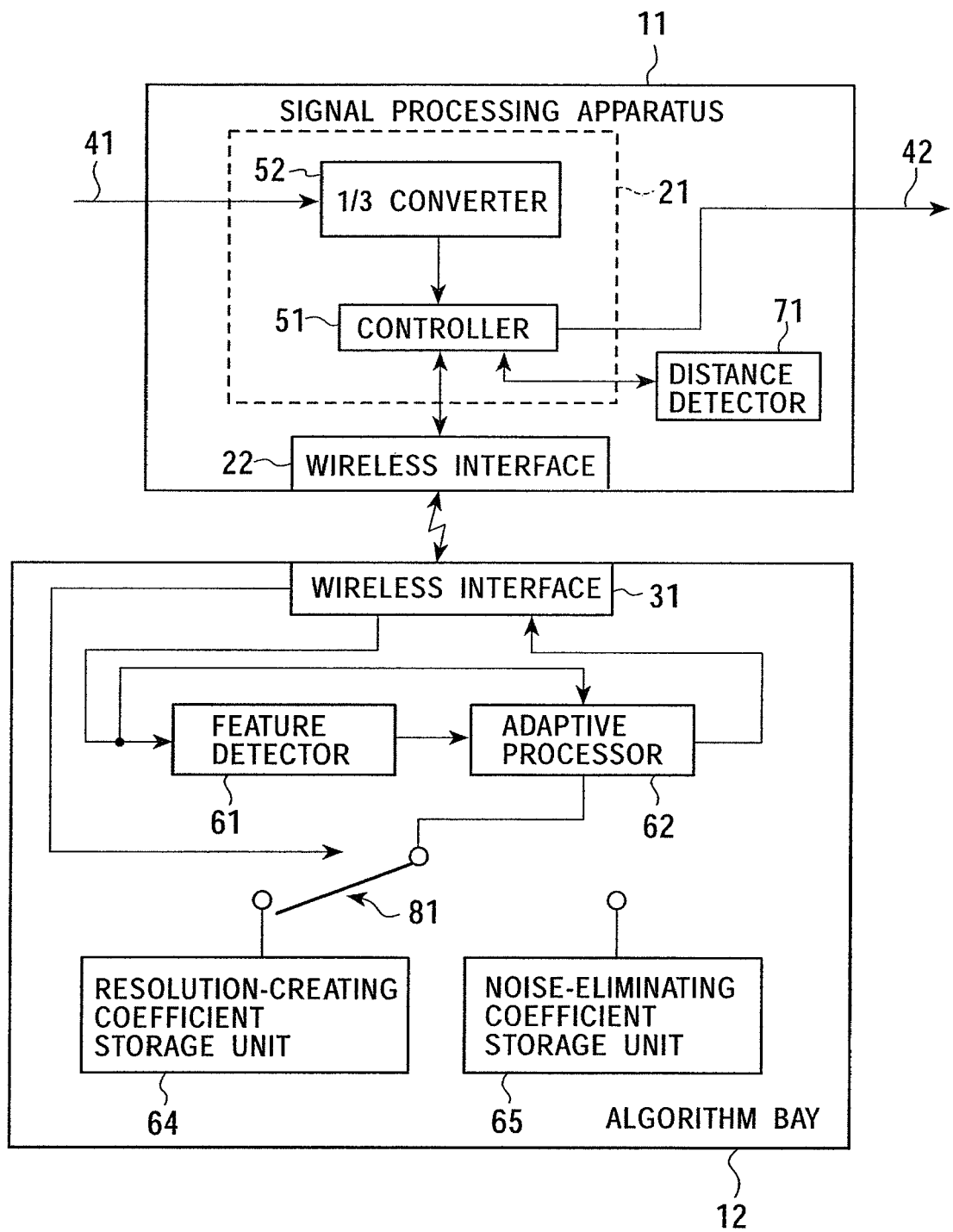
FIG. 7 is a block diagram illustrating the signal processing system shown in FIG. 1 according to a second embodiment of the present invention.

FIG. 7 is a block diagram schematically illustrating the signal processing system 1 according to the second embodiment of the present invention. The same elements as those shown in FIG. 4 are designated with like reference numerals.

The structure of the signal processor 21 of the signal processing apparatus 11 shown in FIG. 7 is basically similar to the counterpart shown in FIG. 4, except that the interface 22 is a wireless interface, namely, wireless connection is established between the signal processing apparatus 11 and the algorithm bay 12.

Accordingly, as stated above, in the first embodiment (FIG. 4), the connection mode of the algorithm bay 12 with the signal processing apparatus 11 is determined by the insertion direction of the algorithm bay 12 to the signal processing apparatus 11. However, in the second embodiment (FIG. 7), the connection mode of the algorithm bay 12 with the signal processing apparatus 11 is determined, as shown in FIG. 3, by the wireless communication distance (distance between the wireless interface 22 and the wireless interface 31).

In the example shown in FIG. 7, the signal processing apparatus 11 is also provided with a distance detector 71.

A detection method for the wireless communication distance by the distance detector 71 is not particularly restricted. For example, the wireless communication distance can be detected based on, for example, the intensity of radio waves (electric field), the error rate of wireless communication (packet loss), or the phase difference of the clock.

The function of the algorithm bay 12 shown in FIG. 7 is basically similar to that of FIG. 4.

Accordingly, the algorithm bay 12 shown in FIG. 7 also includes the feature detector 61, the adaptive processor 62, the resolution-creating coefficient storage unit 64, and the noise-eliminating coefficient storage unit 65, as in the algorithm bay 12 of FIG. 4.

In the second embodiment, however, since the signal processing apparatus 11 and the algorithm bay 12 are wirelessly connected, the interface 31 serves as a wireless interface.

Also, as described above, since the connection mode between the signal processing apparatus 11 and the algorithm bay 12 is specified by the wireless communication distance therebetween, a switch 81 is provided instead of the switches 63-1 and 63-2 shown in FIG. 4.

The direction of the switch 81 is changed by wireless control of the controller 51 of the signal processing apparatus 11 via the wireless interfaces 22 and 31. That is, the controller 51 changes the direction of the switch 81 to the resolution-creating coefficient storage unit 64 or the noise-eliminating coefficient storage unit 65 based on the wireless communication distance detected by the distance detector 71.

Figure 8:
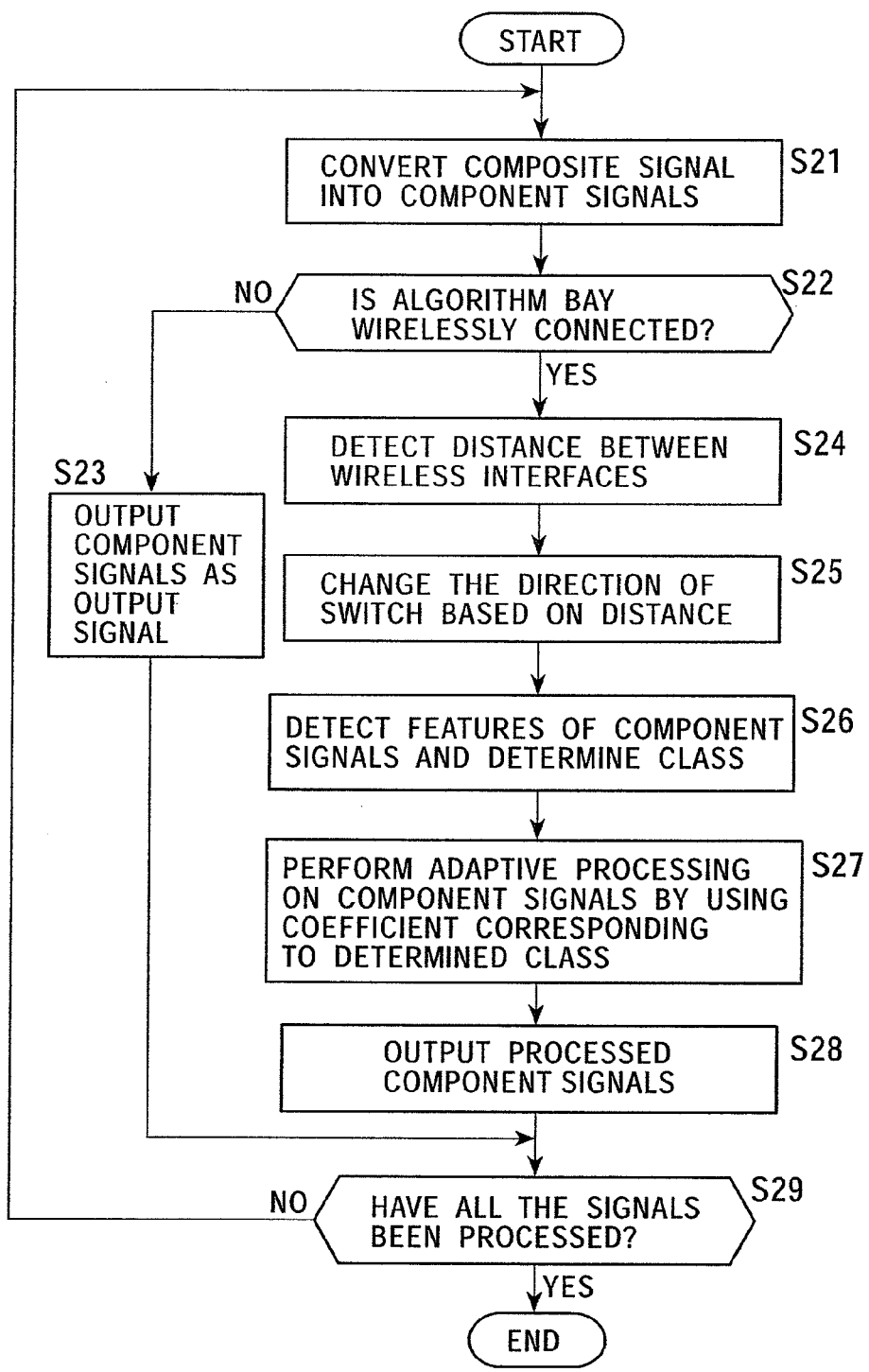
FIG. 8 is a flowchart illustrating the processing of the signal processing system shown in FIG. 7.

The processing of the signal processing system 1 shown in FIG. 7 is described below with reference to the flowchart of FIG. 8. Basically, the processing of the signal processing system 1 shown in FIG. 7 is similar to that shown in FIG. 4. That is, steps S21 through S29 shown in FIG. 8 are basically similar to steps S1 through S7 shown in FIG. 6.

However, steps S24 through S28 are slightly different from steps S4 through S6 of FIG. 6, and thus, a description of only step S24 through S28 is given below.

It is determined in step S22 whether the algorithm bay 12 shown in FIG. 7 is wirelessly connected to the signal processing apparatus 11. If the outcomes of step S22 is yes, the process proceeds to step S24. In step S24, the distance detector 71 of the signal processing apparatus 11 detects the distance between the wireless interfaces 22 and 31 under the control of the controller 51, and supplies the detected distance to the controller 51.

In this case, a determination of step S22 is made by determining whether the controller 51, for example, is able to wirelessly connected to the algorithm bay 12 via the wireless interface 22 (whether the intensity of radio waves (electric field) detected by the distance detector 71 reaches a predetermined level).

In step S25, the controller 51 connects the switch 81 to the resolution-creating coefficient storage unit 64 or the noise-eliminating coefficient storage unit 65 via the wireless interfaces 22 and 31 according to the distance detected by the distance detector 71 in step S24.

The controller 51 then supplies component signals converted by the ⅓ converter 52 in step S21 to the feature detector 61 and the adaptive processor 62 via the wireless interfaces 22 and 31. Then, in step S26, the feature detector 61 detects the features of the supplied component signals so as to determine the class of the features, and supplies the determined class to the adaptive processor 62.

In step S27, the adaptive processor 62 performs adaptive processing on the component signals by using the coefficient associated with the class determined by the feature detector 61 in step S26 and stored in the coefficient storage unit in accordance with the direction of the switch 81. The adaptive processor 62 then supplies the processed component signals to the controller 51 via the interfaces 31 and 22.

More specifically, when the switch 81 is connected to the resolution-creating coefficient storage unit 64, the adaptive processor 62 performs the resolution-creating adaptive processing on the component signals supplied from the signal processing apparatus 11 by using the corresponding resolution-creating coefficient stored in the resolution-creating coefficient storage unit 64, and wirelessly supplies the processed component signals to the signal processing apparatus 11 via the wireless interface 31.

In contrast, when the switch 81 is connected to the noise-eliminating coefficient storage unit 65, the adaptive processor 62 performs the noise-eliminating adaptive processing on the component signals supplied from the signal processing apparatus 11 by using the corresponding noise-eliminating coefficient stored in the noise-eliminating coefficient storage unit 65, and wirelessly supplies the processed component signals to the signal processing apparatus 11 via the wireless interface 31.

Then, in step S28, the controller 51 outputs the component signals subjected to the adaptive processing in step S27 as the output signal 42.

Third Embodiment

In the first and second embodiments, by using the signal processing functions provided for the signal processing apparatus 11, signals on which classification adaptive processing is performed by the algorithm bay 12 are output. That is, the functions of the signal processing apparatus 11 are switched by changing the tap coefficients used for the classification adaptive processing (by changing the functions of the classification adaptive processing) of the algorithm bay 12 according to the connection mode of the algorithm bay 12 with the signal processing apparatus 11.

In the third and fourth embodiments, the connection modes of the algorithm bay 2 with the signal processing apparatus 11 are related to cooperative devices. The cooperative device is specified by the connection mode, and then, the signal processing function of the signal processing apparatus 11 is changed to the function provided for the specified cooperative device.

Figure 9:
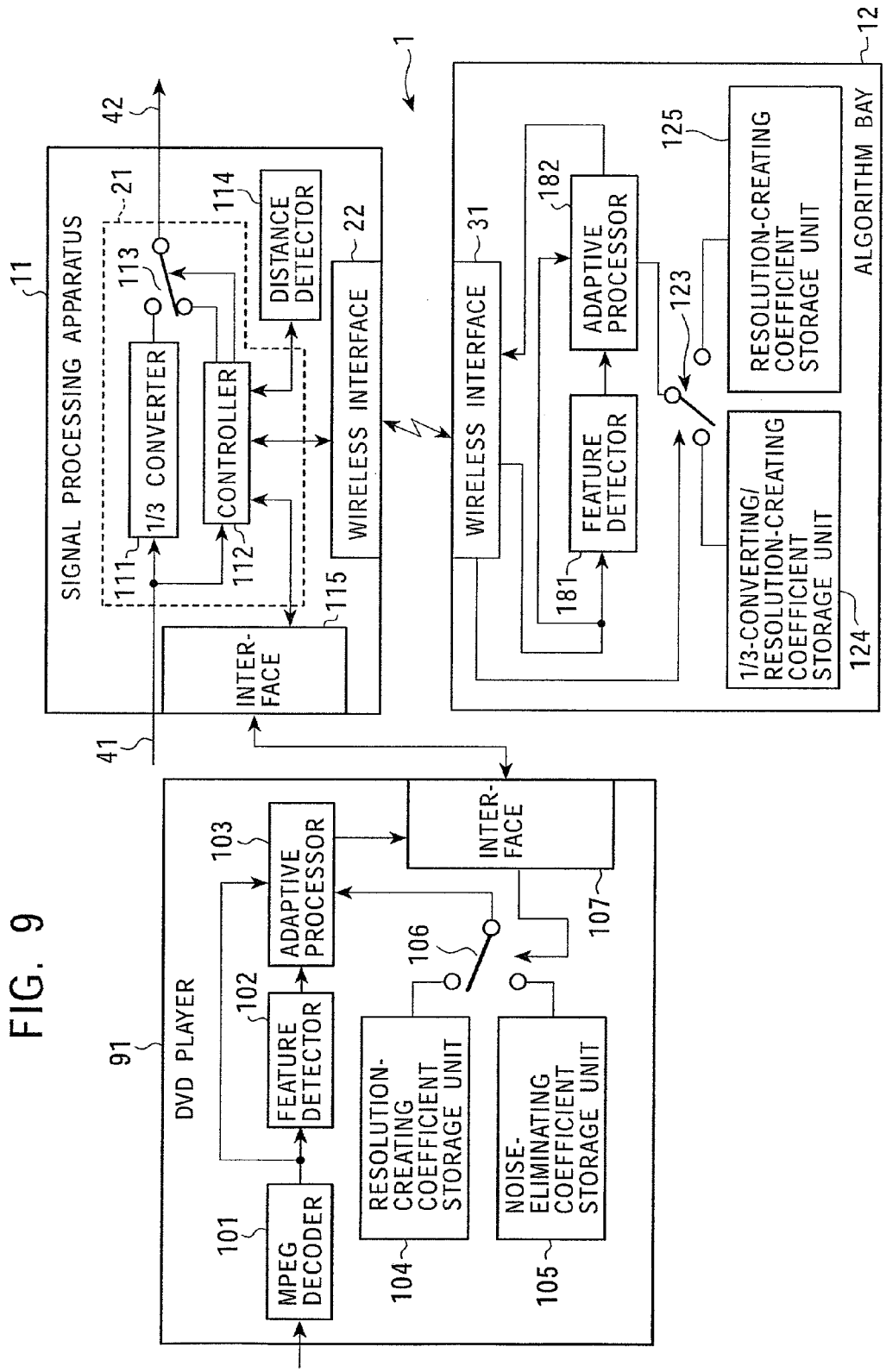
FIG. 9 is a block diagram illustrating the signal processing system shown in FIG. 1 according to a third embodiment of the present invention.

FIG. 9 is a block diagram schematically illustrating the signal processing system 1 according to the third embodiment of the present invention. The same elements as those shown in FIG. 1 are indicated by like reference numerals.

The signal processing apparatus 11 is provided with the signal processor 21, the wireless interface 22 that performs wireless communication with the algorithm bay 12, a distance detector 114 for detecting the wireless communication distance between the signal processing apparatus 11 and the algorithm bay 12, and an interface 115 that performs communication with a digital versatile disk (DVD) player 91, which serves as a cooperative device.

The signal processor 21 includes a ⅓ converter 111, a controller 112, and a switch 113.

The direction of the switch 113 is changed under the control of the controller 112. When the switch 113 is connected to the ⅓ converter 111, component signals converted from the input signal 41, which is a composite signal, by the ⅓ converter 111 are output as the output signal 42. When the switch 113 is connected to the controller 112, component signals output from the controller 112 (supplied from the algorithm bay 12, which is described below) are output as the output signal 42.

The configuration of the algorithm bay 12 shown in FIG. 9 is basically similar to that shown in FIG. 7. That is, the wireless interface 31, a feature detector 121, an adaptive processor 122, and a switch 123 are basically similar to the wireless interface 31, the feature detector 61, the adaptive processor 62, and the switch 81, respectively, shown in FIG. 7. However, the resolution-creating coefficient storage unit 64 and the noise-eliminating coefficient storage unit 65 shown in FIG. 7 are substituted by a ⅓-converting/resolution-creating coefficient storage unit 124 and a resolution-creating coefficient storage unit 125 shown in FIG. 9.

Tap coefficients stored in the ⅓-converting/resolution-creating coefficient storage unit 124 are briefly discussed below.

The adaptive processor 122 is able to simultaneously perform processing for converting a composite signal into component signals (⅓ conversion) and processing for improving the spatial resolution. In this case, tap coefficients are determined according to the above-described equations by using HD signals of component signals as supervisor data and SD signals generated by decreasing the spatial resolution of the supervisor data and also by converting the resulting signals into composite signals as learner data.

Such adaptive processing is hereinafter referred to as "⅓-converting/resolution-creating adaptive processing" in order to distinguish it from other types of adaptive processing. The tap coefficients used in the ⅓-converting/resolution-creating adaptive processing are referred to as "⅓-converting/resolution-creating coefficients".

The ⅓-converting/resolution-creating coefficient storage unit 124 stores the ⅓-converting/resolution-creating coefficients.

The DVD player 91, which is a cooperative device, is provided with an MPEG decoder 101 for reading and decoding image data (which is recorded in a DVD) encoded by an MPEG method, and outputting the decoded data as component signals, a feature detector 102, and an adaptive processor 103, both of which perform the above-described classification adaptive processing on the component signals supplied from the MPEG decoder 101.

The DVD player 91 also includes a switch 106 for selecting the tap coefficients used in the adaptive processing performed by the adaptive processor 103, a resolution-creating coefficient storage unit 104 for storing resolution-creating coefficients used in the resolution-creating adaptive processing by the adaptive processor 103, a noise-eliminating coefficient storage unit 105 for storing noise-eliminating coefficients used in the noise-eliminating adaptive processing by the adaptive processor 103, and an interface 107 that communicates with the interface 115 of the signal processing apparatus 11.

The switch 106 is normally connected to the resolution-creating coefficient storage unit 104. However, when the DVD player 91 performs classification adaptive processing in cooperation with the algorithm bay 12, the switch 106 is changed to the noise-eliminating coefficient storage unit 105 under the control of the controller 112 of the signal processing apparatus 11 via the interfaces 115 and 107.

An example of the processing of the signal processing system 1 shown in FIG. 9 is described below with reference to the flowcharts of FIGS. 10 and 11.

It is now assumed that the interface 115 of the signal processing apparatus 11 and the interface 107 of the DVD player 91 have been connected.

Figure 10:
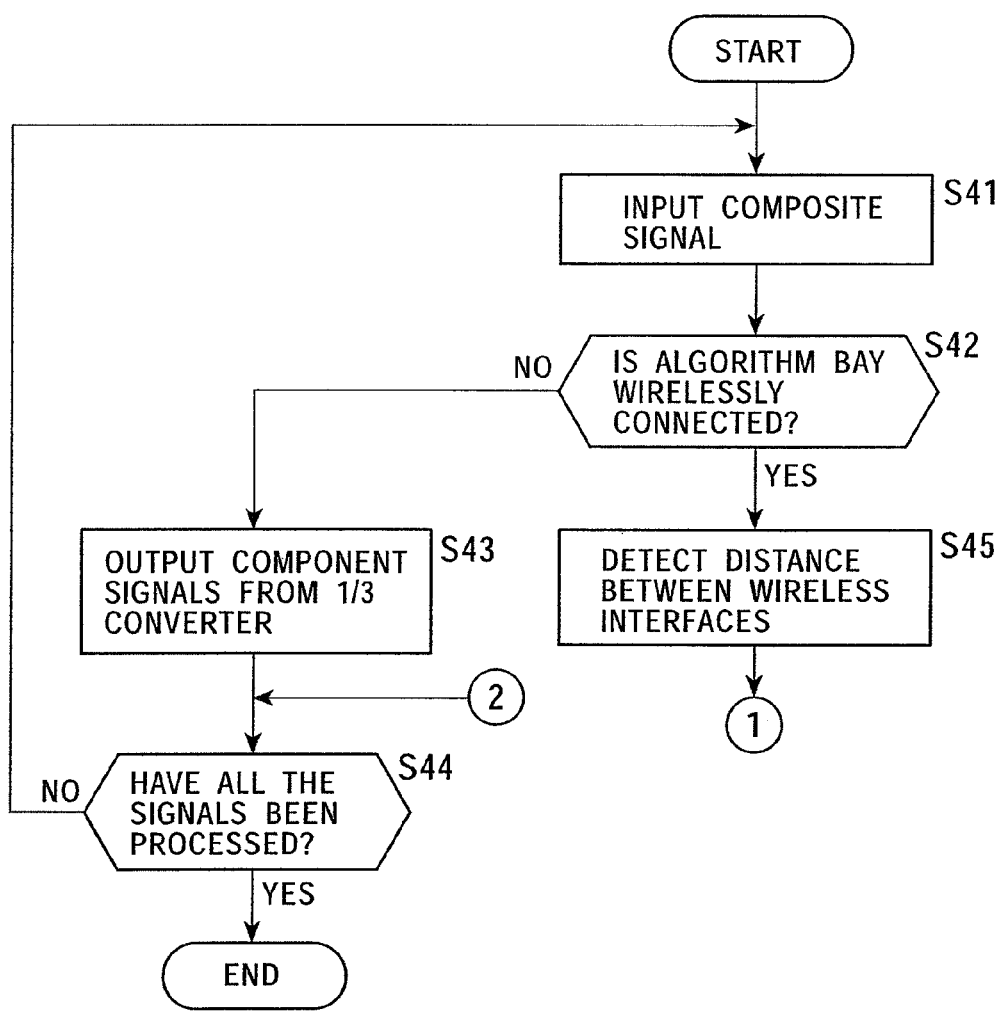
FIGS. 10 and 11 are flowcharts illustrating the processing of the signal processing system shown in FIG. 9.

In step S41 of FIG. 10, the signal processor 21 of the signal processing apparatus 11 receives a composite signal (input signal 41).

In step S42, the controller 112 of the signal processing apparatus 11 determines whether the algorithm bay 12 is wirelessly connected to the signal processing apparatus 11.

If it is found in step S42 that the algorithm bay 12 is not wirelessly connected, the process proceeds to step S43 in which the controller 112 outputs the component signals supplied from the ⅓ converter 111 as the output signal 42.

More specifically, the controller 112 connects the switch 113 to the ⅓ converter 111. Then, the input signal 41 is converted into component signals by the ⅓ converter 111, and is output to an external source as the output signal 42.

If it is found in step S42 that the algorithm bay 12 is wirelessly connected to the signal processing apparatus 11, the process proceeds to step S45. In step S45, the distance detector 114 detects the distance between the wireless interfaces 22 and 31 under the control of the controller 112, and supplies the detected distance to the controller 112.

Figure 11:
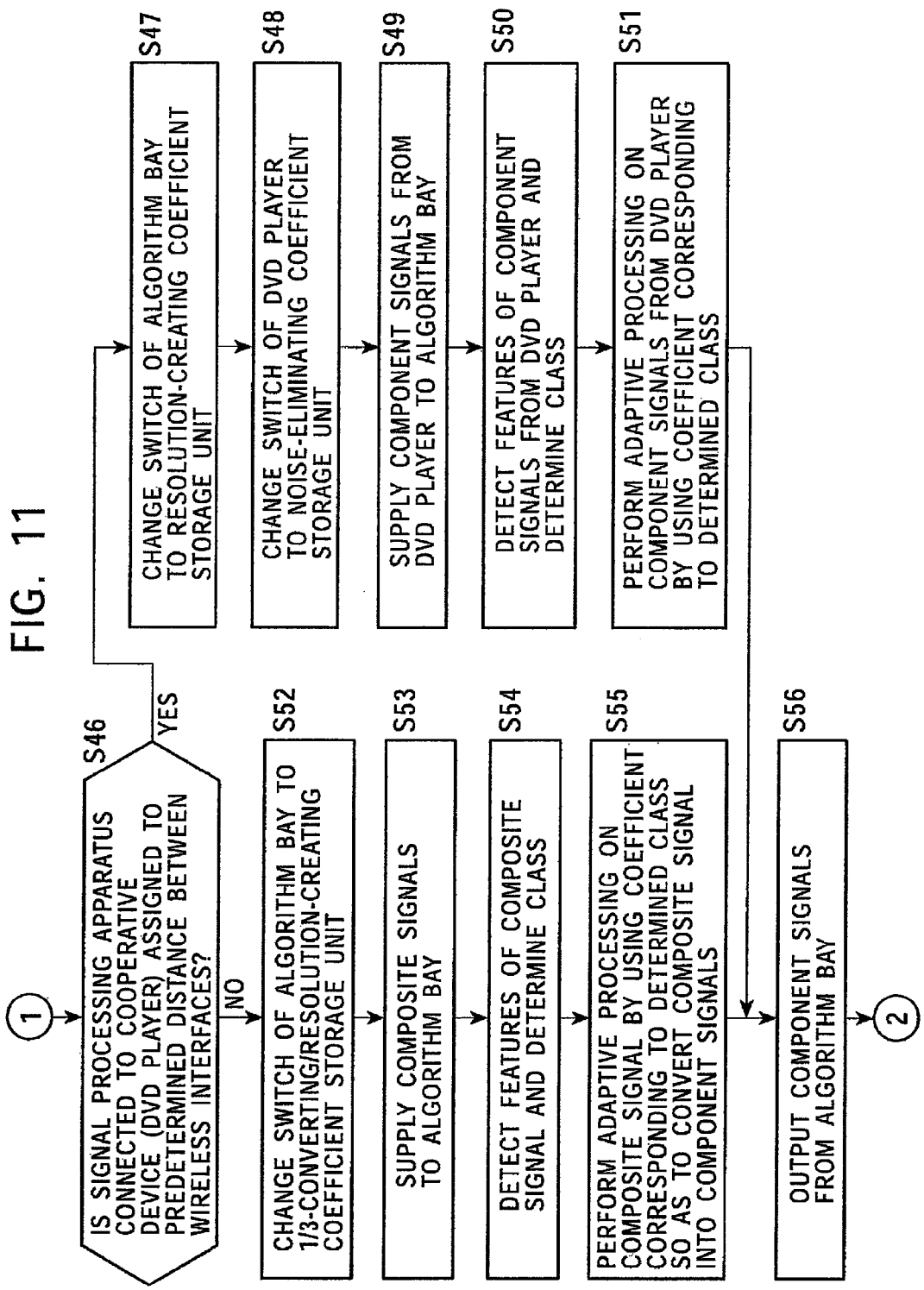

Then, in step S46 of FIG. 11, the controller 112 determines whether the signal processing apparatus 11 is connected to the cooperative distance (DVD player 91) which is assigned to the distance between the wireless interfaces 22 and 31 detected by the distance detector 114 in step S45.

In this example, it is now assumed that the DVD player 91, which performs classification adaptive processing in cooperation with the algorithm bay 12, is assigned to the predetermined connection mode of the algorithm bay 12 with the signal processing apparatus 11 (first wireless communication distance contained in a predetermined area). In this case, if the distance between the wireless interfaces 22 and 31 detected by the distance detector 114 is the first wireless communication distance, the controller 112 determines that the signal processing apparatus 11 is connected to the cooperative device (DVD player 91).

Conversely, if the distance between the wireless interfaces 22 and 31 detected by the distance detector 114 is a distance other than the first wireless communication device (second wireless communication device), the controller 112 determines that the signal processing apparatus 11 is not connected to the cooperative device (DVD player 91).

For example, if it is determined in step S46 that the signal processing apparatus 11 is connected to the cooperative device (DVD player 91) assigned to the distance between the wireless interfaces 22 and 31, steps 47 through 51 and step S56 are performed. That is, the algorithm bay 12 performs classification adaptive processing on the component signals output from the DVD player 91 (MPEG decoder 101) in cooperation with the DVD player 91, and the resulting signals are output as the output signal 42.

More specifically, in step S47, the controller 112 connects the switch 123 of the algorithm bay 12 to the resolution-creating coefficient storage unit 125 via the wireless interfaces 22 and 31.

In step S48, the controller 112 changes the switch 106 of the DVD player 91 to the noise-eliminating coefficient storage unit 105 via the interfaces 115 and 107.

Then, the feature detector 102 and the adaptive processor 103 perform classification adaptive processing on the component signals output from the MPEG decoder 101 of the DVD player 91, and more specifically, the noise-eliminating adaptive processing is performed by using the noise-eliminating coefficients stored in the noise-eliminating coefficient storage unit 105. The resulting component signals are then supplied to the controller 112 via the interfaces 107 and 115.

The component signals supplied to the controller 112 are further supplied to the feature detector 121 and the adaptive processor 122 via the wireless interfaces 22 and 31.

Then, in step S50, the feature detector 121 detects the features of the component signals supplied from the DVD player 91 so as to determine the class of the features, and supplies the determined class to the adaptive processor 122.

In step S51, the adaptive processor 122 performs adaptive processing (resolution-creating adaptive processing) on the component signals from the DVD player 91 by using the coefficient (resolution-creating coefficient) associated with the class determined by the feature detector 121 in step S50, and supplies the processed component signals to the controller 112 via the wireless interfaces 31 and 22.

Then, in step S56, the controller 112 changes the switch 113 to the controller 112 to output the component signals from the algorithm bay 12 as the output signal 42.

On the other hand, if it is determined in step S46 that the signal processing apparatus 11 is not connected to the cooperative device (DVD player 91) which is assigned to the distance between the wireless interfaces 22 and 31, steps S52 through S56 are executed so that a composite signal (input signal 41) is converted into component signals by the algorithm bay 12, and classification adaptive processing (only resolution-creating adaptive processing) is performed on the component signals. The resulting component signals are then output to an external source as the output signal 42.

More specifically, in step S52, the controller 112 changes the switch 123 of the algorithm bay 12 to the ⅓-converting/resolution-creating coefficient storage unit 124 via the wireless interfaces 22 and 31.

In step S53, the controller 112 supplies the composite signal input in step S41 of FIG. 10 to the feature detector 121 and the adaptive processor 122 of the algorithm bay 12 via the wireless interfaces 22 and 31.

In step S54, the feature detector 121 detects the features of the supplied composite signal so as to determine the class of the features, and then supplies the determined class to the adaptive processor 122.

In step S55, the adaptive processor 122 performs the ⅓-converting/resolution-creating adaptive processing on the composite signal by using the ⅓-converting/resolution-creating coefficient stored in the ⅓-converting/resolution-creating coefficient storage unit 124 corresponding to the class determined by the feature detector 121 in step S54, thereby converting the composite signal into component signals.

The component signals are then supplied to the controller 112 via the wireless interfaces 31 and 22.

In step S56, the controller 112 of the signal processing apparatus 11 changes the switch 113 to the controller 112, and outputs the component signals supplied from the algorithm bay 12 in step S55 as the output signal 42.

Referring back to FIG. 10, after step S43 or step S56, the process proceeds to step S44 in which the controller 112 determines whether all the signals (input signals 41 or signals from the DVD player 91) have been processed.

If the outcome of step S44 is no, the process returns to step S41, and step S41 and the subsequent steps are repeated, and then, all the signals are output as the output signals 42, which are component signals.

If it is determined in step S44 that all the signals have been processed, the processing is completed.

Accordingly, the signal processing apparatus 11 shown in FIG. 9 has the first function of converting the input signal 41, which is a composite signal, into component signals, performing resolution-creating adaptive processing on the component signals, and outputting them as the output signal 42, and the second function of performing resolution-creating adaptive processing on component signals subjected to noise-eliminating adaptive processing in the DVD player 91, and outputting the component signals as the output signal 42. That is, the second function is implemented in cooperation with the algorithm bay 12 and the DVD player 91.

The DVD player 91, which is a cooperative device, is assigned to the predetermined connection mode of the algorithm bay 12 with the signal processing apparatus 11 (for example, the first wireless communication distance between the wireless interface 22 of the signal processing apparatus 11 and the wireless interface 31 of the algorithm bay 12). For example, when the algorithm bay 12 is wirelessly connected to the signal processing apparatus 11 according to the first wireless communication distance between the wireless interfaces 22 and 31, the signal processing function of the signal processing apparatus 11 is changed to the second function.

When the algorithm bay 12 is wirelessly connected to the signal processing apparatus 11 according to a wireless communication distance other than the first wireless communication distance, i.e., the second wireless communication distance, the signal processing function of the signal processing apparatus 11 is changed to the first function.

Fourth Embodiment

Figure 12:
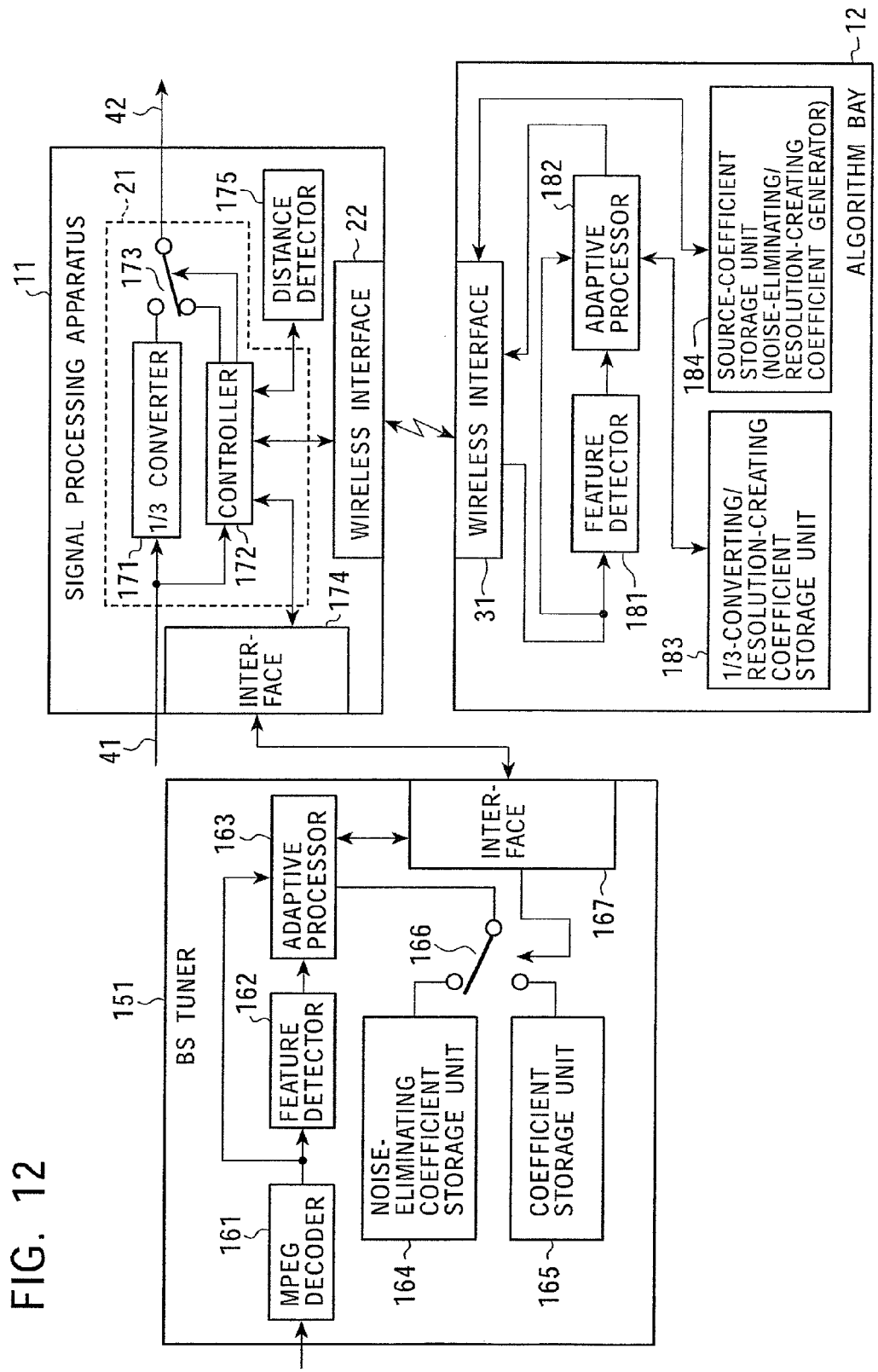
FIG. 12 is a block diagram illustrating the signal processing system shown in FIG. 1 according to a fourth embodiment of the present invention.

FIG. 12 is a block diagram schematically illustrating the signal processing system 1 according to the fourth embodiment of the present invention. The same elements as those shown in FIG. 1 are indicated by like reference numerals.

The configuration of the signal processing apparatus 11 shown in FIG. 12 is basically similar to that of the signal processing apparatus 11 shown in FIG. 9. That is, the wireless interface 22, a ⅓ converter 171, a controller 172, a switch 173, an interface 174, and a distance detector 175 are basically similar to the counterparts shown in FIG. 9.

The algorithm bay 12 shown in FIG. 12 is provided with the wireless interface 31, a feature detector 181, an adaptive processor 182, and a ⅓-converting/resolution-creating coefficient storage unit 183, all of which basically have the same functions as those of the counterparts shown in FIG. 9.

However, a switch equivalent to the switch 123 shown in FIG. 9 is not provided for the algorithm bay 12 shown in FIG. 12, and a source-coefficient storage unit 184 is provided instead of the resolution-creating coefficient storage unit 125.

For generating tap coefficients for performing adaptive processing for simultaneously performing noise elimination and resolution creation, source coefficients to be used in equations for generating such tap coefficients are required. The source-coefficient storage unit 184 stores such source coefficients.

The adaptive processing for simultaneously performing noise elimination and resolution creation is hereinafter referred to as "noise-eliminating/resolution-creating adaptive processing in order to distinguish it from other types of adaptive processing. The tap coefficients used for the noise-eliminating/resolution-creating adaptive processing are hereinafter referred to as "noise-eliminating/resolution-creating coefficients".

The source-coefficient storage unit 184 generates noise-eliminating/resolution-creating coefficients from the source coefficients. The source-coefficient storage unit 184 then stores part of the generated noise-eliminating/resolution-creating coefficients in an unused memory of the source-coefficient storage unit 184, and supplies the remaining noise-eliminating/resolution-creating coefficients to the controller 172 via the wireless interfaces 31 and 22.

The controller 172 controls a coefficient storage unit 165 of a broadcasting satellite (BS) tuner 151, which is described below, to store the supplied coefficients therein via the interface 174.

Accordingly, the source-coefficient storage unit 184 also generates the noise-eliminating/resolution-creating coefficients, and is thus also referred to a noise-eliminating/resolution-creating coefficient generator.

A method for generating tap coefficients from source coefficients is as follows.

The tap coefficient wj used in the above-described equation (1) is generated by the following equation (13) containing parameters s and z:

$$wj = qj0 + qj1s + qj2z + qj3s2 + qj4sz + qj5z2 + qj6s3 + qj7s2z + qj8sz2 + qj9z3 \quad (13)$$

where qjk represents the source coefficient (k is an integer from 0 to K (K is, for example, 9).

Details of the method for generating tap coefficients from source coefficients are disclosed in, for example, Japanese Patent Application No. 2001-110695, which was previously filed by the assignee of the present application.

The BS tuner 151, which is a cooperative device, includes an MPEG decoder 161 for receiving and decoding image data (BS broadcast image data) encoded by an MPEG method and for outputting the decoded data as component signals, and a feature detector 162 and an adaptive processor 163 for performing the above-described classification adaptive processing on the component signals supplied from the MPEG decoder 161.

The BS tuner 151 also includes an interface 167 that communicates with the interface 174 of the signal processing apparatus 11, a switch 166 for selecting the tap coefficient to be used in adaptive processing performed by the adaptive processor 163, a noise-eliminating coefficient storage unit 164 for storing noise-eliminating coefficients used in noise-eliminating adaptive processing by the adaptive processor 163, and the coefficient storage unit 165 for storing the tap coefficients (generated by the source-coefficient storage unit 184) supplied from the controller 172 of the signal processing apparatus 11 via the interfaces 174 and 167.

Normally, the switch 166 is connected to the noise-eliminating coefficient storage unit 164. However, when the BS 151 performs classification adaptive processing in cooperation with the algorithm bay 12, the switch 166 is changed to the coefficient storage unit 165 under the control of the controller 172 of the signal processing apparatus 11 via the interfaces 174 and 167. In this case, the adaptive processor 163 performs noise-eliminating/resolution-creating adaptive processing on the component signals from the MPEG decoder 161 by using the noise-eliminating/resolution-creating coefficients stored in the coefficient storage unit 165, and supplies the processed component signals to the controller 172 via the interfaces 167 and 174.

An example of the processing performed by the signal processing system 1 shown in FIG. 12 is described below with reference to the flowcharts of FIGS. 13 and 14.

It should be noted that the interface 174 of the signal processing apparatus 11 and the interface 167 of the BS tuner 151 have been connected.

Figure 13:
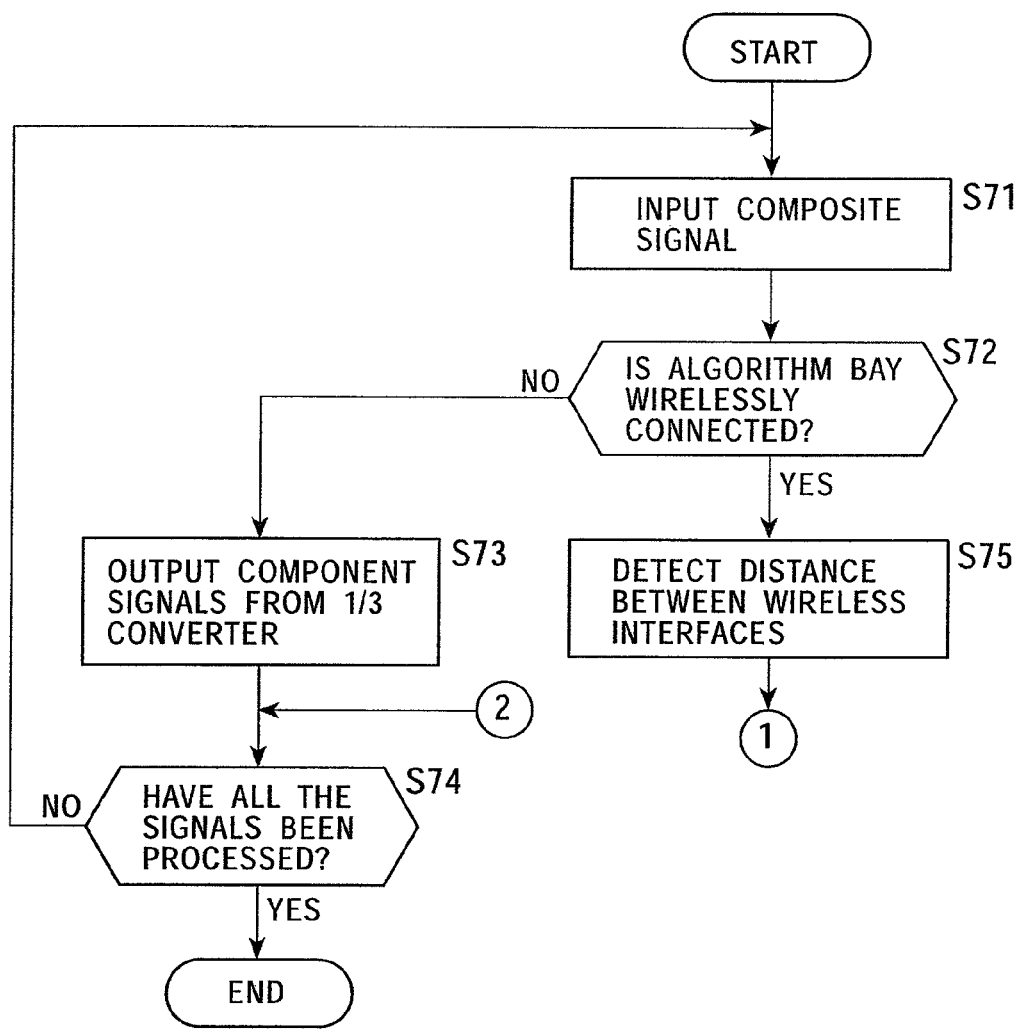
FIGS. 13 and 14 are flowcharts illustrating the processing of the signal processing system shown in FIG. 12.

Steps S71 through S75 of FIG. 13 are basically similar to steps S41 through S45, respectively, of FIG. 10. That is, the processing of the signal processing system 1 shown in FIG. 12 when the algorithm bay 12 is not connected to the signal processing apparatus 11 is basically similar to that of FIG. 9.

Figure 14:
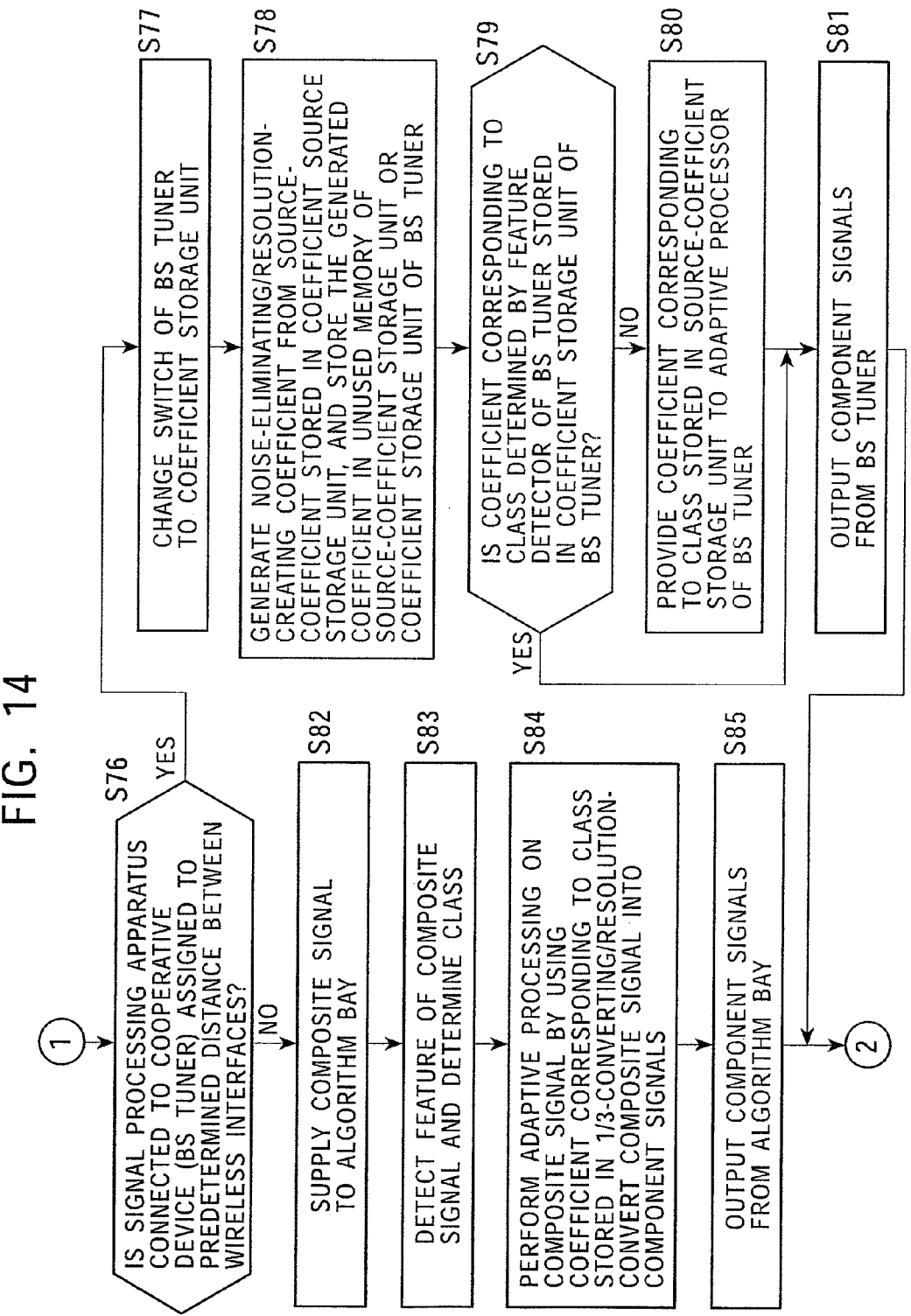

Steps S82 through S85 of FIG. 14 are basically similar to steps S53 through S56 of FIG. 11. That is, the processing of the signal processing system 1 shown in FIG. 12 when the signal processing apparatus 11 is not connected to the cooperative device (BS tuner 151) assigned to the predetermined distance between the wireless interfaces 22 and 31 is basically similar to the corresponding processing of FIG. 9, although it is necessary to change the direction of the switch 123 of the algorithm bay 12 in step S52 of FIG. 11 after it is determined in step S46 that the signal processing apparatus 11 is not connected to the cooperative device (DVD player 91).

Accordingly, only the processing of steps S77 through S81 of FIG. 14 is given below.

If it is determined in step S76 that the signal processing apparatus 11 shown in FIG. 12 is connected to the cooperative device (BS tuner 151) assigned to the predetermined distance between the wireless interfaces 22 and 31, the process proceeds to step S77. In step S77, the controller 172 changes the switch 166 of the BS tuner 151 to the coefficient storage unit 165 via the interfaces 174 and 167.

Then, in step S78, the controller 172 controls the source-coefficient storage unit (noise-eliminating/resolution-creating coefficient generator) 184 via the wireless interfaces 22 and 31 to generate noise-eliminating/resolution-creating coefficients from the source coefficients stored in the source-coefficient storage unit 184. The controller 172 then controls the source-coefficient storage unit 184 to store part of the generated coefficients in an unused memory of the source-coefficient storage unit 184, and to store the remaining coefficients in the coefficient storage unit 165 of the BS tuner 151.

In other words, as discussed above, the source-coefficient storage unit 184 generates noise-eliminating/resolution-creating coefficients from the source coefficient stored in the source-coefficient storage unit 184. The source-coefficient storage unit 184 then stores part of the noise-eliminating/resolution-creating coefficients in an unused memory, and supplies the remaining noise-eliminating/resolution-creating coefficients to the controller 172 via the wireless interfaces 31 and 22.

The controller 172 stores the supplied noise-eliminating/resolution-creating coefficients in the coefficient storage unit 165 of the BS tuner 151 via the interfaces 174 and 167.

Then, the feature detector 162 and the adaptive processor 163 of the BS tuner 151 perform the noise-eliminating/resolution-creating adaptive processing on the component signals output from the MPEG decoder 161 by using the noise-eliminating/resolution-creating coefficients stored in the coefficient storage unit 165, and the processed component signals are supplied to the controller 172 via the interfaces 167 and 174.

In this case, in step S79, the controller 172 determines whether the coefficient associated with the class determined by the feature detector 162 of the BS tuner 151 is stored in the coefficient storage unit 165.

For example, when the component signals subjected to the noise-eliminating/resolution-creating adaptive processing by the adaptive processor 163 of the BS tuner 151 are supplied via the interfaces 167 and 174, the controller 172 determines in step S79 that the coefficient associated with the class determined by the feature detector 162 is stored in the coefficient storage unit 165 of the BS tuner 151.

Then, in step S81, the controller 172 changes the direction of the switch 173 to the controller 172, and outputs the component signals as the output signal 42.

Conversely, if a signal indicating that the noise-eliminating/resolution-creating coefficient associated with the class of the component signals to undergo adaptive processing by the adaptive processor 163 of the BS tuner 151 is not stored in the coefficient storage unit 165 is sent via the interfaces 167 and 174, the controller 172 determines in step S79 that the coefficient associated with the class determined by the feature detector 162 is not stored in the coefficient storage unit 165.

Then, in step S80, the controller 172 reads the coefficient corresponding to the class stored in the unused memory of the source-coefficient storage unit 184 in step S78 so as to obtain the coefficient via the wireless interfaces 31 and 22, and supplies it to the adaptive processor 163 of the BS tuner 151 via the interfaces 174 and 167.

Accordingly, the noise-eliminating/resolution-creating adaptive processing is performed on the component signals output from the MPEG decoder 161 by using the noise-eliminating/resolution-creating coefficient supplied from the source-coefficient storage unit 184 in step S80, and the processed component signals are supplied to the controller 172 via the interfaces 167 and 174.

Then, in step S81, the controller 172 changes the direction of the switch 173 to the controller 172, and outputs the component signals from the BS tuner 151 as the output signal 42.

Accordingly, as described above, in the signal processing system 1 shown in FIG. 12, the BS tuner 151, which serves as a cooperative device, for performing the classification adaptive processing in cooperation with the algorithm bay 12 is assigned to the predetermined connection mode (first wireless communication distance) of the algorithm bay 12 with the signal processing apparatus 11.

When the wireless communication distance between the algorithm bay 12 and the signal processing apparatus 1 is the first wireless communication distance, the signal processing apparatus 11 utilizes the first function of outputting the component signals (which are subjected to the noise-eliminating/resolution-creating adaptive processing by a cooperative operation of the BS tuner 151 and the algorithm bay 12) supplied from the BS tuner 151 as the output signal 42.

In contrast, when the wireless communication distance between the algorithm bay 12 and the signal processing apparatus 11 is other than the first wireless communication distance (i.e., the second wireless communication distance), the signal processing apparatus 11 utilizes the second function of outputting the component signals (which are subjected to only the resolution-creating adaptive processing) supplied from the algorithm bay 12 as the output signal 42.

According to the foregoing description, in the signal processing system shown in FIGS. 1, 4, 9, and 12 of the first through fourth embodiments, the signal processing functions of the signal processing apparatus 11 can be easily switched between the first function and the second function according to the connection mode of the signal processing system 1 (for example, the insertion direction of the algorithm bay 12 with the signal processing apparatus 11 or the wireless communication distance therebetween.

The need to prepare a plurality of boards (algorithm bays 12) can be eliminated, and thus, the size of the signal processing apparatus 11 is decreased, which further reduces the manufacturing cost of the signal processing apparatus 11 and a plurality of algorithm bay 12. The user is also able to easily select and utilize a desired function from the plurality of functions only by using the single algorithm bay 12.

When performing wireless communication between the signal processing apparatus 11 and the algorithm bay 12, changing (upgrading) of the signal processing functions of the signal processing apparatus 11 can be easily dealt with out restrictions of the bus, and also, the mechanical configurations of the signal processing apparatus 11 and the algorithm bay 12 can be simplified, thereby further reducing the manufacturing cost.

The above-described series of processing can be executed by hardware or software.

Figure 15:
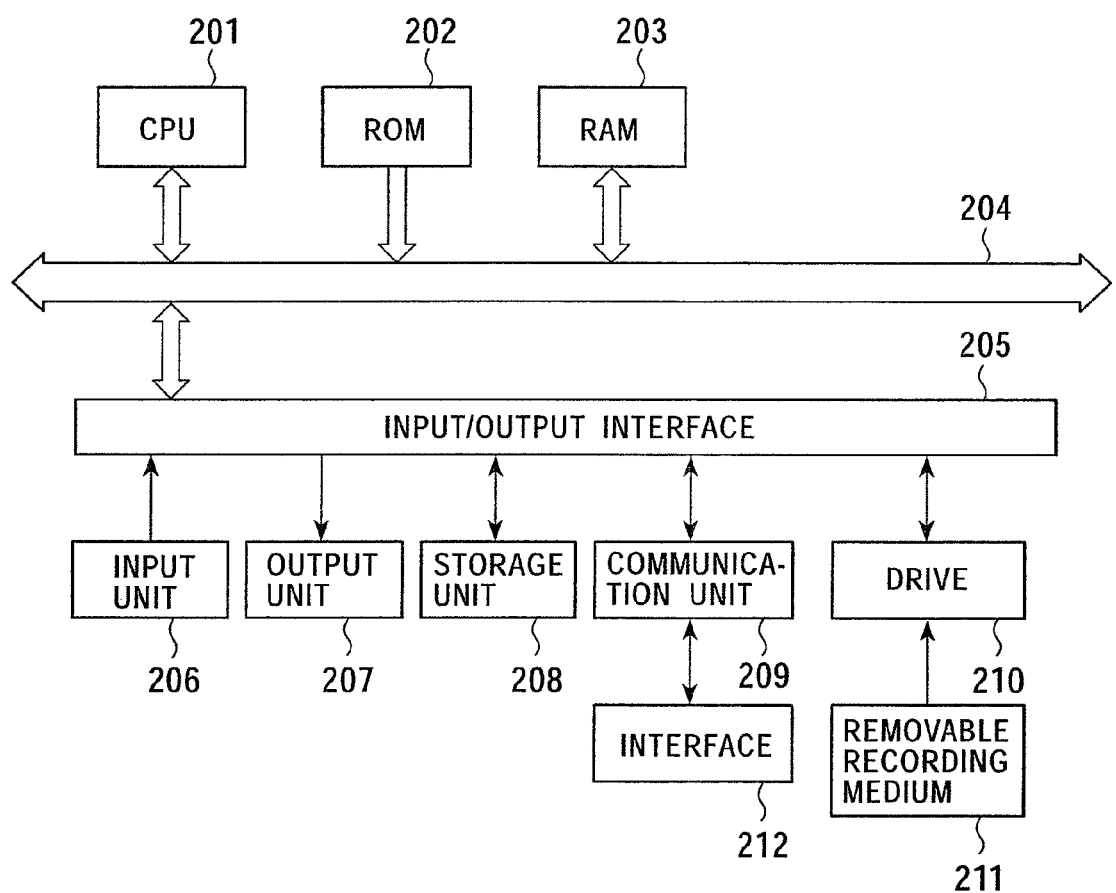
FIG. 15 is a block diagram illustrating an example of the signal processing apparatus.

In this case, the signal processing apparatus 11 or the algorithm bay 12 can be formed by, for example, a personal computer shown in FIG. 15.

As shown in FIG. 15, a central processing unit (CPU) 201 executes various types of processing according to programs stored in a read only memory (ROM) 202, or programs loaded from a storage unit 208 to a random access memory (RAM)

203. Data required for executing various types of processing by the CPU 201 is also stored in the RAM 203.

The CPU 201, the ROM 202, and the RAM 203 are connected to each other via a bus 204. An input/output interface 205 is also connected to the bus 204.

An input unit 206 formed of, for example, a keyboard or a mouse, an output unit 207 formed of, for example, a display unit, the storage unit 208 formed of, for example, a hard disk, and a communication unit 209 formed of, for example, a modem or a terminal adaptor, are also connected to the input/output interface 205. An interface 212 is connected to the communication unit 209. That is, the communication unit 209 communicates with other signal processing apparatuses via the interface 212.

A drive 210 is also connected to the input/output interface 205 as required, and a removable recording medium 211 formed of a magnetic disk, an optical disc, a magneto-optical disk or a semiconductor memory, is attached to the drive 210 when necessary. A computer program read from the removable recording medium 211 is installed into the storage unit 208 as required.

If software is used for executing a series of processing, programs constituting the software are installed from a network or a recording medium into a computer built into dedicated hardware or into a general-purpose computer that is able to execute various functions by loading various programs therein.

Such a recording medium may include, not only the removable recording medium (package medium) 211, such as a magnetic disk (including a floppy disk), an optical disc (including a CD-ROM and a DVD), a magneto-optical disk (including a mini disk (MD)), or a semiconductor memory, which is distributed for providing the programs to the user separately from the apparatus), but also the ROM 202 or a hard disk contained in the storage unit 208 for storing the programs therein, which is provided to the user while being integrated in the apparatus.

Steps forming the programs recorded in the recording medium may be executed in chronological order described in this specification. Alternatively, they may be executed concurrently or individually.

In this specification, the "system" means an overall apparatus consisting of a plurality of devices and processors.

Modifications to the interfaces of the above-described signal processing apparatus 11 and the algorithm bay 12 are described below.

Figure 16:
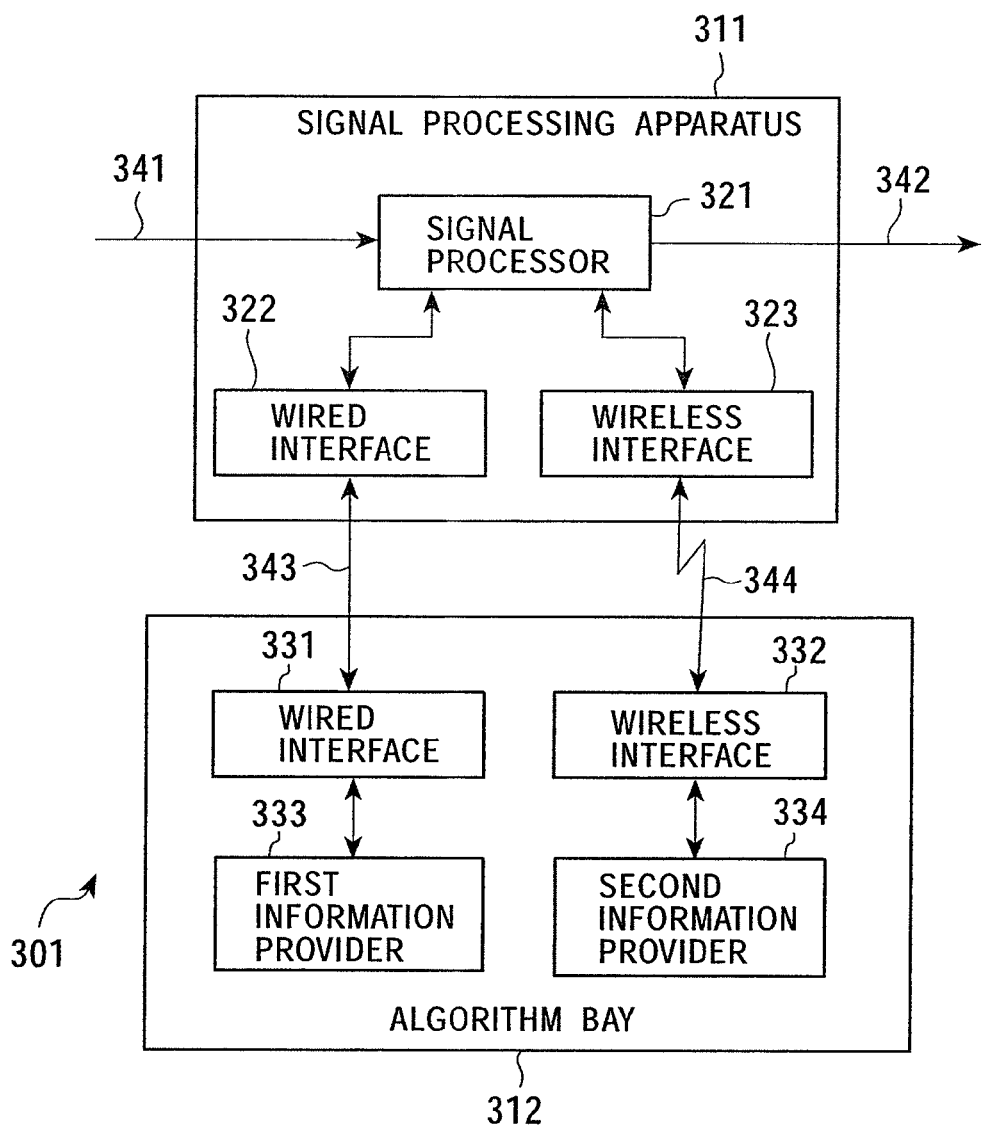
FIG. 16 is a block diagram schematically illustrating another example of the signal processing system to which the present invention is applied.

FIG. 16 is a block diagram schematically illustrating a signal processing system 301 to which such modifications are applied.

As in the signal processing system 1 shown in FIG. 1, the signal processing system 301 is formed of, as shown in FIG. 16, a signal processing apparatus 311 and an algorithm bay 312, which serves as a board attached to the signal processing apparatus 311.

The signal processing apparatus 311 includes a signal processor 321, a wired interface 322, and a wireless interface 323. The signal processor 321 performs predetermined signal processing on an input signal 341 and for outputting the processed signal as an output signal 342. The wired interface 322 receives by wired connection 343 a signal indicating first information supplied from the algorithm bay 312 and to be used in the signal processing by the signal processor 321. The wireless interface 323 receives by wireless connection 344 a signal indicating second information for changing the signal processing functions of the signal processor 321 supplied from the algorithm bay 312.

The algorithm bay 312 includes a first information provider 333 for providing the above-described first information, and a second information provider 334 for providing the above-described second information. The algorithm bay 312 also includes a wired interface 331 and a wireless interface 332. The wired interface 331 sends a signal indicating the first information provided from the first information provider 333 to the wired interface 322 of the signal processing apparatus 311 via the wireless connection 343. The wireless interface 332 sends a signal indicating the second information provided from the second information provider 334 to the wireless interface 323 of the signal processing apparatus 311 by the wireless connection 344.

Also in the example shown in FIG. 16, the algorithm bay 312 is formed as a board to be attached to the signal processing apparatus 311. However, the algorithm bay 312 may be formed as a certain device for supplying the first information to the signal processing apparatus 311 by wired connection and for supplying the second information to the signal processing apparatus 311 wirelessly.

The first information to be provided by the first information provider 333 may be prestored in a built-in memory (not shown), or may be supplied from an external source, for example, another device (not shown).

Similarly, the second information to be provided by the second information provider 334 may be prestored in a built-in memory (not shown), or may be supplied from an external source, for example, another device (not shown).

An overall operation of the signal processing system 301 is as follows.

When, for example, predetermined conditions, which are described below, are satisfied, the signal processor 321 of the signal processing apparatus 311 obtains the first information provided by the first information provider 333 of the algorithm bay 312 via the wired interface 331, the wired connection 343, and the wired interface 322, and also obtains the second information provided by the second information provider 334 via the wireless interface 332, the wireless connection (space) 344, and the wireless interface 323.

The content and type of first and second information are not particularly restricted. In this example, the first information is basic information for changing the signal processing functions of the signal processor 321, and the second information is information for improving the signal processing functions of the signal processor 321 based on the first information, or information for adding a new function to the signal processing functions of the signal processor 321 based on the first information.

Specific examples of the first and second information are discussed later.

An overview of the signal processing system 301 to which the present invention is applied has been described, and various embodiments of the signal processing system 301 can be implemented.

Different modes of implementing the signal processing system 301 are shown in FIGS. 17, 21, 23, and 25 as fifth through eighth embodiments, respectively.

Fifth Embodiment

Figure 17:
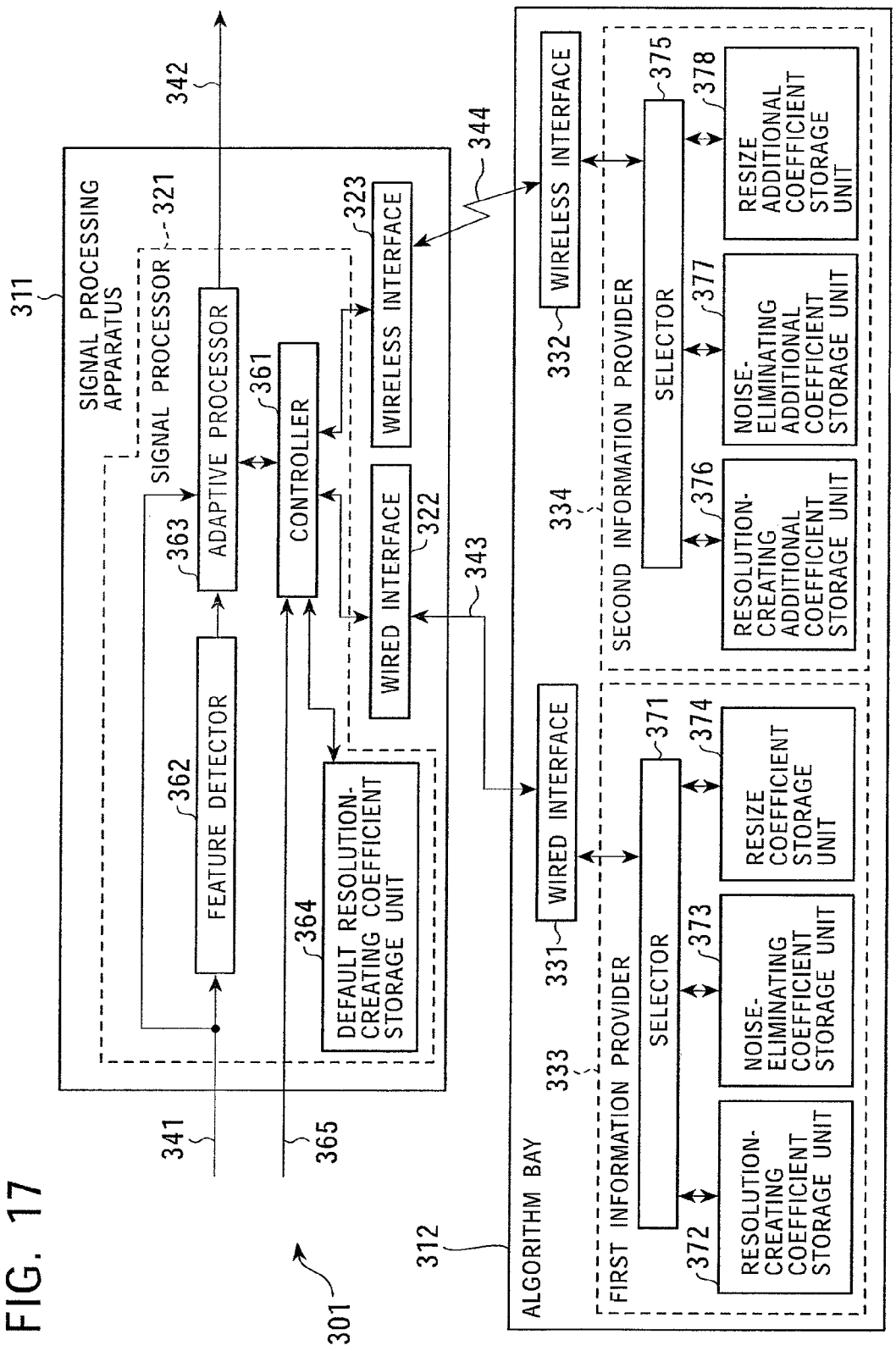
FIG. 17 is a block diagram illustrating the signal processing system shown in FIG. 16 according to a fifth embodiment of the present invention.

FIG. 17 is a block diagram schematically illustrating the signal processing system 301 according to the fifth embodiment of the present invention.

In the fifth embodiment, the signal processor 321 performs classification adaptive processing on the input signal 341, and outputs the processed signal as the output signal 342.

The signal processor 321 is provided with, as shown in FIG. 17, a controller 361 for controlling classification adaptive processing and the overall processing of the signal processor 321, and a feature detector 362 for detecting the features of the input signal 341 and for determining the class associated with the detected features. The signal processor 321 also includes an adaptive processor 363 and a default resolution-creating coefficient storage unit 364. The adaptive processor 363 performs adaptive processing under the control of the controller 361 by using the input signal 341 and predetermined tap coefficients supplied from the controller 361 so as to generate the output signal 342. The default resolution-creating coefficient storage unit 364 stores in advance the tap coefficients (resolution-creating coefficients) normally used in the above-described adaptive processing.

The above-described classification adaptive processing has been discussed in the first embodiment.

The above-described adaptive processing can be performed, for example, for converting the above-described SD signal (for example, 525i signal) into an SD signal for obtaining a display image having a different magnification.

This type of adaptive processing is hereinafter referred to as "resize adaptive processing" in order to distinguish it from other types of adaptive processing. The tap coefficients used in the resize adaptive processing are hereinafter referred to as "resize coefficients".

Details of the resize adaptive processing and the resize coefficients are disclosed in, for example, Japanese Patent Application No. 2000-395873, which was previously filed by the assignee of the present application.

The signal processor 321 shown in FIG. 17 performs the above-described classification adaptive processing.

More specifically, the feature detector 362 performs the above-described classification processing, and the adaptive processor 363 performs the above-described adaptive processing.

That is, the feature detector 362 extracts information (for example, class taps if the input signal 341 is an image signal) required for performing classification processing from the input signal 341, and detects the pattern (features) of the input signal 341 based on the extracted information. Based on the detected pattern, the feature detector 362 determines the class of the input signal 341, and supplies class code corresponding to the determined class to the adaptive processor 363.

The adaptive processor 363 extracts information (for example, predictive taps if the input signal 341 is an image signal) required for generating the predictive output signal 342, and performs predictive computation by using the extracted information and tap coefficients supplied from the controller 361 so as to generate the output signal 342.

In the embodiment shown in FIG. 17, the signal processor 321 normally performs resolution-creating adaptive processing by using resolution-creating coefficients (hereinafter referred to as "default resolution-creating coefficients in order to distinguish it from the other tap coefficients) stored in the default resolution-creating coefficient storage unit 364. However, as stated above, classification adaptive processing is not restricted to this type of processing. The signal processor 321 may perform classification adaptive processing in order to improve the functions of classification adaptive processing by using other tap coefficients.

The algorithm bay 312 shown in FIG. 17 provides the tap coefficients for improving the functions of the classification adaptive processing to the signal processor 321 of the signal processing apparatus 311.

In the algorithm bay 312 shown in FIG. 17, the first information provider 333 includes a resolution-creating coefficient storage unit 372 for storing resolution-creating coefficients, which are different from default resolution-creating coefficients, a noise-eliminating coefficient storage unit 373 for storing noise-eliminating coefficients, and a resize coefficient storage unit 374 for storing resize coefficients. The first information provider 333 is also provided with a selector 371 for selecting the coefficients specified by the controller 361 of the signal processing apparatus 311 from the resolution-creating coefficients, the noise-eliminating coefficients, and the resize coefficients, and supplies the selected coefficients to the wired interface 331.

That is, the controller 361 requests the selector 371 to provide tap coefficients (resolution-creating coefficients, noise-eliminating coefficients, or resize coefficients) to be used in the adaptive processing in response to an instruction signal 365 via the wired interface 322, the wired connection 343, and the wired interface 331. The selector 371 then reads the requested tap coefficients from the resolution-creating coefficient storage unit 372, the noise-eliminating coefficient storage unit 373, or the resize coefficient storage unit 374, and supplies the read tap coefficients to the controller 361 of the signal processor 321 via the wired interface 331, the wired connection 343, and the wired interface 322 as the first information.

In order to further improve the adaptive processing functions of the adaptive processor 363, the second information provider 334 supplies tap coefficients (for example, upgraded tap coefficients), which are different from the tap coefficients specified as the first information, to the controller 361 of the signal processor 321 via the wireless interface 332, the wireless connection 344, and the wireless interface 323.

The resolution-creating coefficients (tap coefficients stored in the resolution-creating coefficient storage unit 372) provided as the first information are, for example, the following tap coefficients.

Figure 18:
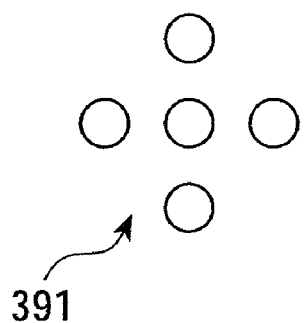
FIGS. 18 and 19 illustrate taps used in classification adaptive processing performed in the signal processing system shown in FIG. 17.
Figure 19:
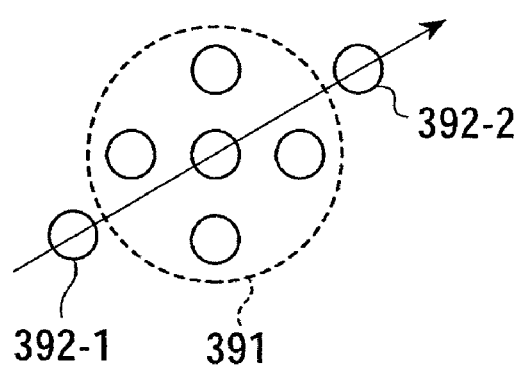

Five predetermined taps 391 in a frame, as shown in FIG. 18, are prepared, and two taps 392-1 and 392-2, as shown in FIG. 19, which are in frames temporally before and after the frame of the taps 391, are added to the five taps 391, resulting in seven taps shown in FIG. 19, which are used as predictive taps. In this case, tap coefficients used in classification adaptive processing by using the seven taps and 32 classes can be employed as the first information.

In this case, the resolution-creating coefficients (tap coefficients stored in a resolution-creating additional coefficient storage unit 376) provided as the second information are, for example, the following taps.

Tap coefficients used in adaptive processing by using the seven taps shown in FIG. 19 as class taps and predictive taps and using 128 classes can be employed as the second information.

The resolution-creating coefficients provided as the second information may also be the following tap coefficients.

Classification is performed by using the seven taps shown in FIG. 19 as the class taps and the predictive taps and using 128 classes to determine the class. Then, if the two lower bits (corresponding to the taps 392-1 and 392-2 in FIG. 19) of the class code associated with the determined class are "01", "10", or "11", the tap coefficients corresponding to such code (class) can be used as the second information.

More specifically, when the two lower bits of the class code corresponding to the class of the input signal 341 determined by the feature detector 362 shown in FIG. 17 are "00", the controller 361 reads the tap coefficients (first information) associated with the class stored in the resolution-creating coefficient storage unit 372 of the algorithm bay 312 via the wired interface 322, the wired connection 343, the wired interface 331, and the selector 371, and supplies the read tap coefficients to the adaptive processor 363. Then, the adaptive processor 363 performs the resolution-creating adaptive processing on the input signal 341 by using the tap coefficients (resolution-creating coefficients) corresponding to the first information.

In contrast, when the two lower bits of the class code corresponding to the class of the input signal 341 determined by the feature detector 362 shown in FIG. 17 are "01", "10", or "11", the controller 361 reads the tap coefficients (second information) associated with the class stored in the resolution-creating additional coefficient storage unit 376 of the algorithm bay 312 via the wireless interface 323, the wireless connection 344, the wireless interface 332, and the selector 375, and supplies the read tap coefficients to the adaptive processor 363. Then, the adaptive processor 363 performs the resolution-creating adaptive processing on the input signal 341 by using the tap coefficients (resolution-creating additional coefficients) corresponding to the second information.

The tap coefficients provided by the second information provider 334 are hereinafter referred to as "additional coefficients" in order to distinguish it from the coefficients provided by the first information provider 333.

The second information provider 344 includes the resolution-creating additional coefficient storage unit 376 for storing resolution-creating additional coefficients, a noise-eliminating additional coefficient storage unit 377 for storing noise-eliminating additional coefficients, and a resize additional coefficient storage unit 378 for storing noise-eliminating additional coefficients. The second information provider 344 also includes the selector 375 for selecting the additional coefficients specified by the controller 361 of the signal processing apparatus 11 from the resolution-creating additional coefficients, the noise-eliminating additional coefficients, and the resize additional coefficients, and supplies the selected coefficients to the wireless interface 332.

That is, the controller 361 requests the selector 375 to provide the resolution-creating additional coefficients, the noise-eliminating additional coefficients, or the resize additional coefficients, which are different from the tap coefficients (default resolution-creating coefficients or first information), used in the adaptive processing in response to the instruction signal 365, via the wireless interface 323, the wireless connection 344, and the wireless interface 332. The selector 375 then reads the requested tap coefficients from the corresponding storage unit, and supplies the read tap coefficients to the controller 361 via the wireless interface 332, the wireless connection 344, and the wireless interface 323 as the second information.

An example of the processing performed by the signal processing system 301 shown in FIG. 17 is described below with reference to the flowchart of FIG. 20.

In step S101, the feature detector 362 of the signal processing apparatus 311 detects the features of the input signal 341. More specifically, the feature detector 362 detects the features of the input signal 341 so as to determine the class based on the detected features, and supplies the class code associated with the class to the adaptive processor 363.

The controller 361 of the signal processing apparatus 311 then determines in step S102 whether the algorithm bay 312 is installed in the signal processing apparatus 301.

If it is found in step S102 that the algorithm bay 312 is not installed, the process proceeds to step S103 in which the controller 361 obtains the default resolution-creating coefficients stored in the default resolution-creating coefficient storage unit 364.

If it is found in step S102 that the algorithm bay 312 is installed, the process proceeds to step S104 in which the controller 361 determines whether the instruction signal 365 from the user is input.

If the outcome of step S104 is yes, the process proceeds to step S105 in which the controller 361 obtains the tap coefficients corresponding to the function (adaptive processing) in response to the instruction signal 365 from the algorithm bay 312.

For example, if the instruction signal 365 designates the resolution-creating adaptive processing (function) using the seven taps shown in FIG. 19 as the class taps and the predictive taps, the controller 361 requests the algorithm bay 312 to provide the resolution-creating coefficients corresponding to the class code determined by the feature detector 362. More specifically, the controller 361 requests the selector 375 to provide the resolution-creating additional coefficients corresponding to the class code determined by the feature detector 362 via the wireless interface 323, the wireless connection 344, and the wireless interface 332.

In response to the request, the selector 375 reads the requested resolution-creating additional coefficients from the resolution-creating additional coefficient storage unit 376, and supplies them to the controller 361 via the wireless interface 332, the wireless connection 344, and the wireless interface 323.

If it is found in step S104 that the instruction signal 365 is not input, the process proceeds to step S106 in which the controller 361 obtains the tap coefficients designated by the controller 361 from the algorithm bay 312.

In this case, if the controller 361 controls the adaptive processor 363 to perform the resolution-creating adaptive processing using the five taps shown in FIG. 18 as the class taps and the seven taps shown in FIG. 19 as the predictive taps, it requests the algorithm bay 312 to provide the resolution-creating coefficients corresponding to the class code determined by the feature detector 362. More specifically, the controller 361 requests the selector 371 to provide the resolution-creating coefficients corresponding to the class code determined by the feature detector 362 via the wired interface 322, the wired connection 343, and the wired interface 331.

In response to the request, the selector 371 reads the requested resolution-creating coefficients from the resolution-creating coefficient storage unit 372, and provides them to the controller 361 via the wired interface 331, the wired connection 343, and the wired interface 322.

In step S107, the adaptive processor 363 performs the above-described adaptive processing on the input signal 341 based on the tap coefficients obtained by the controller 361 in step S103, S105, or S106 under the control of the controller 361, and then outputs the generated output signal 342 to an external source.

The controller 361 then determines in step S108 whether all the input signals 341 have been processed.

If the outcome of step S108 is no, the process returns to step S101, and step S101 and the subsequent steps are repeated. That is, the classification adaptive processing is performed on all the input signals 341, and the resulting output signals 342 are output.

If all the input signals 342 are subjected to the adaptive processing (if the final output signal 342 is output), it is determined in step S108 that all the input signals 341 have been processed, and the processing is completed.

Sixth Embodiment

Figure 21:
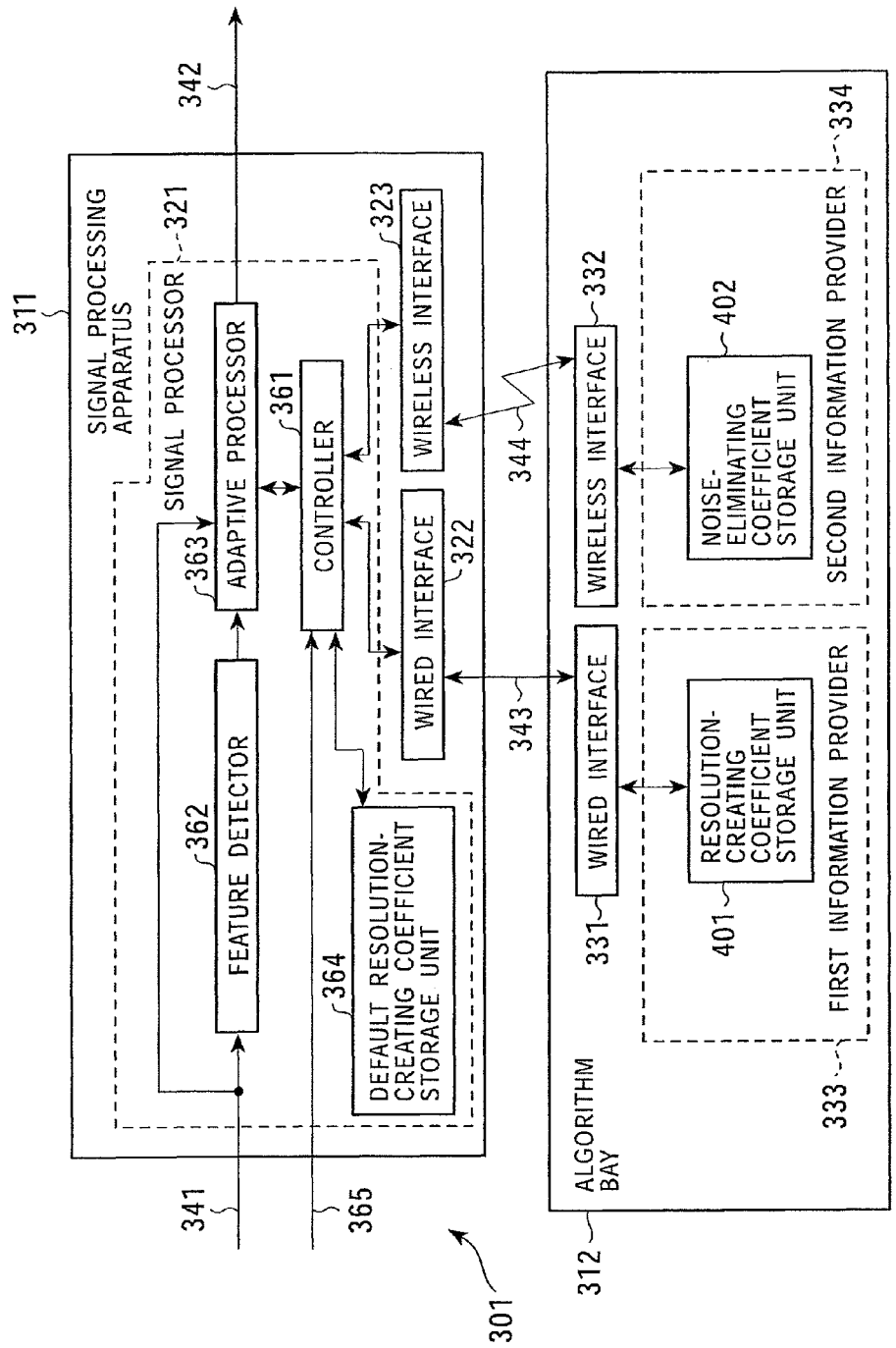
FIG. 21 is a block diagram illustrating the signal processing system shown in FIG. 16 according to a sixth embodiment of the present invention.

FIG. 21 is a block diagram schematically illustrating the signal processing system 301 according to the sixth embodiment of the present invention. The same elements as those shown in FIG. 17 are designated with like reference numerals.

The configuration of the signal processing apparatus 311 shown in FIG. 21 is basically similar to that shown in FIG. 17. That is, the signal processing apparatus 311 shown in FIG. 21 performs classification processing on the input signal 341, and outputs the processed signal to an external source as the output signal 342.

In the fifth embodiment shown in FIG. 17, the algorithm bay 312 that provides tap coefficients for improving the classification adaptive processing functions to the signal processing apparatus 311 is connected to the signal processing apparatus 311. In the sixth embodiment shown in FIG. 21, the algorithm bay 312 that provides tap coefficients for adding classification adaptive processing functions to the signal processing apparatus 311 is connected to the signal processing apparatus 311.

Normally, the signal processing apparatus 311 shown in FIG. 21 performs resolution-creating adaptive processing by using default resolution-creating coefficients stored in the default resolution-creating coefficient storage unit 364, as stated above.

The algorithm bay 312 provides by wired connection resolution-creating coefficients (different from the default resolution-creating coefficients) as the first information to be used for the same functions as those used in the normal resolution-creating adaptive processing to the signal processing apparatus 311. The algorithm bay 312 also provides wirelessly noise-eliminating coefficients to be used for a different function (for example, noise-eliminating adaptive processing in FIG. 21) as the second information from that used in the normal resolution-creating adaptive processing to the signal processing apparatus 311.

More specifically, the algorithm bay 312 is provided with a resolution-creating coefficient storage unit 401 as the first information provider 333 for providing the first information (resolution-creating coefficients) to the signal processing apparatus 311 via the wired interface 331, the wired connection 343, and the wired interface 322, and a noise-eliminating coefficient storage unit 402 as the second information provider 334 for providing the second information (noise-eliminating coefficients) to the signal processing apparatus 311 via the wireless interface 322, the wireless connection 344, and the wireless interface 323.

The addition of functions involves, not only the use of the second function without using the first function, but also the combined use of the first and second functions. For example, when the instruction signal 365 indicates an instruction of noise elimination, the adaptive processor 363 does not perform only the noise-eliminating adaptive processing, but performs both the noise-eliminating adaptive processing and the resolution-creating adaptive processing.

The processing of the signal processing system 301 shown in FIG. 21 is described below with reference to the flowchart of FIG. 22. The processing is basically similar to that shown in FIG. 20. That is, steps S121 through S128 are basically similar to steps S101 through S108, respectively, of FIG. 20.

Figure 20:
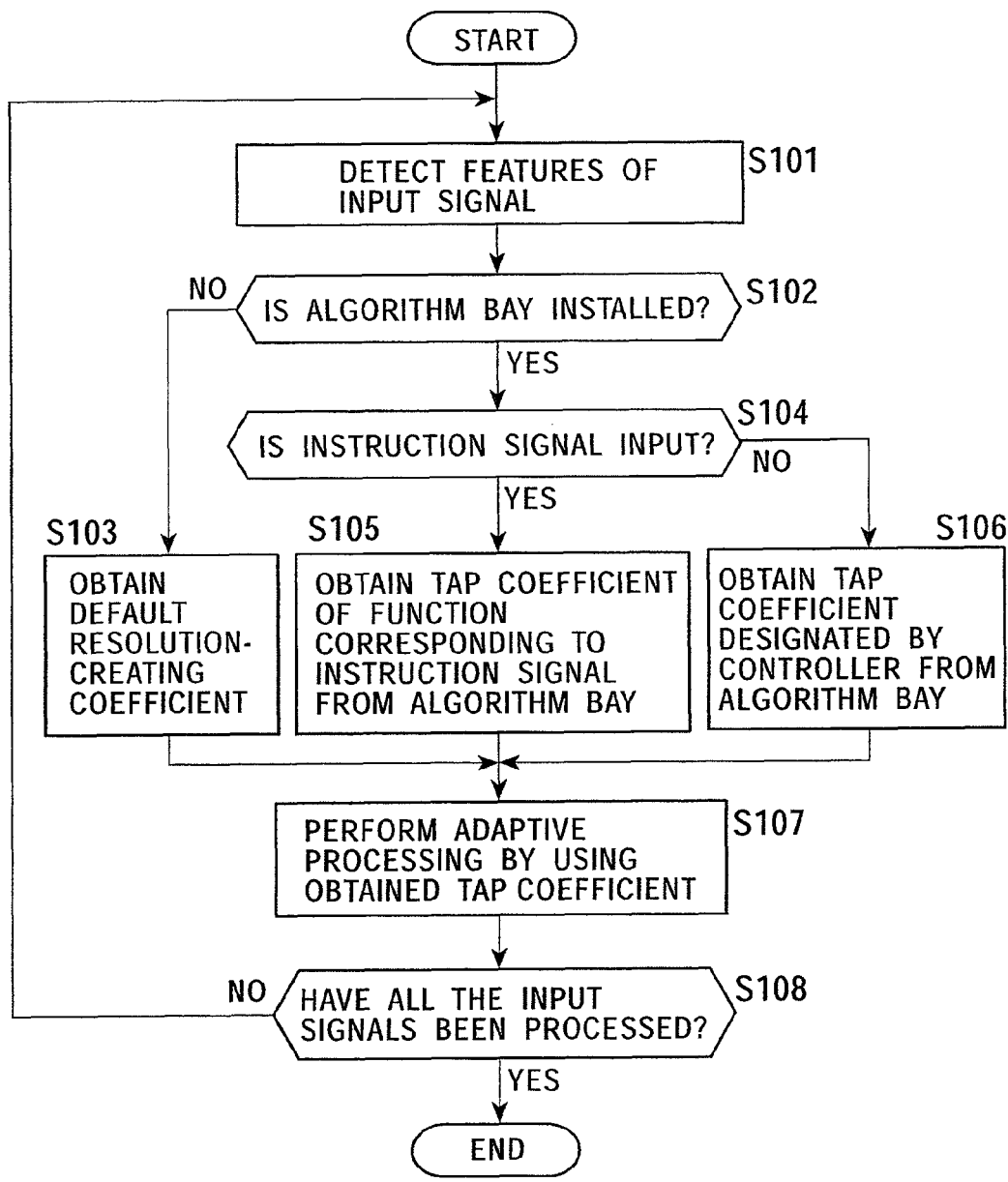
FIG. 20 is a flowchart illustrating the processing of the signal processing system shown in FIG. 17.
Figure 22:
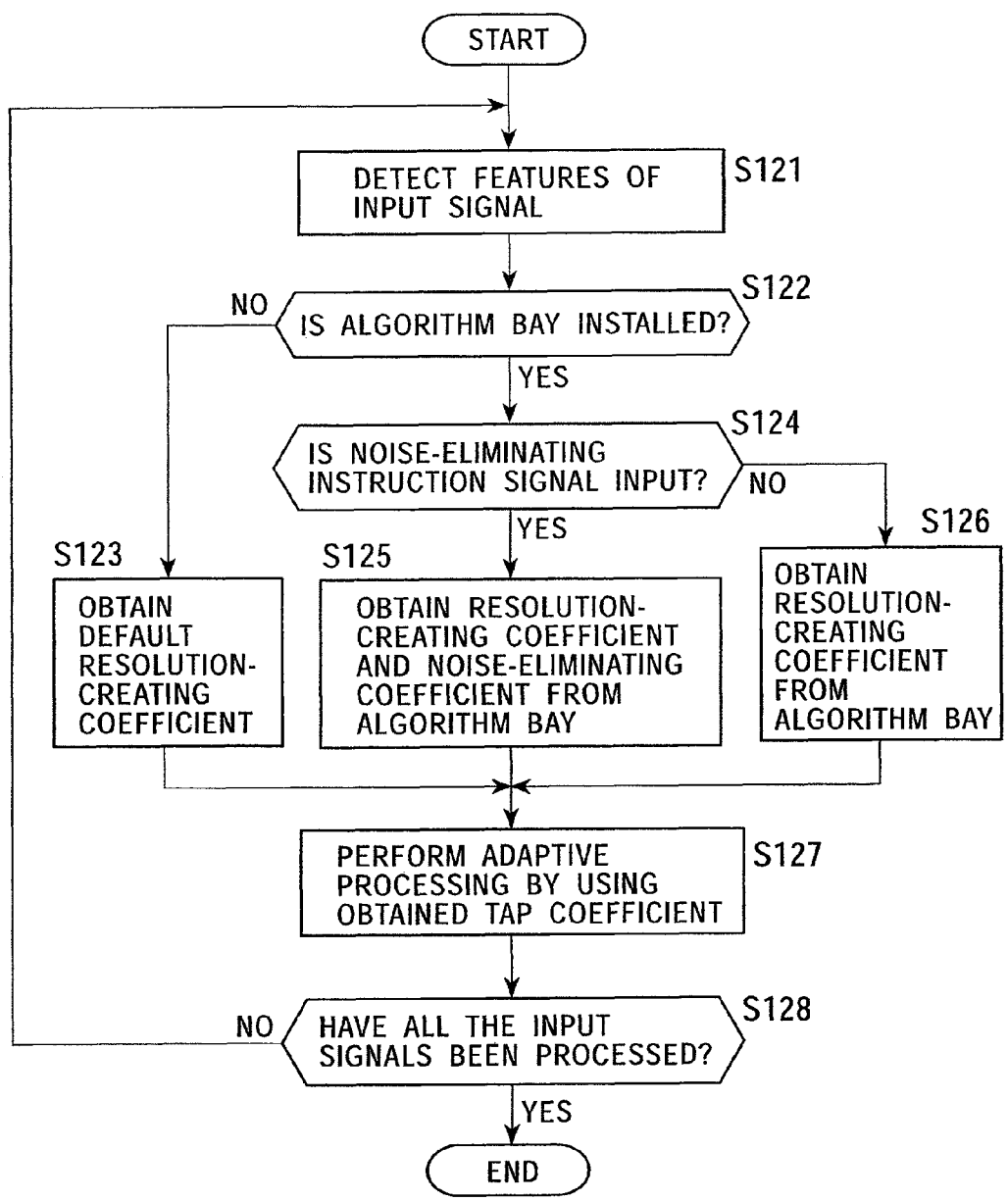
FIG. 22 is a flowchart illustrating the processing of the signal processing system shown in FIG. 21.

However, steps S124 through S127 of FIG. 22 are slightly different from steps S104 through S107 of FIG. 20. Accordingly, only the processing of steps S124 through S127 is discussed below.

If it is determined in step S122 that the algorithm bay 312 is installed in the signal processing apparatus 311, the process proceeds to step S124 in which the controller 361 determines whether the noise-eliminating input signal 365 is input.

If the outcome of step S124 is yes, the process proceeds to step S125 in which the controller 361 obtains the resolution-creating coefficients and the noise-eliminating coefficients from the algorithm bay 312.

More specifically, the controller 361 reads the corresponding resolution-creating coefficients from the resolution-creating coefficient storage unit 401 via the wired interface 322, the wired connection 343, and the wired interface 331, and also reads the corresponding noise-eliminating coefficients from the noise-eliminating coefficient storage unit 402 via the wireless interface 323, the wireless connection 344, and the wireless interface 332.

Then, in step S127, under the control of the controller 361, the adaptive processor 363 performs resolution-creating adaptive processing by using the resolution-creating coefficients obtained form the controller 361, and then performs noise-eliminating adaptive processing by using the noise-eliminating coefficients obtained from the controller 361.

If it is found in step S124 that the noise-eliminating instruction signal 365 is not input, the process proceeds to step S126 in which the controller 361 obtains the resolution-creating coefficients from the algorithm bay 312.

More specifically, the controller 361 reads the corresponding resolution-creating coefficients from the resolution-creating coefficient storage unit 401 via the wired interface 322, the wired connection 343, and the wired interface 331.

Then, in step S127, under the control of the controller 361, the adaptive processor 363 performs resolution-creating adaptive processing by using the resolution-creating coefficients obtained from the controller 361.

Seventh Embodiment

Figure 23:
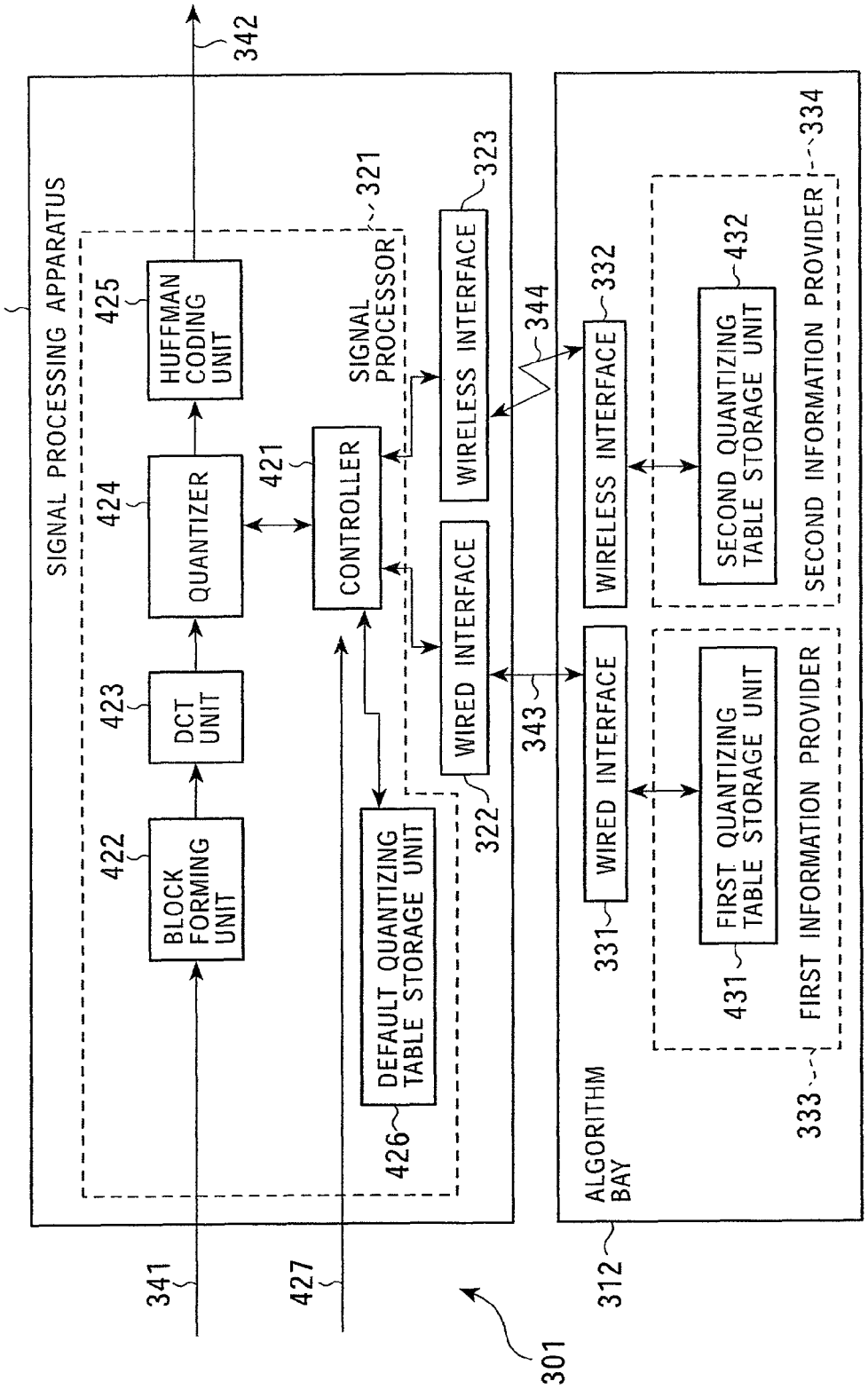
FIG. 23 is a block diagram illustrating the signal processing system shown in FIG. 16 according to a seventh embodiment of the present invention.

FIG. 23 is a block diagram schematically illustrating the signal processing system 301 according to the seventh embodiment of the present invention. The same elements as those shown in FIG. 16 are designated with like reference numerals.

In the signal processing apparatus 311 shown in FIG. 17 or 21, classification adaptive processing is performed as the signal processing. In the signal processing apparatus 311 shown in FIG. 23, coding processing is performed as the signal processing.

The signal processor 321 of the signal processing apparatus 311 is provided with, as shown in FIG. 23, a controller 421 for controlling coding processing (quantizing processing) and the overall processing of the signal processor 321, a block-forming unit 422 for converting the input signal 341 into block data, and a discrete cosine transform (DCT) unit 423 for performing DCT on the block data to transform it into a DCT coefficient.

The signal processor 321 also includes a quantizer 424 for quantizing the DCT coefficient supplied from the DCT unit 423 by using a predetermined quantizing table supplied from the controller 421 under the control of the controller 421, a Huffman coding unit 425 for performing Huffman coding on the quantized data and for outputting it to an external source as the output signal 342, and a default quantizing table storage unit 426 in which the predetermined default quantizing table normally used in the above-described quantizing processing is prestored.

In this example, the output signal 342 includes at least Huffman-coded data and a signal corresponding to the Huffman table, and may also include a signal corresponding to the quantizing table used in the quantizing processing if necessary.

The algorithm bay 312 shown in FIG. 23 is used for providing the quantizing table for improving coding processing (quantizing processing) functions.

The algorithm bay 312 shown in FIG. 23 is provided with a first quantizing table storage unit 431 as the first information provider 333 for providing the first information (first quantizing table different from the default quantizing table) to the signal processing apparatus 311 via the wired interface 331, the wired connection 343, and the wired interface 322, and a second quantizing table storage unit 432 as the second information provider 344 for providing the second information (second quantizing table different from the default quantizing table and the first quantizing table) to the signal processing apparatus 311 via the wireless interface 322, the wireless connection 344, and the wireless interface 323.

The types of first and second quantizing tables are not particularly restricted. For example, the first quantizing table is a regular quantizing table, and more specifically, a quantizing table used when the input signal 341 represents a natural image. A quantizing table that allows the bit allocation so that the bits can be used in a wide frequency range is suitable for natural images, and thus, the first quantizing table can be used as such a table.

Conversely, the second quantizing table can be used for specific applications, for example, it can be used when the input signal 341 represents a computer graphic image. Generally, computer graphic images have more flat portions compared to natural images, and thus, a quantizing table that allows the bit allocation so that the bits are assigned to a specific frequency range is suitable for computer graphic images. Accordingly, the second quantizing table can be used as such a table.

Thus, in this example, the second quantizing table is used for coding processing for improving the functions of the coding processing using the first quantizing table. For example, the second quantizing table is used for coding processing for specific applications, such as computer graphic images.

Figure 24:
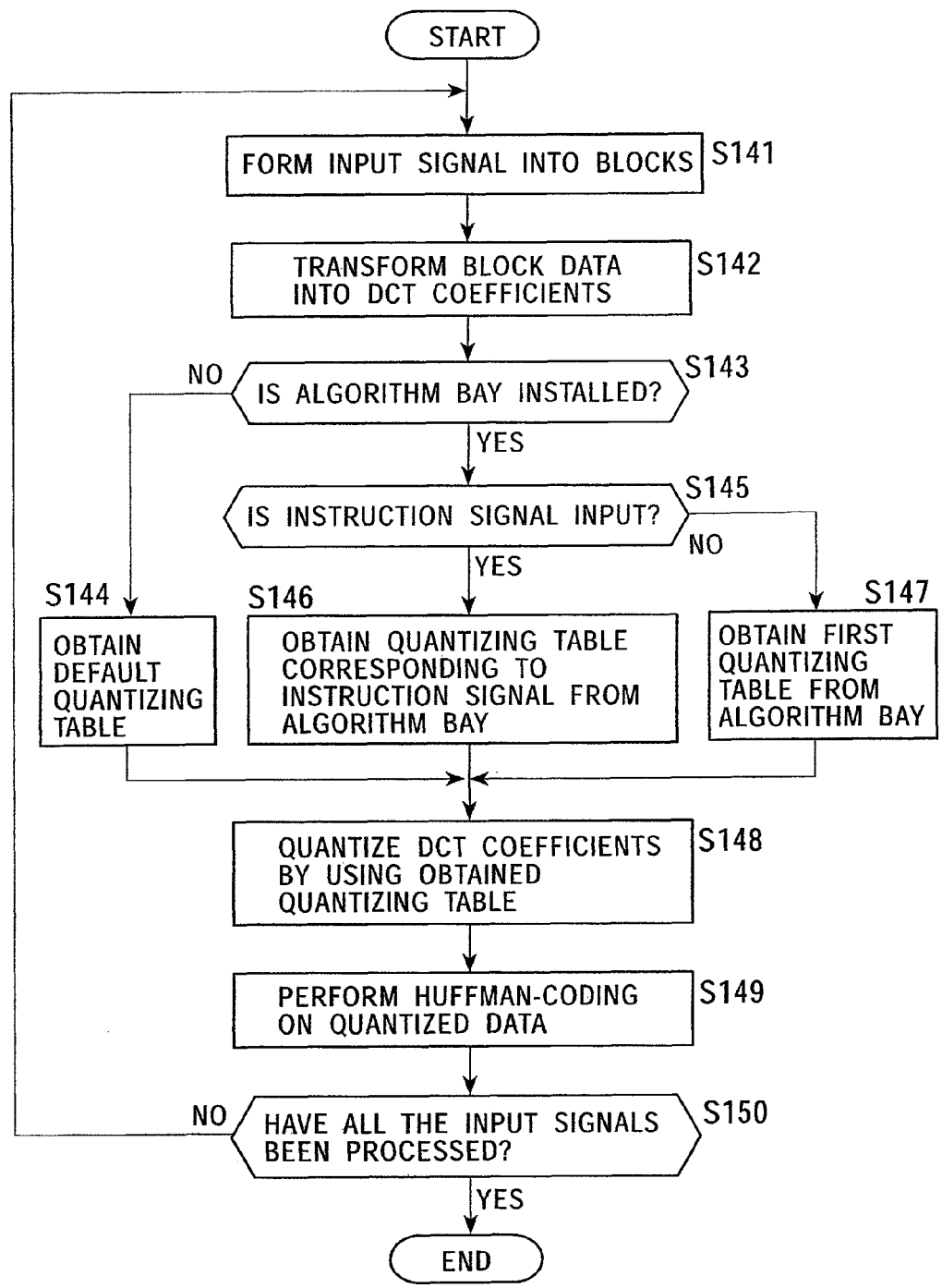
FIG. 24 is a flowchart illustrating the processing of the signal processing system shown in FIG. 23.

An example of the processing performed by the signal processing system 301 shown in FIG. 23 is described below with reference to the flowchart of FIG. 24.

In step S141, the block-forming unit 422 of the signal processing apparatus 311 forms the input signal 341 into blocks, and supplies the blocks to the DCT unit 423 as block data.

In step S142, the DCT unit 423 transforms the supplied block data into DCT coefficients, and supplies them to the quantizer 424.

The controller 421 determines in step S143 whether the algorithm bay 312 is installed in the signal processing apparatus 311.

If it is found in step S143 that the algorithm bay 312 is not installed, the process proceeds to step S144 in which the controller 421 obtains the default quantizing table stored in the default quantizing table storage unit 426.

If it is found in step S143 that the algorithm bay 312 is installed, the process proceeds to step S145 in which the controller 421 determines whether an instruction signal 427 is input.

If the outcome of step S145 is yes, the process proceeds to step S146 in which the controller 421 obtains the quantizing table corresponding to the instruction signal 427 from the algorithm bay 312.

More specifically, if the instruction signal 427 instructs the use of the second quantizing table, the controller 421 obtains the second quantizing table stored in the second quantizing table storage unit 432 via the wireless interface 323, the wireless connection 344, and the wireless interface 332.

If the instruction signal 427 instructs the use of the first quantizing table, the controller 421 obtains the first quantizing table stored in the first quantizing table storage unit 431 via the wired interface 322, the wired connection 343, and the wired interface 331.

If it is found in step S145 that the instruction signal 427 is not input, the process proceeds to step S147 in which the controller 421 obtains the first quantizing table from the algorithm bay 312.

More specifically, the controller 421 obtains the first quantizing table stored in the first quantizing storage unit 431 via the wired interface 322, the wired connection 343, and the wired interface 331.

In step S148, under the control of the controller 421, the quantizer 424 quantizes the DCT coefficients supplied from the DCT unit 423 in step S142 by using the quantizing table obtained by the controller 421 in step S144, S146, or S147. The quantizer 424 then supplies the quantized data and the corresponding quantizing table to the Huffman coding unit 425.

In step S149, the Huffman coding unit 425 performs Huffman-coding on the supplied quantized data. The Huffman coding unit 425 then outputs a signal consisting of the Huffman-coded data, the corresponding Huffman table, and the quantizing table supplied from the quantizer 424 in step S148 to an external source as the output signal 342.

In step S150, the controller determines whether all the input signals 341 have been processed.

If the outcome of step S150 is no, the controller 421 returns the process to step S141, and repeats step S141 and the subsequent steps until all the input signals 341 are coded, and the output signals 342 consisting of the coded data, the corresponding Huffman tables and the quantizing tables are output.

Upon completion of coding all the input signals 341 (when the final output signal 324 is output), it is determined in step S150 that all the input signals 341 have been processed, and the processing is completed.

Eighth Embodiment

Figure 25:
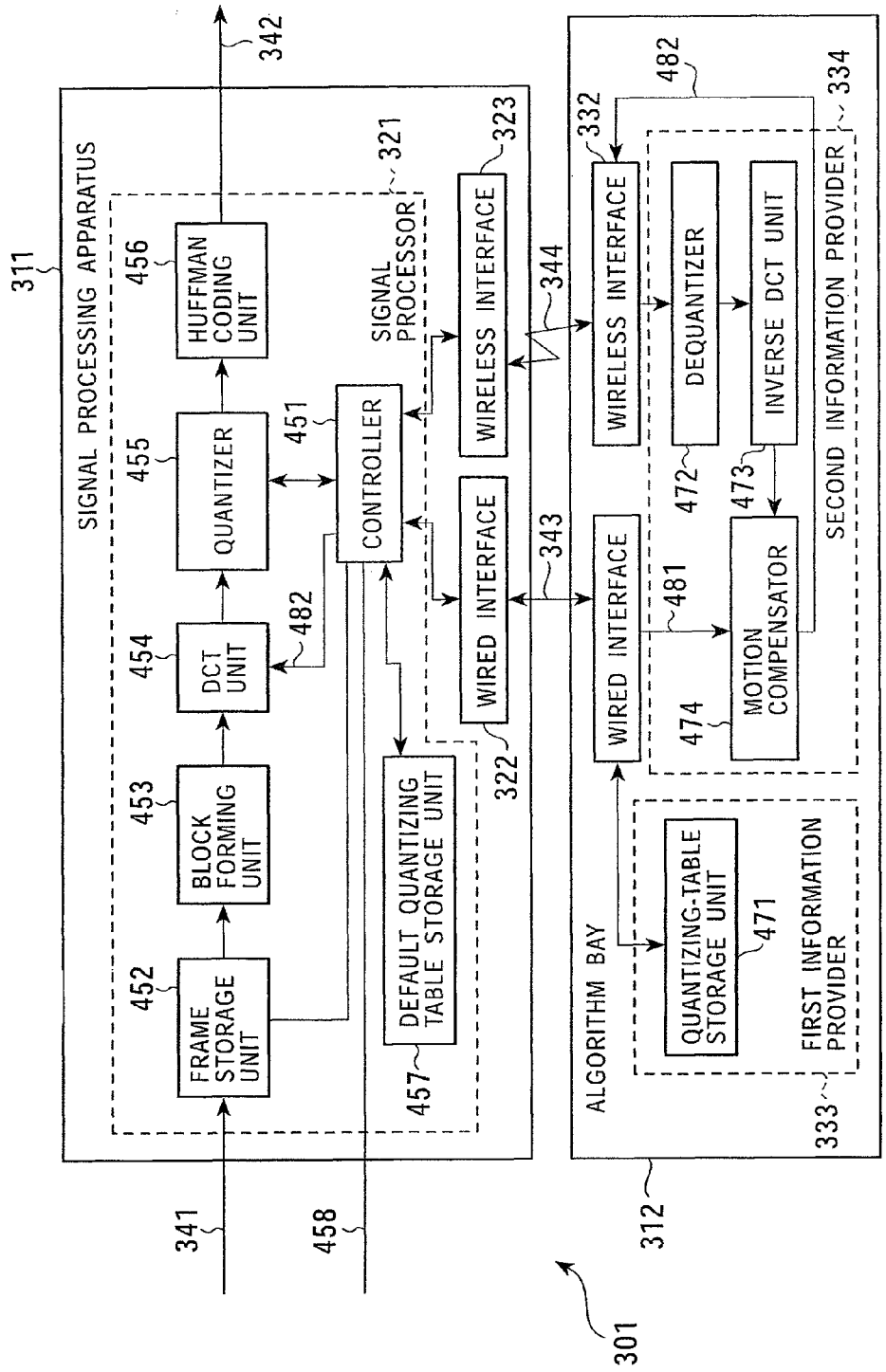
FIG. 25 is a block diagram illustrating the signal processing system shown in FIG. 16 according to an eighth embodiment of the present invention.

FIG. 25 is a block diagram schematically illustrating the signal processing system 301 according to the eighth embodiment of the present invention. The same elements as those shown in FIG. 17 are indicated by like reference numerals.

As in the signal processing apparatus 311 shown in FIG. 23, the signal processing apparatus 311 shown in FIG. 25 performs coding processing as the signal processing.

The signal processing apparatus 311 shown in FIG. 25 includes a controller 451 for controlling coding processing (processing of a DCT unit 454 and a quantizer 455) and the overall processing of the signal processor 321, a frame storage unit 452 for storing the input signal 341 in units of frames, a block-forming unit 453 for converting frame data into block data, and the DCT unit 454 for transforming the block data into DCT coefficients under the control of the controller 451.

The signal processing apparatus 311 also includes the quantizer 455 for quantizing the DCT coefficients supplied from the DCT unit 454 by using a predetermined quantizing table supplied from the controller 451, a Huffman coding unit 456 for performing Huffman-coding on the quantized data and for outputting the coded data to an external source as the output signal 342, and a default quantizing table storage unit 457 for storing a default quantizing table.

In this embodiment, as in the embodiment shown in FIG. 23, the output signal 342 includes at least Huffman-coded data and a signal corresponding to the Huffman table, and may also include a signal corresponding to the quantizing table used in the quantizing processing if necessary.

That is, the signal processing apparatus 311 performs image coding in units of frames.

However, by the single use of the signal processing apparatus 311, only intra-image coding can be performed, but it is difficult to perform inter-image coding using motion-compensation processing. That is, by the single use of the signal processing apparatus 311 shown in FIG. 25, it is difficult to perform image coding by using an MPEG method.

Accordingly, in order to enable inter-image coding, the algorithm bay 312 is connected to the signal processing apparatus 311.

More specifically, the algorithm bay 312 provides a quantizing table to be used in quantizing processing by the quantizer 455 by wired connection as the first information, and also wirelessly provides motion-compensation data for block data to be coded in the signal processing apparatus 311 as the second information.

This enables the signal processing apparatus 311 to perform inter-image coding processing by using the first information (quantizing table) and the second information (motion-compensation data). This is explained more specifically below.

The algorithm bay 312 includes the wired interface 331, the wireless interface 332, a quantizing-table storage unit 471 as the first information provider 333 for providing the first information (quantizing table) to the wired interface 331, and the second information provider 334 for providing the second information (motion-compensation data) to the wireless interface 332.

The second information provider 334 is provided with a dequantizer 472, an inverse DCT unit 473, and a motion compensator 474.

The dequantizer 472 obtains the quantized data output from the quantizer 455 via the controller 451, the wireless interface 323, the wireless connection 344, and the wireless interface 332, dequantizes the quantized data, and supplies the dequantized data to the inverse DCT unit 473.

The inverse DCT unit 473 performs inverse DCT on the dequantized data, decodes it into original block data, and supplies it to the motion compensator 474.

The motion compensator 474 calculates the position at which the difference between the inverse DCT data (original block data) and the data of the previous frame supplied from the frame storage unit 452 via the controller 451, the wired interface 322, the wired connection 343, and the wired interface 331 becomes minimum, and detects the motion vector based on the calculated position. The motion compensator 474 then generates reference image data corresponding to the original block data based on the detected motion vector, and calculates the minimum difference between the original block data and the generated reference image data. Then, the motion compensator 474 supplies a signal indicating the difference (hereinafter referred to as a "difference signal") 482 to the controller 451 via the wireless interface 332, the wireless connection 344, and the wireless interface 323.

The difference signal 482 is supplied to the DCT unit 454, and is converted into DCT coefficients by the DCT unit 454. The DCT coefficients are then quantized by the quantizer 455 by using the quantizing table stored in the quantizing-table storage unit 471, and are subjected to Huffman-coding by the Huffman coding unit 456.

Figure 26:
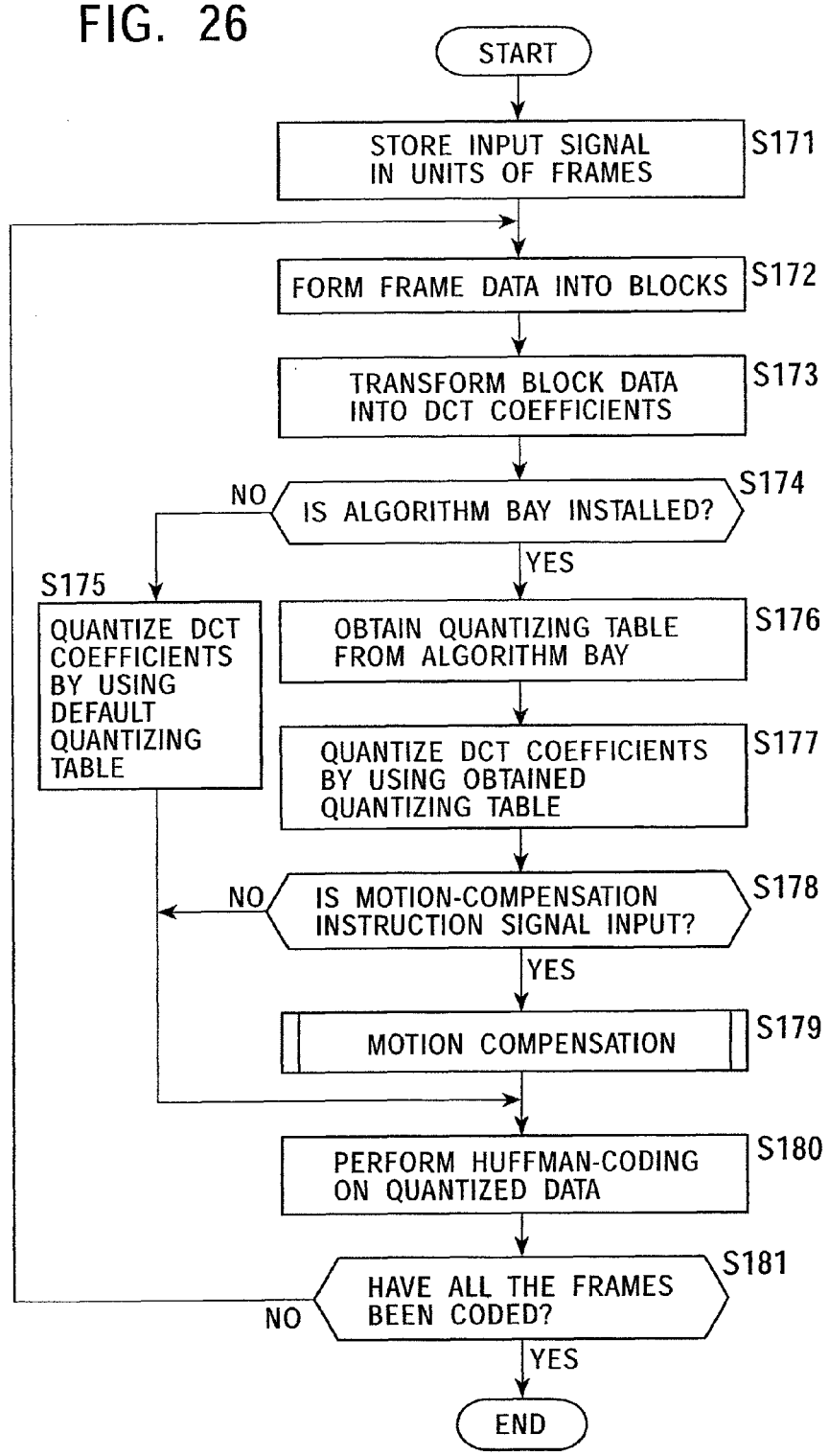
FIG. 26 is a flowchart illustrating the processing of the signal processing system shown in FIG. 25.

The processing of the signal processing system 301 shown in FIG. 25 is described below with reference to the flowchart of FIG. 26.

In step S171, the frame storage unit 452 of the signal processing apparatus 311 stores the input signal 341 in units of frames. The frame storage unit 452 then supplies frame data to be coded to the block-forming unit 453.

In step S172, the block-forming unit 453 forms the supplied frame data into blocks, and supplies them to the DCT unit 454 as the block data.

In step S173, the DCT unit 454 transforms the supplied block data into DCT coefficients, and supplies them to the quantizer 455.

The controller 451 then determines in step S174 whether the algorithm bay 312 is installed in the signal processing apparatus 311.

If the outcome of step S174 is no, the process proceeds to step S175. In step S175, under the control of the controller 451, the quantizer 455 quantizes the DCT coefficients supplied from the DCT unit 454 in step S173 by using the default quantizing table stored in the default quantizing table storage unit 457, and supplies the quantized DOT coefficients to the Huffman coding unit 456.

In step S180, the Huffman coding unit 456 performs Huffman coding on the quantized data, and outputs the output signal 342 consisting of the Huffman-coded data, the corresponding Huffman table, and the quantizing table to an external source.

Conversely, if it is found in step S174 that the algorithm bay 312 is installed, the process proceeds to step S176 in which the controller 451 obtains the quantizing table from the algorithm bay 312.

More specifically, the controller 451 obtains the corresponding quantizing table from the quantizing table storage unit 471 via the wired interface 322, the wired connection 343, and the wired interface 331.

In step S177, under the control of the controller 451, the quantizer 455 quantizes the DCT coefficients supplied from the DCT unit 454 in step S173 by using the quantizing table obtained by the controller 451 in step S176.

The controller 451 then determines in step S178 whether a motion-compensation instruction signal 458 is input.

It is now assumed in this embodiment that the signal processing apparatus 311 performs coding processing by using an MPEG method. In this case, if the instruction signal 458 indicates that a frame to be coded is I picture (Intra-picture), the controller 451 determines in step S178 that the motion-compensation instruction signal 458 is not input.

The I-picture image data is image data that is coded without using image data of another frame (intra-coded image data).

Then, in step S180, the Huffman coding unit 456 performs Huffman coding on the quantized data quantized by the quantizer 455 in step S177, and outputs the coded data to an external source as the output signal 342.

On the other hand, if the instruction signal 458 indicates that a frame to be coded is P-picture (Predictive-picture) or B-picture (Bidirectionally-picture), the controller 451 determines in step S178 that the motion-compensation instruction signal 458 is input, and performs motion-compensation processing in step S179.

Basically, P-picture image data is image data obtained by coding the difference between the P-picture image data and temporally preceding I-picture or P-picture image data (inter-frame forward-direction predictive-coded image data). Basically, B-picture image data is image data obtained by coding the difference between the B-picture data and temporally preceding I-picture or P-picture image data or temporally-following I-picture or P-picture image data (inter-frame bidirectional predictive-coded image data).

Figure 27:
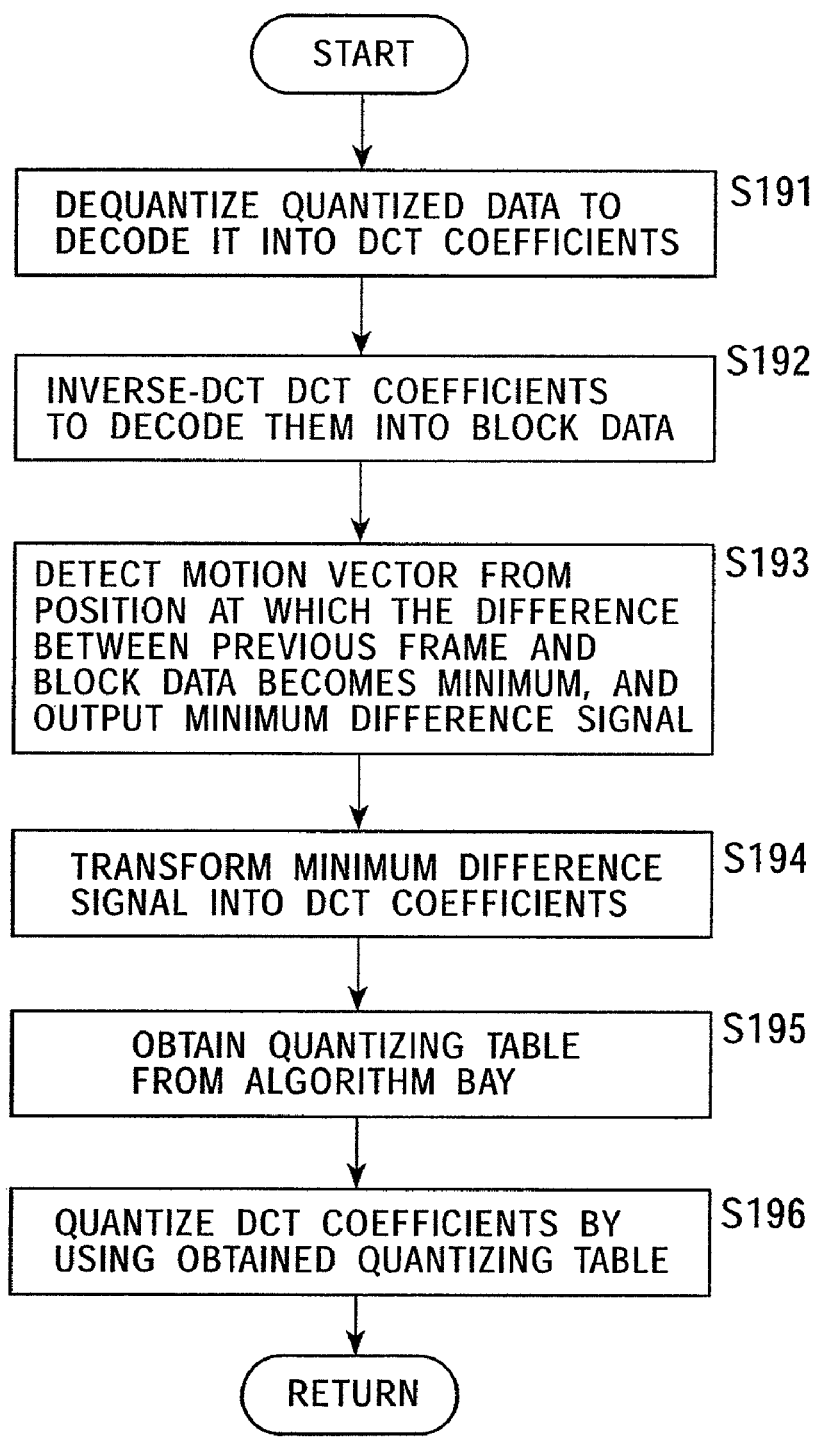
FIG. 27 is a flowchart illustrating details of motion-compensation processing of the signal processing system shown in FIG. 25.

Details of the motion compensation processing are indicated by the flowchart of FIG. 27.

If the controller 451 determines in step S178 that the motion-compensation instruction signal 458 is input, the controller 451 supplies the quantized data quantized by the quantizer 455 in step S177 to the dequantizer 472 via the wireless interface 323, the wireless connection 344, and the wireless interface 332.

Then, in step S191 of FIG. 27, the dequantizer 472 dequantizes the supplied quantized data, decodes it into the DCT coefficients (corresponding to the DCT coefficients output from the DCT unit 454 in step S173), and supplies them to the inverse DCT unit 473.

In step S192, the inverse DCT unit 473 performs inverse DCT on the DCT coefficients so as to decode them into block data (corresponding to the block data output from the block-forming unit 453 in step S172), and supplies it to the motion compensator 474.

Before supplying the block data to the motion compensator 474, the controller 451 reads data of the previous frame corresponding to the decoded block data (hereinafter simply referred to as "previous frame"), and supplies it to the motion compensator 474 via the wired interface 322, the wired connection 343, and the wired interface 331.

In step S193, the motion compensator 474 detects the motion vector from the position at which the difference between the data of the previous frame supplied from the controller 451 and the block data supplied from the inverse DCT unit 473 becomes minimum, calculates the minimum difference, as described above, and outputs the corresponding minimum difference signal 482.

The minimum difference signal 482 is then supplied to the controller 451 via the wireless interface 332, the wireless connection 334, and the wireless interface 323.

The controller 451 then supplies the minimum difference signal 482 to the DCT unit 454, and then, in step S194, the DCT unit 454 transforms the minimum difference signal 482 into DCT coefficients, and supplies them to the quantizer 455.

In step S195, the controller 451 obtains the quantizing table from the algorithm bay 312. More specifically, the controller 451 obtains the corresponding quantizing table from the quantizing-table storage unit 471 via the wired interface 322, the wired connection 343, and the wired interface 331.

In step S196, the quantizer 455 quantizes the DCT coefficients output from the DCT unit 454 in step S194 by using the quantizing table obtained by the controller 451 in step S195, and supplies the quantized DCT coefficients corresponding to the minimum difference signal 482 to the Huffman coding unit 456.

Referring back to FIG. 26, in step S180, the Huffman coding unit 456 performs Huffman coding on the quantized data supplied from the quantizer 155 in step S179, and outputs the coded data to an external source as the output signal 342.

The controller 451 then determines in step S181 whether all the frames corresponding to the input signal 341 have been coded.

If the outcome of step S181 is no, the controller 451 returns the process to step S172, and repeats step S172 and the subsequent steps. That is, coding processing is performed on the subsequent frame. When all the frames are coded and the output signals 342 consisting of the coded data, the corresponding Huffman tables, and the quantizing tables are output, it is determined in step S181 that all the frames have been coded, and the processing is completed.

In the signal processing system 301 shown in FIG. 16, according to the fifth and sixth embodiments, classification adaptive processing is performed as the signal processing, and according to the seventh and eighth embodiments, coding processing is performed as the signal processing. As stated above, however, the signal processing is not restricted to the above-described types of processing.

As described above, in the signal processing system 301 shown in FIG. 16, basic information for changing signal processing functions of the signal processing apparatus 311 is supplied by wired connection as the first information, and additional information for changing signal processing functions is supplied wirelessly as the second information.

Accordingly, there is no restriction of wires (buses) for the additional information, and thus, upgraded additional information can be easily handled. Generally, the amount of additional information is small, and a known wireless method can be employed for the additional information.

Since the basic information is not generally upgraded, it can be supplied by wired connection, which makes it possible to stably and safely send a large amount of information.

The second information, which is wirelessly supplied, is not image or audio data, and is data to be used only in signal processing, and thus, security can be maintained even if it is not encrypted.

In other words, according to the signal processing system 1 or 301, the objects of the present invention can be achieved.

Ninth Embodiment

The first through eighth embodiments of the present invention have been described, and the present invention is not restricted to the above-described embodiments.

In the signal processing apparatus 11 or 311, the signal processor 21 or 321 performs only one type of signal processing. However, a plurality of signal processors may be provided for the signal processing apparatus of the present invention. In this case, the same number of algorithm bays may be installed in the corresponding signal processors, or algorithm bays may be installed into predetermined signal processors.

Accordingly, in a ninth embodiment, a signal processing apparatus provided with a plurality of signal processors is described in the context of a television receiver.

Figure 28:
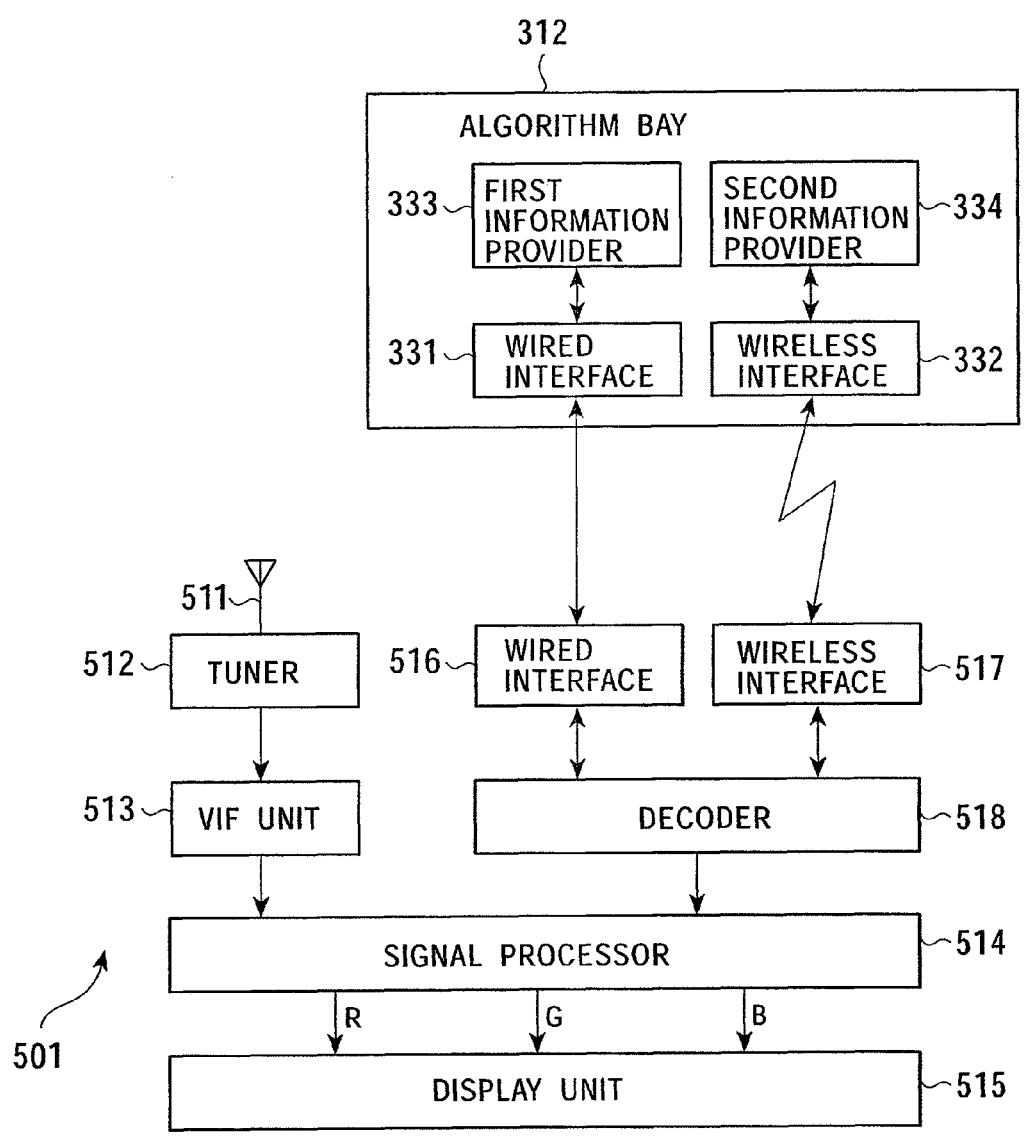
FIG. 28 is a block diagram illustrating a television receiver according to a ninth embodiment of the present invention.

FIG. 28 is a block diagram schematically illustrating a television receiver 501 according to the ninth embodiment of the present invention. In this embodiment, the television receiver 501 is an NTSC television receiver.

As shown in FIG. 28, the television receiver 501 is provided with a tuner 512 for receiving a video carrier signal of a predetermined channel via an antenna 511 and for demodulating the video carrier signal into a video intermediate frequency (IF) signal, a video intermediate frequency (VIF) unit 513 for demodulating a video IF signal into a composite video signal, a signal processor 514 for generating video signals (R signal, G signal, and B signal of the three primary colors) from the composite video signal, and a display unit 515 for receiving the R signal, the G signal, and the B signal and for displaying them as images.

The signal processor 514 performs signal processing for converting an image corresponding to an input signal into an image of a predetermined size so as to generate video signals (R signal, G signal, and B signal).

More specifically, the signal processor 514 performs image resizing and zooming based on a resolution creating technique, which is applied to a resolution creating apparatus for receiving an SD image and outputting an HD image having a density four times higher than the HD image, or to an image signal conversion apparatus for enabling the user to adjust the image resolution to a certain level, as disclosed in, for example, Japanese Patent Application 2000-047947, proposed by the assignee of the present application.

For example, the size of an image transmitted from a digital still camera, a video camera, or the Internet does not necessarily coincide with the size of an SD image or an HD image sent from television broadcasting. In this case, the signal processor 514 converts the size of such an image into, for example, the standard size of the SD image, and then supplies it to the display unit 515 as the R signal, the G signal, and the B signal of the three primary colors.

In order to capture images other than images sent from television broadcasting, for example, images from a digital still camera, a connecting terminal compatible with a recording medium (for example, Memory Stick (trademark of Sony Corporation, i.e., the assignee of the present application) loaded in the digital still camera must be attached to the television receiver.

For example, in order to capture images from a video camera into a television receiver, a connecting terminal compatible with a connecting terminal (for example, i-Link (trademark) loaded in the video camera must be attached to the television receiver.

When capturing images from the Internet into a television receiver, a connecting terminal compatible with a connecting cable (for example, an Asymmetrical Digital Subscriber Line (ADSL) connecting cable) of the Internet must be attached to the television receiver.

Conventionally, these connecting terminals provided for the television receiver are connected to the display unit by wired connection.

However, unlike television broadcast signals (for example, NTSC signals), recording media for digital still cameras, connecting terminals for video cameras, or connecting cables for the Internet are not integrated into one standard. Accordingly, when the connecting terminal provided for a television receiver is not compatible with the terminal provided for a medium (for example, a digital still camera, a video camera, or the Internet), it is difficult capture an image from the medium into the television receiver.

Generally, the replacement cycle of television receivers is about ten years, and on the other hand, the image provision method of such media may be changed in a few years. Accordingly, the predetermined connecting terminals provided for television receivers may not be compatible with new media or new image provision methods.

In order to solve the above-described problems unique to the television receivers, the present assignee has made the following discovery. Instead of installing specific connecting terminals into a television receiver, the television receiver is constructed to optionally select and change required connecting terminals. Additionally, the connecting terminal is connected to the internal board of the television receiver wirelessly. If they are connected by wired connection, data exceeding the transmission capacity of a connecting line cannot be transmitted. If they are wirelessly connected, there is no restriction of the amount of data. Also, a desired number of channels (number of connecting terminals) can be set.

An application of the signal processing system 1 or 301 to a television receiver based on the above-described discovery is the television receiver 501 shown in FIG. 28.

In order to provide signals other than television broadcast signals (NTSC signals), the television receiver 501 also includes, as shown in FIG. 28, a detachable wired interface (connecting terminal) 516, a wireless interface 517, and a decoder 518 for decoding image signals of various formats received via the wired interface 516 or the wireless interface 517.

The wired interface 516 is connected to, for example, the wired interface 331 of the algorithm bay 312 shown in FIG. 16. Accordingly, the decoder 518 is able to obtain the first information provided by the first information provider 333 via the wired interfaces 331 and 516.

The wireless interface 517 is connected to, for example, the wireless interface 332 of the algorithm bay 312 shown in FIG. 16. Accordingly, the decoder 518 is able to obtain the second information provided by the second information provider 334 via the wireless interfaces 332 and 517.

As stated above, various types of information can be used as the first and second information. By considering the signal processing system is a television receiver in this embodiment, the first information may be coded information (coded image data), and the second information may be decoding information for decoding the coded information. In this case, the decoder 518 decodes the first information by using the second information, and supplies it to the signal processor 514.

Alternatively, the first information may be encrypted information (for example, encrypted pay pictures), and the second information may be decrypting information (for example, a key) for decrypting the encrypted information. In this case, the decoder 518 decrypts the first information by using the second information, and supplies it to the signal processor 514.

Since the wired interface 516 is detachable, it may be formed in various forms. For example, as shown in FIG. 29, the wired interface 516 may includes two wired interfaces 516-1 and 516-2. The wired interface 516-1 is connected to the wired interface 331 of the algorithm bay 312, and the wired interface 516-2 can be connected to a wired interface 531 of an external medium 519.

If, for example, the external medium 519 is a recording medium, such as Memory Stick, for storing images captured by a digital still camera, the wired interface 516-2 is a connecting terminal compatible with such a recording medium.

If the external medium 519 is a video camera, the wired interface 516-2 may be a connecting terminal (for example, i-Link terminal) compatible with the video camera.

If the external medium 519 is the Internet, the wired interface 516-2 may be a connecting terminal to be connected to a cable for making access to the Internet.

Accordingly, by providing the type of connector specified by the predetermined standard as the wired interface 516-2, the television receiver 501 is able to easily receive signals corresponding to the standard. Even if a new standard is specified, another wired interface 516-2 compatible with such a new standard can be provided, and thus, the television receiver 501 is able to receive signals corresponding to the new standard.

As shown in FIG. 29, the external medium 519 is further provided with a wireless interface 532, which can be connected to the wireless interface 517, thereby making it possible to wirelessly supply information (such as image data) to the television receiver 501.

It is also possible to provide a connecting terminal 520 including an external interface 534 to be connected to another external medium 533 by wired connection and a wireless interface 535 to be connected to the wireless interface 517 of the television receiver 501.

With this configuration, the above-described problems can be solved.

The forms of the algorithm bay 312, the portion forming the wired interface 531 and the wireless interface 532 of the external medium 519, and the connecting terminal 520 are not particularly restricted. However, it is preferable that these elements are formed as a board to be attached to the television receiver 501, and the board is stored in a package. Then, the wired interface 331, the wireless interface 332, the wired interface 531, the wireless interface 532, and the wireless interface 535 may be each disposed in the corresponding package.

The television receiver 501 is also provided with a housing unit (not shown) for housing a package therein, and when a package is housed, the wired interface 516 is disposed at a position at which it is connectable with the wired interface of the package, and the wireless interface 517 is disposed at a position at which it is connectable with the wireless interface of the package.

This enables the user to easily connect the algorithm bay 312, the external medium 519, or the connecting terminal 520 to the television receiver 501.

An example of the processing of the television receiver 501 shown in FIG. 28 is described below with reference to the flowchart of FIG. 30.

It is now assumed, as shown in FIG. 28, that the algorithm bay 312 is connected to the television receiver 501. That is, the wired interface 331 is connected to the wired interface 516, and the wireless interface 332 is connected to the wireless interface 517.

It is also assumed that the first information provider 333 supplies coded image data as the first information, and the second information provider 334 supplies data required for decoding the coded image data (hereinafter referred to as decoding information), which is the first information, as the second information.

In step S201, the decoder 518 of the television receiver 501 captures an image from an external device.

More specifically, the decoder 518 obtains the coded image data from the first information provider 333 via the wired interfaces 516 and 331, and obtains the decoding information from the second information provider 334 via the wireless interfaces 517 and 332.

In step S202, the decoder 518 decodes the captured image.

More specifically, the decoder 518 decodes the coded image data captured in step S201 into the original image data by using the decoding information obtained in step S201, and supplies the decoded data to the signal processor 514.

Simultaneously, the video IF signal of television broadcasting received by the tuner 512 via the antenna 511 is demodulated by the VIF unit 513, and is supplied to the signal processor 514 as the composite video signal (hereinafter simply referred to as the "television-broadcast video signal).

In step S203, the signal processor 514 selects one of the image data supplied from the algorithm bay 312 and the television-broadcast video signal.

Then, in step S204, the signal processor 514 converts the size of the signal or data selected in step S203 into video signals (for example, R signal, G signal, and B signal of the three primary colors), and supplies them to the display unit 515.

In step S205, the display unit 515 displays the images corresponding to the R signal, the G signal, and the B signals of the three primary colors converted in step S204.

Accordingly, since the television receiver 501 is provided with the detachable wired interface 516 and the wireless interface 517, advantages similar to those obtained by the signal processing system 1 or 301 can be achieved. Additionally, the above-described problems unique to television receivers can also be solved.

The above-described series of processing can be executed by hardware or software.

In this case, the above-described signal processing apparatuses and a signal processing apparatus corresponding to the algorithm bay can be formed as the personal computer shown in FIG. 15. It is necessary, however, that the interface 212 includes a wired interface and a wireless interface, and the communication unit 209 performs wired communication with other signal processing apparatuses via the wired interface, and performs wireless communication with other signal processing apparatuses via the wireless interface.

What is claimed is:

1. A signal processing system comprising:
a first signal processing apparatus for performing predetermined signal processing on an input signal and for outputting the processed signal; and
a second signal processing apparatus for changing a function of the predetermined signal processing of said first signal processing apparatus to a first function when said second signal processing apparatus is connected to said first signal processing apparatus according to a first connection mode, and for changing the function of the predetermined signal processing to a second function when said second signal processing apparatus is connected to said first signal processing apparatus according to a second connection mode;
each of said first signal processing apparatus and said second signal processing apparatus comprising wireless communication means for performing wireless communication with each other;
one of said first signal processing apparatus and said second signal processing apparatus comprising a detection means for detecting a wireless communication distance when wireless communication is performed; and
wherein the first connection mode and the second connection mode are distinguished by the detected wireless communication distance.

2. A signal processing system according to claim 1, wherein said second signal processing apparatus is formed as a board to be installed in said first signal processing apparatus.

3. A signal processing system according to claim 1, wherein said first signal processing apparatus comprises installation means for installing said second signal processing apparatus, and the first connection mode and the second connection mode are distinguished by a direction in which said second signal processing apparatus is connected to said first signal processing apparatus when said second signal processing apparatus is installed in the installation means of said first signal processing apparatus.

4. A signal processing system according to claim 3, wherein said second signal processing apparatus provides an indication of the first function at a first position corresponding to the first connection mode, and provides an indication of the second function at a second position corresponding to the second connection mode.

5. A signal processing system according to claim 1, wherein said detection means detects the wireless communication distance based on the intensity of an electric field, and error rate, or a clock phase difference.

6. A signal processing system according to claim 1, wherein:
said second signal processing apparatus comprises classification adaptive processing means for performing classification adaptive processing; and
the first function is a function of outputting a signal subjected to the classification adaptive processing by the classification adaptive processing means by using a first coefficient, and the second function is a function of outputting a signal subjected to the classification adaptive processing by the classification adaptive processing means by using a second coefficient.

7. A signal processing system according to claim 6, wherein:
   a third signal processing apparatus for performing the classification adaptive processing in cooperation with said second signal processing apparatus is assigned to at least the first connection mode;
   said classification adaptive processing means performs the classification adaptive processing in cooperation with said third signal processing apparatus when said second signal processing apparatus is connected to said first signal processing apparatus according to the first connection mode; and
   the first function is a function of outputting a signal subjected to the classification adaptive processing by the classification adaptive processing means of said second signal processing apparatus in cooperation with said third signal processing apparatus.

8. A signal processing system according to claim 7, wherein one of said first signal processing apparatus and said second signal processing apparatus further comprises coefficient designation means for designating a coefficient for performing the classification adaptive processing by said third signal processing apparatus in cooperation with the classification adaptive processing means.

9. A signal processing system according to claim 1, wherein:
   said second signal processing apparatus comprises classification adaptive processing means for performing classification adaptive processing, a third signal processing apparatus for performing the classification adaptive processing in cooperation with said second signal processing apparatus, said third signal processing apparatus being assigned to at least the first connection mode, and coefficient generation means for generating a coefficient for performing the classification adaptive processing by said third signal processing apparatus in cooperation with said second signal processing apparatus when said second signal processing apparatus is connected to said first signal processing apparatus according to the first connection mode;
   said second signal processing apparatus supplies the coefficient generated by the coefficient generation means to said third signal processing apparatus;
   the first function is a function of outputting a signal subjected to the classification adaptive processing performed by said third signal processing apparatus by using the coefficient provided by said second signal processing apparatus; and
   the second function is a function of outputting a signal subjected to the classification adaptive processing by the classification adaptive processing means.

10. A signal processing method for a signal processing system which comprises a first signal processing apparatus and a second signal processing apparatus, said signal processing method comprising:
   a step of performing, by said first signal processing apparatus, predetermined signal processing on an input signal and outputting the processed signal; and
   a step of changing, by said second signal processing apparatus, a function of the predetermined signal processing of said first signal processing apparatus to a first function when said second signal processing apparatus is connected to said first signal processing apparatus according to a first connection mode, and of changing, by said second signal processing apparatus, the function of the predetermined signal processing to a second function when said second signal processing apparatus is connected to said first signal processing apparatus according to a second connection mode;
   performing wireless communication with said first signal processing apparatus and said second signal processing apparatus;
   detecting a wireless communication distance when wireless communication is performed; and
   wherein the first connection mode and the second connection mode are distinguished by the detected wireless communication distance.

11. A signal processing apparatus comprising:
   signal processing means for performing predetermined signal processing on an input signal and for outputting the processed signal; and
   connection means, which is connectable with a first signal processing apparatus according to a plurality of connection modes,
   wherein said first signal processing apparatus changes a function of the predetermined signal processing to a first function when said first signal processing apparatus is connected to said connection means of said signal processing apparatus according to a first connection mode, and changes the function of the predetermined signal processing to a second function when said first signal processing apparatus is connected to said connection means according to a second connection mode;
   wireless communication means for performing wireless communication with said first signal processing apparatus;
   detection means for detecting a wireless communication distance when said signal processing apparatus performs wireless communication with said first signal processing apparatus; and
   wherein the first connection mode and the second connection mode are distinguished by the detected wireless communication distance.

12. A signal processing apparatus according to claim 11, wherein said first signal processing apparatus is formed as a board to be installed in said signal processing apparatus.

13. A signal processing apparatus according to claim 11, wherein said connection means comprises installation means for installing said first signal processing apparatus, and the first connection mode and the second connection mode are distinguished by a direction in which said first signal processing apparatus is connected to said signal processing apparatus when said first signal processing apparatus is installed in the installation means of said signal processing apparatus.

14. A signal processing apparatus according to claim 13, wherein said first signal processing apparatus provides an indication of the first function at a first position corresponding to the first connection mode, and provides an indication of the second function at a second position corresponding to the second connection mode.

15. A signal processing apparatus according to claim 11, wherein said detection means detects the wireless communication distance based on the intensity of an electric field, an error rate, or a clock phase difference.

16. A signal processing apparatus according to claim 11, wherein:
   said first signal processing apparatus performs classification adaptive processing; and the first function is a function of outputting a signal subjected to the classification adaptive processing performed by said first signal processing apparatus by using a first coefficient, and the second function is a function of outputting a signal subjected to the classification adaptive processing performed by said first signal processing apparatus by using a second coefficient.

17. A signal processing apparatus according to claim 16, wherein:
a second signal processing apparatus for performing the classification adaptive processing in cooperation with said first signal processing apparatus is assigned to at least the first connection mode;
said first signal processing apparatus performs the classification adaptive processing in cooperation with said second signal processing apparatus when said first signal processing apparatus is connected to said connection means of said signal processing apparatus according to the first connection mode; and
the first function is a function of outputting a signal subjected to the classification adaptive processing performed by said first signal processing apparatus in cooperation with said second signal processing apparatus.

18. A signal processing apparatus according to claim 17, wherein said second signal processing apparatus comprises coefficient designation means for designating a coefficient for performing the classification adaptive processing by said second signal processing apparatus in cooperation with said first signal processing apparatus.

19. A signal processing apparatus according to claim 11, wherein:
said first signal processing apparatus performs classification adaptive processing;
a second signal processing apparatus for performing the classification adaptive processing in cooperation with said first signal processing apparatus is assigned to at least the first connection mode;
a coefficient for performing the classification adaptive processing by said second signal processing apparatus in cooperation with said first signal processing apparatus is generated when said first signal processing apparatus is connected to said connection means of said signal processing apparatus according to the first connection mode, and is supplied to said second signal processing apparatus;
the first function is a function of outputting a signal subjected to the classification adaptive processing performed by said second signal processing apparatus by using the coefficient provided by said first signal processing apparatus; and
the second function is a function of outputting a signal subjected to the classification adaptive processing by said first signal processing apparatus.

20. A signal processing method for a signal processing apparatus, comprising a signal processing step of performing predetermined signal processing on an input signal and of outputting the processed signal, wherein a function of the predetermined signal processing in said signal processing step is changed to a first function when a first signal processing apparatus is connected to said signal processing apparatus according to a first connection mode, and the function of the predetermined signal processing in said signal processing step is changed to a second function when said first signal processing apparatus is connected to said signal processing apparatus according to a second connection mode;
performing wireless communication with said first signal processing apparatus; and
detecting a wireless communication distance when said signal processing apparatus performs wireless communication with said first signal processing apparatus;
wherein the first connection mode and the second connection mode are distinguished by the detected wireless communication distance.

21. A non-transitory recording medium in which a program for use in a computer for controlling a signal processing apparatus is recorded, said program comprising a signal processing step of performing predetermined signal processing on an input signal and of outputting the processed signal, wherein a function of the predetermined signal processing in said signal processing step is changed to a first function when a first signal processing apparatus is connected to said signal processing apparatus according to a first connection mode, and the function of the predetermined signal processing in said signal processing step is changed to a second function when said first signal processing apparatus is connected to said signal processing apparatus according to a second connection mode;
performing wireless communication with said first signal processing apparatus; and
detecting a wireless communication distance when said signal processing apparatus performs wireless communication with said first signal processing apparatus;
wherein the first connection mode and the second connection mode are distinguished by the detected wireless communication distance.

22. A signal processing apparatus comprising:
a first signal processing apparatus for performing predetermined signal processing on an input signal, and for outputting the processed signal; and
function changing means for changing a function of the predetermined signal processing of said first signal processing apparatus when said signal processing apparatus is connected to said first signal processing apparatus according to a first connection mode, and for changing the function of the predetermined signal processing of said first signal processing apparatus to a second function when said signal processing apparatus is connected to said first signal processing apparatus according to a second connection mode;
wireless communication means for performing wireless communication with said first signal processing apparatus;
detection means for detecting a wireless communication distance when said signal processing apparatus performs wireless communication with said first signal processing apparatus; and
wherein the first connection mode and the second connection mode are distinguished by the detected wireless communication distance.

23. A signal processing apparatus according to claim 22, wherein said signal processing apparatus is formed as a board to be installed in said first signal processing apparatus.

24. A signal processing apparatus according to claim 22, wherein said first signal processing apparatus comprises installation means for installing said signal processing apparatus, and the first connection mode and the second connection mode are distinguished by a direction in which said signal processing apparatus is connected to said first signal processing apparatus when said signal processing apparatus is installed in the installation means of said first signal processing apparatus.

25. A signal processing apparatus according to claim 24, wherein said signal processing apparatus provides an indication of the first function at a first position corresponding to the first connection mode, and provides an indication of the second function at a second position corresponding to the second connection mode.

26. A signal processing apparatus according to claim 22, further comprising classification adaptive processing means for performing classification adaptive processing, wherein the first function is a function of outputting a signal subjected to the classification adaptive processing performed by said classification adaptive processing means by using a first coefficient, and the second function is a function of outputting a signal subjected to the classification adaptive processing performed by said classification adaptive processing means by using a second coefficient.

27. A signal processing apparatus according to claim 26, wherein:
a second signal processing apparatus for performing the classification adaptive processing in cooperation with said signal processing apparatus is assigned to at least the first connection mode;
said classification adaptive processing means performs the classification adaptive processing in cooperation with said second signal processing apparatus when said signal processing apparatus is connected to said first signal processing apparatus according to the first connection mode; and
the first function is a function of outputting a signal subjected to the classification adaptive processing performed by said classification adaptive processing means in cooperation with said second signal processing apparatus.

28. A signal processing apparatus according to claim 22, further comprising:
classification adaptive processing means for performing classification adaptive processing;
a second signal processing apparatus for performing the classification adaptive processing in cooperation with said signal processing apparatus, said second signal processing apparatus being assigned to at least the first connection mode; and
coefficient generation means for generating a coefficient for performing the classification adaptive processing by said second signal processing apparatus in cooperation with said signal processing apparatus when said signal processing apparatus is connected to said first signal processing apparatus according to the first connection mode, wherein:
said function changing means supplies the coefficient generated by said coefficient generation means to said second signal processing apparatus;
the first function is a function of outputting a signal subjected to the classification adaptive processing performed by said second signal processing apparatus by using the coefficient provided by said function changing means; and
the second function is a function of outputting a signal subjected to the classification adaptive processing performed by said classification adaptive processing means.

29. A signal processing method for a signal processing apparatus, comprising a function changing step of changing, when said signal processing apparatus is connected to a first signal processing apparatus for performing predetermined signal processing on an input signal and for outputting the processed signal according to a first connection mode, a function of the predetermined signal processing of said first signal processing apparatus to a first function, and of changing, when said signal processing apparatus is connected to said first signal processing apparatus according to a second connection mode, the function of the predetermined signal processing of said first signal processing to a second function;
performing wireless communication with said first signal processing apparatus; and
detecting a wireless communication distance when said signal processing apparatus performs wireless communication with said first signal processing apparatus;
wherein the first connection mode and the second connection mode are distinguished by the detected wireless communication distance.

30. A non-transitory recording medium in which a program for use in a computer for controlling a signal processing apparatus is recorded, said program comprising a function changing step of changing, when said signal processing apparatus is connected to a first signal processing apparatus for performing predetermined signal processing on an input signal and for outputting the processed signal according to a first connection mode, a function of the predetermined signal processing of said first signal processing apparatus to a first function, and of changing, when said signal processing apparatus is connected to said first signal processing apparatus according to a second connection mode, the function of the predetermined signal processing of said first signal processing to a second function;
performing wireless communication with said first signal processing apparatus; and
detecting a wireless communication distance when said signal processing apparatus performs wireless communication with said first signal processing apparatus;
wherein the first connection mode and the second connection mode are distinguished by the detected wireless communication distance.

* * * * *